US005216603A

United States Patent [19]

Flores et al.

[11] Patent Number: 5,216,603

[45] Date of Patent: Jun. 1, 1993

[54] METHOD AND APPARATUS FOR STRUCTURING AND MANAGING HUMAN COMMUNICATIONS BY EXPLICITLY DEFINING THE TYPES OF COMMUNICATIONS PERMITTED BETWEEN PARTICIPANTS

[75] Inventors: Carlos F. Flores, Berkeley, Calif.; Juan J. Ludlow, Lomas de Santa Fe, Mexico; Chauncey F. Bell, III, San Rafael, Calif.; Raul M. Mora, Tlalpan, Mexico; Terry A. Winograd, Stanford; Michael J. Graves, Alameda, both of Calif.

[73] Assignee: Action Technologies, Inc., Alameda, Calif.

[21] Appl. No.: 600,144

[22] Filed: Oct. 17, 1990

Related U.S. Application Data

[63] Continuation of Ser. No. 226,727, Jul. 29, 1988, abandoned, and a continuation of Ser. No. 798,904, Nov. 18, 1985, abandoned.

[51] Int. Cl.[5] .............................................. G06F 15/42

[52] U.S. Cl. .................................................. 364/419

[58] Field of Search ........................................ 364/419

*Primary Examiner*—Gail O. Hayes

*Attorney, Agent, or Firm*—Blakely, Sokoloff, Taylor & Zafman

[57] ABSTRACT

A method for managing business, social, and/or personal communications utilizing a programmed computer system including certain defining steps. All communications between a set of participants are defined as moves in conversations for declaring specific realizable possibilities or as moves in conversations for producing actions to complete specific possibilities. These conversations are defined as taking place within a set of declared or understood domains of possibilities. A set of conversational roles played by participants in the conversations is defined. Each participant plays at least one conversational role in any conversation. A set of types of incompletions which occur recurringly within the conversations is also defined. A set of types of permitted moves in conversations is defined on the basis of the defined incompletions, the defined roles, and the specific types of incompletions produced by the permitted moves. For each of the types of moves a set of associated data is defined. A conversation record format for the conversations is defined relative to a data base to be created and maintained for the conversations. The method also includes establishing a conversation management program for enabling interactive computer-controlled management of each of a plurality of the conversations of the participants. The program also includes facilities for use of each participant to review new moves by other participants in all conversations in which the participant plays a conversational role.

9 Claims, 21 Drawing Sheets

METHOD AND APPARATUS FOR STRUCTURING AND MANAGING HUMAN COMMUNICATIONS BY EXPLICITLY DEFINING THE TYPES OF COMMUNICATIONS PERMITTED BETWEEN PARTICIPANTS

This is a continuation of application Ser. No. 226,727 filed Jul. 29, 1988 now abandoned also a continuation of Ser. No. 06/798,904, filed Nov. 18, 1985 now abandoned.

BACKGROUND OF THE INVENTION

1. Field of the Invention

This invention relates generally to methods for facilitating and managing communications between individuals who are involved in a community of action or purpose. In one sense, aspects of the invention relate to such fields as electronic mail, word processing, data base management and other methods for facilitating the transaction of business between individuals and the management of data and communications related to such transactions.

In another, more important sense, this invention is a pioneering one which establishes a new field of managing business, social and personal communications by integrating state of the art computer and communication tools and methodologies within a new conceptual and methodological framework: managing communications by treating them as moves in conversations in a structured context which encourages participants to carry out their communications in a more meaningful, organized manner and promotes completion of conversations to the satisfaction of all of their participants.

This invention is based on the development of a precise and rigorous language of distinctions which is valid for observation and interpretation of what is happening in the whole gamut of human conversation and simultaneously forms the basis for a method for supporting, enhancing, and coordinating human conversation which can be carried out in a variety of computer and communication system environments.

2. Description of the Prior Art

1. Electronic Mail

The earliest tools for generating utterances, including both spoken and written manifestations of language, were writing implements, from the quill to the typewriter, to the modern word processor. None of these devices operate in accord with what speakers do in language, that is, with what speakers expect or hope to accomplish with their utterances. They deal only with the form of utterances, as sequences of letters, figures, typographical marks, etc. There is no communication management, no helpful machine/human interaction which facilitates accomplishment of the purposes and goals of the communications being prepared.

Many devices have been invented for transmitting visible sequences of marks or audible sounds from one place to another, from the postal service to telephony, facsimile, and more recently, electronic mail systems.

A person who composes an utterance does so within a certain background of understanding as to what is being done. In the current prevalent practice in electronic mail, the relevant structure is the identification of sender and receiver and the times and places of sending and receipt, along with an unstructured natural-text phrase used by readers to identify and group the messages. The user of such a system is provided with choices of action that can be described in terms of this basic "who-where-when" structure. For example, the "Answer" option which is provided in many systems allows a response to be sent to the original sender, while "Forward" sends a copy of the message to a third party.

Some electronic mail systems incorporate various file management facilities such as assigning keyword attributes to files for automated retrieval, automatic aging of files to eliminate old messages, and sorting based on individual or combinational criteria such as sender, date, and the like. The effective use of these facilities is dependent on the ability of the user to integrate these facilities into a personal framework of organization of the work that the person does and the communications related to that work.

Electronic mail systems do not limit or structure the kinds of messages that may be sent, in accordance with either the content or context of previous messages. In particular, there is no assistance providing in structuring the flow of communications toward accomplishment of goals and results. The management of the communications is essentially left to the discretion and ability of the users of the system.

2. Computerized Procedure Management Systems (Systems for Managing Performance of Specified Tasks)

Some system designers have recognized the opportunity to use electronic computer and communication tools to facilitate and organize communications within organizations concerning standard procedures and standard forms. The simplest and most prevalent implementation of repetitive communications is with "forms" in the standard business sense. The existence of tools like a "purchase order" or an "invoice" derives from the existence of certain recurring communications (getting a supplier to send goods, requesting payment, etc.) in which the collection and transmission of relevant details has the same structure each time. Paper-based forms have been developed over centuries, and computer-based forms are prevalent in the current data-processing art.

In addition to standardized forms, there can also be standardized "procedures" in which a sequence of actions follows a regular pattern. For example, the standard procedure in a particular office on receipt of a purchase order can be to send one copy to the billing department, and on receipt of a credit authorization to send another copy to the shipping department. Such procedures have long been codified for human implementation in all kinds of organization.

Computer technology makes it possible to automate forms generation, processing and communication by embedding them as programs in data processing systems. Many computer systems, such as point of sale terminals, automated banking systems, inventory control systems, embody such procedures. A person using such a system communicates within the strict framework of the system and the limited options presented in accordance with the procedures embodied in the computer system. For example, on receiving a purchase order, a user's options may be to "send it through" or "refer it to accounting for a credit check."

3. Conversation Management Theory

In a 1981 Ph.D. thesis entitled "Management and Communication in the Office of the Future", Fernando Flores proposes a "theory of commitment and conversation" which "allows us to provide new guidelines for examining work in an office or organization." The thesis also contains suggestions for design of a prototype system for coordinating conversations based on a speech act model of conversations. This theoretical work provides a foundation for considering new approaches to use of electronic computer and communication technology to manage the flow of communications within a conversational network, but it does not provide a complete, practicable methodology for carrying out management of conversations.

The Flores thesis does not suggest an overall methodology which provides for managing conversations for declaring specific realizable possibilities as distinct from coordinating conversations related to commitments for some specific action. It does not address the concept of "permitted moves" in conversations of various types in various states with various starting and ending "incompletions" and depending upon the "role" of the participant. There are only limited suggestions in the Flores thesis of constructing and managing a data base of conversations and these do not provide a practicable methodology.

SUMMARY OF THE INVENTION

1. Objects of the Invention

It is the principal object of this invention to provide an improved method of managing communications between individuals.

It is another object of this invention to provide a method for managing conversations between individuals within a community of participants on the basis of a methodology which is structured but adaptable to different types and categories of conversations.

It is another object of this invention to provide a method for managing conversation for action of the request and offer type within a structured conversational protocol of permitted moves which comprise a highly useful level of modelling of business and social conversational interaction.

It is another object of this invention to provide a method for managing conversations which incorporates a number of convenient methodological tools for initiating conversations, selecting conversations for making moves, and tracking commitments and incompletions.

2. Features and Advantages of the Invention

This invention features a method for managing communications between individuals utilizing a programmed computer system. The method involves several definitional steps that are critical to achieving a practicable methodology for conversation management. Preferred implementations of these definitional steps lead to a breakthrough in flexibility and performance of methods for coordinating business and social communications. These definitional steps are the following:

a. defining all communications between a set of participants as moves in conversations for declaring specific realizable possibilities or as moves in conversations for producing actions to complete specific possibilities;

b. defining said conversations as taking place within a set of declared or understood domains of possibilities;

c. defining a set of conversational roles played by participants in said conversations, with each participant playing at least one conversational role in any said conversation;

d. defining a set of types of incompletions which occur recurringly within said conversations, including a first type in which a conversational move by at least one participant to declare at least one specific realizable possibility is missing, and a second type in which a conversational move by at least one participant to complete a specific realizable possibility is missing;

e. defining a set of types of permitted moves in conversations on the basis of said defined incompletions, said defined roles, and the specific types of incompletions produced by said permitted moves;

f. defining for each of said types of moves a set of associated data; and g. defining a conversation record format for said conversations comprising identities and roles of participants, incompletions, and a pre-defined body of data associated with each move of the conversation, including the type of move.

The integrated concepts of "moves in conversations" of two basic types (Conversation for Action and Conversation for Possibilities), conversational roles, types of incompletions, and logical/functional relationships between moves, incompletions, and roles, provide a set of constructs on which a powerful and practicable methodology for conversation management may be built. They provide a basis for defining a meaningful conversation record format which can be integrated into a conversation data base using standard data base building and management tools. More specifically, they are a foundation for establishing a conversation management program with powerful, yet easy to use features for initiating conversations, selecting and making moves in conversations, and automating conversation record management.

The basic methodological steps of the conversation management program of this invention comprise the following:

h. establishing a conversation management program for enabling interactive computer-controlled management of each of a plurality of said conversations including the steps of:

(1) providing facilities for use of each participant in opening a new conversation with an initial move and entering data associated therewith;

(2) creating a new conversation record for each said new conversation by assembling said entered data according to said conversation record format, including said incompletions produced by said initial move and said entered data, and storing said new conversation record in at least one file;

(3) providing facilities for use of each participant in selecting an existing conversation in which to make a move;

(4) deriving from said definition of types of permitted moves and said conversation record corresponding to said selected conversation the set of currently permitted moves consistent with the role of the said participant in said selected conversation;

(5) providing facilities for use of said participant in selecting and making a move from said set of permitted moves in said selected conversation, and entering data associated with said move;

(6) updating said stored conversation record associated with said selected conversation as said participant makes said permitted move, said updating including storing data associated with said permitted move and said types of incompletions produced by said permitted move; and (7) providing facilities for use of each participant to review new moves by other participants in all conversations in which said participant plays a conversational role.

A system for managing communications which incorporates the methodology of this invention provides a powerful framework for structuring human conversations. This framework facilitates more effective communication and leads to consistent achievement of results and goals. The methodology permits standard data base and file management technologies to be integrated simply and effectively into the organizing and structuring of conversation records for instantaneous retrieval of data which is critical to tracking the status of a conversation and any commitments to action which it involves. Participants using systems which incorporate the methodology of this invention are effectively enabled to organize virtually their entire flow of work, including the commitments which it involves, around the facilities which the conversation management program provides. This produces a coherent framework, leading to consistency and clarity in communications. The inevitable result is a dramatic overall improvement in productivity.

A preferred embodiment of the method of this invention includes a number of features which greatly enhance its utility to the participants in a conversational network. Preferably the step of defining permitted moves includes selecting a name for each move which distinguishes the character of the move to the community of participants involved. The permitted moves are displayed to the participant in a menu and selection is made from that menu. This provides direct coaching to the participant on the moves that can be made and facilitates meaningful and effectice move selection.

A further level of coaching on the meaning of the different permitted moves can be provided by help text associated with each move which can be accessed from the same menu display of permitted moves. The method of this invention further involves creating a body of recommended declarative text for each move which the participant may include in the message as part of the data elements of the move.

The method of this invention also features a variety of conversation data base access facilities using different record sort or collection criteria including the individual incompletions, the domains of the conversation, the participants, and dates, in cases where incompletion are recorded in the form of date tokens. These facilities make it convenient to extract lists of conversations, both for review of the status of the conversations and the selection of a conversation in which to make a next move permitted to that participant.

The method of this invention and the conversation record management and retrieval which it facilitates enables time and date commitments related to calendar activities, such as meeting schedules, appointments and the like, to be integrated into the data base. This data can then be extracted along with other commitments due on a particular date to produce an integrated display of all commitments associated with that date.

Other objects, features and advantages will be apparent from the detailed description given below of the method of this invention and embodiments of systems which incorporate the method of this invention.

GENERAL METHOD OF THIS INVENTION

Figure 1:
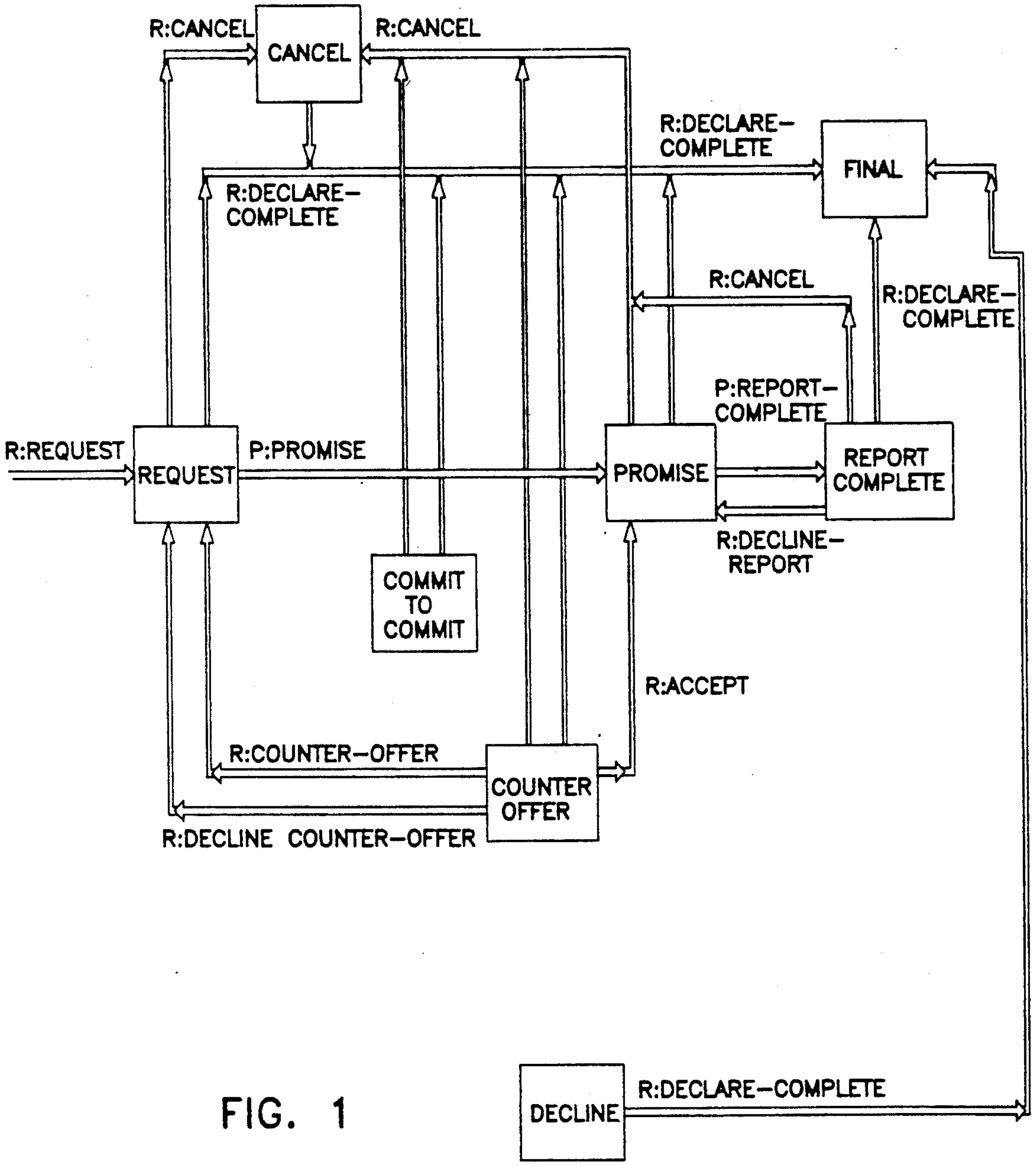
FIGS. 1-10 are schematic diagrams illustrating the structure and operation of a finite state machine implementation of a system incorporating the method of this invention.

This invention comprises a method for managing business, social and personal communications utilizing a programmed computer system. The method of this invention may also use electronic telecommunication apparatus in certain embodiments for carrying out the method in specific hardware environments. The method of this invention comprises a powerful, new management tool which can be configured in a variety of ways and with different degrees of complexity to achieve productivity increases and other advantages within the business and social environment of the participants using systems which employ the method.

An essential aspect of the method of this invention is the carrying out of certain definitional steps, some of which are configurable and adaptable to the particular culture or environment of the users/participants and others of which are fixed constructs of the method of the invention. The first of these steps comprises defining all communications between a set of participants as moves in conversations for declaring specific realizable possibilities or as moves in conversations for producing actions to complete specific possibilities.

"Participants" is used to denote individual persons, as well as, for example, individuals who may represent corporations, organizations, institutions, and groups who are involved in communication with and among each other. Within the context of this invention, it is understood that the participants have access to a programmed computer system which is carrying out the method of this invention. "Set of participants" is used in the mathematical sense of the term "set" with the understanding that there would be no meaning for a "null set," but that there is meaning for a set having one member. In other words, this invention encompasses a method of managing communications which one may have with one's self as well as communications with other persons. The importance and significance of this will be illustrated in the discussion of conversations with one role which is given below. "Communications" and "moves in conversations" have at least two dimensions which must be considered and discussed in connection with the method of this invention for managing communications. These constitute the systems dimension comprising transmission of symbols and the dimension comprising human communications in which possibilities for action are distinguished.

In the system dimension of telecommunications and computer technology used for building human communications systems, "communication" denotes the transmission of tokens and symbols, often called messages, from one location to another. This transmission may take place within a computer or database, or across geographical distances via various communication media.

In the other dimension, important to the definitional elements of the methodology of this invention, people produce possibilities for action, and the realization of those possibilities, for themselves and each other, in the conduct of their conversations. Here, based on rigorous observation of human conversations, "communications" refers to the phenomena of "speaking" and "listening" and the unquestioned interpretations that people make as they produce distinctions for themselves in conversation.

The term "moves" within the context of "moves in conversations" denotes a number of important constructs, all grounded in observations of possibilities and actions distinguished by participants in conversations. These observations of human communications provide distinctions which can be mapped to a language of definition for the elements, structure, and operation of communications systems for supporting and managing human conversation.

The term "conversations for declaring specific realizable possibilities" refers to conversations in which participants are seeking to reach common agreement or understanding of a result that can be achieved, some goal that can be attained, and/or some objective that can be reached. The communications involved in such conversations are not action-oriented, but are oriented toward speculation, refinement, assessment, and discussion of what results, goals, or objectives can be attained and of what actions might or must be taken to attain them.

A typical example might be a discussion between the President of a company and the Chairman of the Board of Directors about the desirability of expanding its business into a new product area, either by acquiring an existing business or alternatively by developing a new product directly. Neither participant is asking or expecting any specific action by the other in the initial conversation, except communications of what in ordinary parlance are referred to as "thoughts", "ideas", "feelings" and the like. The conversation conducted between the parties is regarded as a series of moves in a conversation, each of which move is, in the moment of its being made, relevant to the possibilities that the participants are concerned with developing or bringing forth in their conversation. The conversation itself is, without necessarily being specifically declared so, oriented to the goal of declaring specific relevant and realizable possibilities for subsequent action. We interpret the primary conversational moves in this type of conversation as consisting in assessments spoken and listened to by the participants of the directions open or possible for action, in speculation about alternative directions, and in the making of assessments about the declarations of possibilities made in the conversation.

The second construct, "conversations for producing actions to complete specific possibilities" (also called "Conversations for Action" or "CFA" herein), relates to communications which are oriented toward specific action. In the conversations, commitments to action are produced. The same company president might open a CFA with his VP of Research with a request that the VP provide an estimate of the cost of developing the new product internally. Here, a specific action or set of actions is expected, and not simply speaking in the conversation in the form of speculation or assessments, and certainly not communications of "thoughts" and "ideas".

It will be apparent that management and business conversations will sometimes involve both Conversations for Possibilities and Conversations for Action at once. The important consideration is that the basic methodology of this invention has the capability to handle these conversations and the different characteristics that each exhibits.

The second step is defining conversations as taking place within a set of declared or understood domains of possibilities. Again "set" is used in the mathematical sense with the understanding that there is meaning for one domain or plural domains of possibilities. "Domains of possibilities" is a construct that generically designates distinctions made by participants of related objectives, results, concerns, and the like. A lawyer might for example organize conversation in domains of possibilities designated with client names or specific litigation or contract negotiation projects. The company president mentioned above might assign the name "New product XYZ" as the domain of possibilities for the described conversations in which he is engaged.

The third step is defining a set of conversational roles played by participants in conversations, with each participant playing at least one conversational role in any conversation. "Set" is again used in a mathematical sense with the one member and plural member sets having meaning here. A "conversational role" is a construct which relates to a number of aspects of the conversation and the relationship of the participants to the purpose and meaning of the conversation. It is a contextual construct and may have connotations of authority or control, as will be discussed below. Role definition may depend on the type of conversation, the subject of the conversation, and the business or social culture in which the conversation is taking place. For convenience and expedience, the labels that are attached to roles may be somewhat arbitrary in some conversational contexts, but they will have meaning in the overall functioning of the method of this invention.

The fourth step is defining a set of types of incompletions which occur recurringly within conversations, including a first type in which a conversational move by at least one participant to declare at least one specific realizable possibility is missing, and a second type in which a conversational move by at least one participant to complete a specific realizable possibility is missing. The term "incompletions" is a notational construct which lies at the heart of the methodology of conversation management in accordance with this invention. It can be understood as missing elements such as "missing a response" or "missing the promised action" which are the fundamental ones of interest, but the construct is deeper and more general in that there may be other elements required to cause a transition in a conversation from something being incomplete to being fulfilled. There may be a series of related incompletions.

For example, the method of this invention could involve a series of actions which must take place over a period of time to complete an overall action—such actions could be delivering a contract due on one date, acceptance of delivery of equipment on another date, and payment for the equipment on a third date. The construct of incompletions can handle types of incompletions and plural incompletions of the same type related to a Conversation for Action.

Another step of the method of this invention involves defining a set of types of permitted moves in conversations on the basis of the defined incompletions, the defined roles, and the specific types of incompletions produced by the permitted moves. The "permitted move" concept lies at the heart of the method of this invention and the structuring of a system in which participants may construct for themselves conversations which are consistent with the possibilities and actions developed within those conversations in a meaningful way. "Permitted" here is used in the sense of constraint, that is the participants cannot make a move which is not permitted. Different types of conversations have different and particular incompletions and patterns of incompletions, and specific moves have the effect of completing those incompletions for participants in different roles. This will be clear from the examples given below.

Defining permitted moves is accomplished in a manner which fits the observational distinctions as they are applied to people's conversations about possibilities and taking action to complete possibilities. The richness and flexibility of the set of permitted moves can be "tuned" to the participants and the types of conversations in which they are typically engaged. There are, in accordance with this invention, certain specific protocols of permitted moves which are very powerful and adaptable to a wide variety of business or social cultures of participants. The method of this invention contemplates general purpose embodiments which involve standard sets of permitted moves and special purpose embodiments in which customized sets of permitted moves are defined to achieve special purpose conversations within a particular organization.

Another step of the method of this invention involves defining for each of the types of moves a set of associated data. The set of data may have one element or many. It may include text of the message associated with the move, dates and other data values associated with incompletions, and a variety of other and other data values associated with incompletions, and a variety of other data elements. This is an open-ended aspect of the invention, limited only by practicable considerations of management of such data elements.

Another step of the method comprises defining a conversation record format for the conversations comprising identities and roles of participants, incompletions, and a pre-defined body of data associated with each move of the conversation, including the type of move. The method of this invention contemplates building and maintaining a conversation data base. The defining of a conversation record format is an essential element of data base management, but there are many ways of formatting the records and the record elements that are involved in this invention.

In addition to the defining steps discussed above, the method of this invention involves the step of establishing a conversation management program for enabling interactive computer-controlled management of each of a plurality of conversations. One step of this program involves providing facilities for use of each participant in opening a new conversation with an initial move and entering data associated therewith. Some of the permitted moves defined are initial moves. Various approaches can be taken to providing this program facility to the participants for selecting an initial move. Any of the current standard approaches in the art may be employed: selection from menus, keystroke sequences, and the like. This step of the conversation management program, like the others, is relatively straightforward once the overall concept of the method of conversation management in accordance with the invention is understood.

Another step of the conversation management program involves creating a new conversation record for each new conversation by assembling the entered data according to the conversation record format, including incompletions produced by the initial move and the entered data, and storing the new conversation record in at least one file. The conversation management program of this invention may be viewed as a supervisory program which accesses the facilities of a standard database management program in unique ways to achieve a unique purpose.

The management of data elements relating to incompletions is a particularly important aspect of this invention. It should be understood that the data values of the incompletions could be various types. In many applications, the data values should take on dates or, more generally, times. However, there are applications where the values could be binary where the incompletion has no important relation to time. Some incompletions could have dollar values, others could have "mood" values or have values which are based on a mathematical function or formula or on authority relations among roles available.

The conversation management program includes the step of providing facilities for use of each participant in selecting an existing conversation in which to make a move. This can be implemented using any of the standard techniques for accessing stored records in the file or database of conversation records. It can involve sophisticated sorting routines with participant entry of sort criteria. This facility can also be integrated with the step of reviewing new moves which is discussed below. In other words, the participant may be provided with the facility to make a move in a conversation in response to a new move which has just arrived and is being reviewed.

A very important step of the conversation management program is the one which involves deriving from the definition of types of permitted moves and the conversation record corresponding to the selected conversation the set of currently permitted moves consistent with the role of the participant in the selected conversation. This can be done in a variety of ways and conveniently can be done by using look up tables together with steps which analyze the current incompletions to determine whether certain moves should be permitted to the participant. It should be understood that there may be some moves which are always permitted to each participant regardless of role or state of incompletions or other prior moves that have been made. A COMMENT move, for example, may always be appropriate in some embodiments, but there may be some applications in which the COMMENT move would not always be permitted.

The other basic steps of the conversation management program are relatively straightforward and need no amplified explanation beyond the discussion of their implementation in a specific embodiment which is set forth below. These steps are the following:

providing facilities for use of the participant in selecting and making a move from the set of permitted moves in the selected conversation, and entering data associated with the move;

updating the stored conversation record associated with the selected conversation as the participant makes the permitted move, the updating including storing data associated with the permitted move and the types of incompletions produced by the permitted move; and providing facilities for use of each participant to review new moves by other participants in all conversations in which the participant plays a conversational role.

While these steps are straightforward, that is only true because of the already defined relationship between the moves and the incompletions and the roles. The step of updating stored conversation records importantly involves manipulation of stored incompletions in accordance with the relationships previously defined.

The term "new move" is used to denote a move that is newly coming to the attention of the participant to which it is directed. Once the participant has reviewed that move, it becomes the latest move in the conversation in which it was made. Thereafter it is retrievable using the conversation and move retrieval facilities which are also provided in accordance with the method of this invention.

EMBODIMENTS OF SYSTEMS INCORPORATING THE METHOD OF THIS INVENTION

The current embodiment, Version 1.5 of The Coordinator system (made available in both English and Spanish languages), is a system for managing business, social, and/or personal communications. The current embodiment is programmed to operate on IBM PC-XT-compatible personal computers. Each participant in a conversation works at such a personal computer, each operating a copy of the programs for The Coordinator system. Data communications among the personal computers operated by participants are through standard voice-grade phone lines and commercially-available local area networks. More than one participant may at different times work on the same personal computer, and may engage in conversations with themselves or others working at a single personal computer or at a plurality of personal computers.

a. Defining Communications as Moves in Conversations

With The Coordinator system, communications take place between a set of participants and are defined, interpreted by the programs, and understood by the participants as moves in conversations where participants making moves in conversations are:

(1) declaring specific realizable possibilities—producing in the conversation specific distinctions regarding possibilities that might be realized, and producing distinctions regarding actions that might be taken to bring those possibilities about; and/or (2) producing in their conversation actions to complete the specific possibilities that have been declared.

The basic unit of interaction in The Coordinator system is the conversation. All communications between individuals are defined as moves in conversations. In this description of the embodiment the word "move" refers to a single communication event consisting of a participant "speaking" (in text) to another participant, together with the opportunity of all current participants to listen to the speaking of the first participant and themselves to speak according to the moves given to them.

Conversations are constituted of moves interpreted by the participants to have a unity—a conversation begins when a participant "opens" a conversation with a move, proceeds through other moves by the participants in the conversation, and is "closed" in the moment that a participant with the authority in the conversation declares the possibilities of the conversation realized, or declares the conversation closed with possibilities unrealized.

Conversations in The Coordinator system are divided into two categories: Conversations for Possibilities and Conversations for Action. There are two types of Conversations for Action, called "REQUEST" and "OFFER" (both of which are conducted with other participants), and one sub-type, those conducted with oneself, called "promise to myself". There is one type of Conversations for Possibilities, those conducted with other participants, and one sub-type, those conducted with oneself.

Table 1 shows a facsimile of the menu presented by The Coordinator system to a participant in the moment that the participant indicates that he wishes to open a new conversation. In the column on the left are presented options for beginning the defined Conversations for Action of two types, shown as "Request" and "Offer", and the option for opening a Conversation for Possibilities is shown as "Declare an opening." To select an option in this embodiment, a participant manipulates the "cursor" on a video screen until the cursor is located on the desired option, and then presses the "enter" button on the keyboard. The options shown in the right-hand column will be introduced later in this description.

b. Conversations Occur within Domains of Possibilities

Each conversation within The Coordinator system takes place within one or more declared or understood domains of possibilities. The Coordinator system includes facilities for declaring domains of possibilities. Whenever a participant initiates a conversation, The Coordinator system presents a menu listing the names of domains he has already declared open for conversations, from which the participant may choose the domain of possibilities that he declares for the conversation. Table 2 shows a facsimile of the type of menu The Coordinator system presents to a participant, containing the names of a number of domains declared by an actual participant using the system over time. The "null" domain, called "none" in the Table, is provided automatically; the participant himself declares all other names that will appear in the menu. As with the previous description of a menu, a participant will place the cursor on the name of the domain in which he will open his conversation and presses a key to select that domain.

At the time of opening a new conversation, a participant may also add a new domain to the list of declared domains and then may select that newly-declared domain as the domain of possibilities for the conversation. Further, each time the participant makes a move, The Coordinator system gives the participant the opportunity to re-name the domain in which a conversation is being conducted.

When a participant initiates a Conversation for Action, "domain" refers to the domain of possibilities in which a participant declares a specific possibility that he will complete with actions that will occur in the conversation.

The method of the invention makes a number of distinctions that are not normally made in peoples' understanding of what is happening in conversations. An example will help clarify the several distinctions of domains, possibilities, specific realizable possibilities, declared possibilities of actions to complete specific declared possibilities, etc.

To illustrate, we describe the following move of a "Mr. Smith." In a domain of possibilities Mr. Smith has called, "career", one day he declares the specific, realizable possibility of "learning about accounting", and makes that declaration as he is making the move of requesting admission to an upcoming night school course (which move of making a request is an action in the conversation that has the possibility of completing the specific declared possibility of learning accounting at some date in the future).

When a participant initiates a Conversation for Possibilities, it is the domain of possibilities in which the participant will declare and define specific realizable possibilities in the conversation.

For the participant, the domain of possibilities is the "senior" declaration of the conversation—it is the participant's name for that domain of possibilities for the sake of which the participant makes requests, promises, assertions, and declarations in the conversation.

Domains of possibility are specific to individual participants in conversations. When one participant names a domain, each other participant in the conversation may "adopt" the same name or give a different name for the domain. For example, a lawyer preparing a patent filing may open a Conversation for Action of the REQUEST type with a client, "Jones", and give the client's name as the domain of possibilities for the conversation. When Jones reads the request, it will make no sense to adopt the name, Jones as the name of the domain.

For Jones, however, an appropriate name to declare for the domain may be "patent", for example. Thus each conversation occurs within at least one understood domain of possibilities, and often the domain of possibilities will be different for different participants in the conversation. Also, the domain of possibilities may change for a given participant as the conversation progresses.

The Coordinator system can present to a participant all his conversations in any domain he has declared. When a participant reviews a conversation, The Coordinator system presents facilities to change the declared domain of the conversation. These features are described later in this document.

c. Participants Play Conversational Roles

In these conversations through The Coordinator system, each participant plays at least one of a set of defined conversational roles. In the current embodiment, three roles are defined—requestor, promisor, and observer. Different participants enter conversations in different roles as they are (1) "addressed" by other participants as they start conversations, and (2) as participants in existing conversations include additional participants as observers in those existing conversations.

The actual "act" of "addressing" a communication to a participant in The Coordinator system is illustrated in Table 3, which shows a facsimile of the menu which the system presents to a participant for addressing his communication to someone in a Conversation for Action. This menu is presented by the system immediately after a participant has selected a domain for a conversation he is opening. Notice at the top of the menu the text, "Skip 'To:' to select addressee from list'. This informs the participant that if he does NOT stipulate an addressee in the "To" field of this menu, The Coordinator system will present to him a list of all the participants who he has declared himself to be in day-to-day conversation with through The Coordinator system. (This act of declaring participants with whom a participant is in regular conversation is done with tools described at "Network of Help" in Section j.) Notice the field labeled "Action:". This field is presented for the participant to begin the declaration of a realizable possibility in this conversation. We will say more about this later. The field, "Send copies?", is for defining observers to this conversation, if any. When the participant has filled in the menu, he selects "<Done>".

If, as described above, the "To:" field is left blank, The Coordinator system will next present a list of possible participants for the conversation in a menu of which Table 4 is a facsimile. Here the system lists, in a form defined by the participant, the names of those participants with whom he is in daily communication. The first name, at the top of the left column in this case, is the name of the participant currently working at The Coordinator system, which is necessary insofar as this embodiment may be used for conducting conversations with oneself which are supported by the system. The Coordinator system will allow selection of a single name from the list in this menu.

If the participant has selected "Send copies?", and thereby will be including observers in the conversation, The Coordinator system will next present the menu of which a facsimile is shown in Table 5, containing the names of participants available to this participant to observe this conversation. By selecting more than one name on this list, and through various tools for making and presenting lists of participants, very large numbers of participants may be included in conversations as observers.

One of the more important features of the observer capability in this method, however, has to do with a case where there is only one observer who is a manager is included as an observer of conversations being conducted by subordinates, which thereby gives to the subordinates the capacity of giving reports to the manager without actually doing the separate act of reporting, because the manager is able to observe the business conversations in which they are engaged. In this manner, the manager is not required to engage in any conversations except when, in the process of observing, he may elect to intervene in such conversations.

The Coordinator system distinguishes the above mentioned three different types of conversational roles in conversations. A participant has the role of REQUESTOR when he opens a REQUEST Conversation (a Conversation for Action of the REQUEST type), or when he makes an opening declaration in a Conversation for Possibilities, or when he is the primary addressee of the opening of an OFFER Conversation (a Conversation for Action of the OFFER type) opened by another participant.

A participant has the role of PROMISOR when he opens an OFFER, or when he is the primary addressee of a request in a Conversation for Action of the REQUEST type, or when he is the primary addressee in the opening declaration in a Conversation for Possibilities.

A participant has the role of OBSERVER if he participates in any conversation and does not play either the role of requestor or that of promisor. In the balance of this description we will use the phrase "primary participants" to distinguish conversational participants in the roles of requestor and promisor.

d. Conversations have Recurring Incompletions

The Coordinator system embodies a method that defines a set of types of incompletions which occur recurringly within conversations, including a first type in which a conversational move by at least one participant to declare at least one specific realizable possibility is missing, and a second type in which a conversational move by at least one participant to complete a specific realizable possibility is missing.

The first type of incompletion is referred to as "missing response". Conversations for Possibilities are conversations for declaring specific realizable possibilities. "Missing response" is defined as a type of incompletion that occurs recurringly in all such conversations. In this definition, as participants in a Conversation for Possibilities converse with each other, the most common incompletion—at any moment after the conversation has been opened, and continuing to the moment that the conversation is declared complete—is the missing declaration of the participant next due to speak.

Conversations for Action are conversations to produce actions to complete specific possibilities. The incompletion, "missing response" occurs recurringly in such conversations. Beginning with the opening of a conversation, and continuing until the conversation is declared complete, at each moment some participant is missing some participant's declaration (and sometimes the missing declaration is the participant's own).

For example, when a speaker opens a Conversation for Action, he declares a realizable possibility for himself (at least), and moves in a way defined so as to be consistent with producing action to complete that possibility. The primary addressee of the opening move of such conversations is prompted by that move to distinguish a specific realizable possibility for himself and to respond to the opening move either by declaring for himself the possibility of realizing the declared possibility of the conversation, or by declaring that he will not declare such a possibility for himself.

The opening move of a Conversation for Action (and also of a Conversation for Possibilities) thus produces an incompletion of the first type—the participant opening the conversation is missing a response from the primary addressee.

The second type of incompletion is referred to as "missing fulfillment". The fulfillment that is missing is the declaration of fulfillment of an action to complete a specific realizable possibility declared in the conversation.

The second type of incompletion appears in Conversations for Action, beginning with the opening move of such conversations, and normally remains present for at least one of the participants for as long as the conversation remains "open" (i.e., has not been declared complete).

Since a Conversation for Possibilities is defined not to be a conversation for the completion of specific realizable possibilities, the missing fulfillment type of incompletion is not defined to occur recurringly in such conversations.

Participants in conversations make moves to complete incompletions—as they participate in conversations in which a realizable possibility is being declared, and conversations in which actions are being taken to complete such declared possibilities. As they make moves, incompletions may be completed, and new incompletions may be created. So long as incompletions are present in a conversation, that conversation is said to remain "open". When a conversation no longer has incompletions declared within it, then that conversation is said to be "closed" or in the "final" state.

"Tokens" are defined in The Coordinator system to distinguish the dates declared for completion of incompletions in conversations. These tokens represent dates by which either missing declarations (called "responses") or fulfillments of declared possibilities (called "fulfillment") have been declared by participants in a conversation to be completed.

Each of the primary conversational roles, requestor and promisor, has five tokens associated with it—two response and two fulfillment tokens, and an alert token ("alerts" are described below). That is, the requestor and the promisor in a conversation each have associated with them one token for each of requestor's fulfillment, requestor's response, promisor's fulfillment, promisor's response, and each has one alert.

With these tokens it becomes possible to answer questions of the sort, By when is the next move in the conversation to be made? Who is to make that move? When is (this) request or promise to be fulfilled?

So, for example, in the (fictitious) case that all possible incompletions were simultaneously recorded for both a requestor and a promisor in a conversation, the full set of recorded incompletions would be:

requestor is missing requestor's response
requestor is missing requestor's fulfillment
requestor is missing promisor's response
requestor is missing promisor's fulfillment
requestor is missing alert
promisor is missing promisor's response
promisor is missing promisor's fulfillment
promisor is missing requestor's response
promisor is missing requestor's fulfillment
promisor is missing alert.

Tokens are stored with conversation records, and are recorded as either present or absent. If the token is present then it specifies a date associated with the completion of an incompletion in the conversation.

Each participant in an open conversation, playing any defined role in that conversation, may at any time declare for himself another type of incompletion called "alert". Alerts are private declarations, having no effect on the current incompletions of the conversation as a whole, nor on the incompletions of any other participant in the conversation. An alert is the declaration that the participant making the declaration is missing an "alert" by The Coordinator system to that participant and to be completed at a date specified in the token representing the incompletion of the alert.

The incompletion, "alert", is the only incompletion which may be declared by an observer in any of the categories of conversation defined in The Coordinator system.

The primary method of presentation of tokens to participants for declaration of dates for completion is illustrated in Table 6, where will be found a facsimile of the menu presented to a participant in the moment that he selects a function key representing the option, "commit", meaning that the participant has completed composing the text of his declaration of possibilities or specification of an action to complete a realizable possibility. The specific menu illustrated is from an opening move in a Conversation for Action, which can be deduced by the fact that there are fields presented for the participant to enter tokens of all three types described above: a token (date) for fulfillment of a possibility, called here "Complete-by", a token (date) for declaration of realizable possibilities, called here, "Respond-by", and an alert token.

The system presents to the participant those particular fields corresponding to incompletions that will be present in the conversation immediately following the move the participant is currently engaged in making. A participant using the system enters a date in each such field that he determines will support the completion of the incompletion indicated. For example, in some conversations with colleagues it is not necessary to distinguish a particular moment when a response will be desired IF we are in daily conversation with each other and have standard practices with each other regarding how quickly we will "get back" to each other. On the other hand, for example, if the present conversation being opened is a very urgent matter, entering "tom" in the "Respond-by" field (which the system will automatically translate to tomorrow's date) will be a convenient warning to the addressee that this matter calls for unusual response. There are no requirements or prohibitions about such entries in The Coordinator system; only recommendations of effective practice are provided here.

While entry of dates to accompany tokens by a participant is optional, in fact The Coordinator system is programmed to declare (on behalf of the participant) a specific incompletion date for any incompletion produced by a participant move where the participant does not himself make such a declaration. The dates declared by The Coordinator system for completion of participant incompletions are far future dates, so that they will not operationally interfere with current calendars or other displays of incompletions.

e. Conversational Moves in The Coordinator System

In The Coordinator system, three complete sets of types of permitted moves in conversations are embodied, one set each for each of the three categories of conversation it will manage—Conversations for Action of types OFFER and REQUEST, and Conversations for Possibilities. These moves were defined on the basis of the recurring incompletions in conversations described above, and the roles of requestor, promisor, and observer.

In the following and the accompanying Tables and Figures, these sets of moves are described in terms of the incompletions and roles upon which they are based. The types of incompletions each move produces are also described.

(1) Example of Definition of Initial Conversational Moves

In the moment before a participant initiates a conversation the conversation does not exist, and consequently there can be neither declared possibilities, nor declared incompletions in records in The Coordinator system. The initial move in any type of conversation will at least declare some possibility and create some incompletion.

For example, a participant discovers that he must prepare a report at the end of the week, and, seeking help in preparing the report, opens a Conversation for Action of the REQUEST type with a colleague (e.g., "Please come to my office Thursday at 4 pm").

This move is constituted, (in the language of distinctions of the method of the invention) of (1) a declaration of a specific realizable possibility—which is the possibility of the fulfillment of the request itself (and, there may have been an explicit, prior Conversation for Possibilities in which the realizable possibility of this request was defined), and (2) a declaration of specific action(s) for realizing the specific possibility—namely, that the promisor fulfill the requestor's request.

In the terms defined in the previous section on incompletions, then, the requestor creates for himself, in opening the request, the following incompletions:

the requestor's fulfillment is missing—that is, he has declared the possibility of the request, and until he says it is fulfilled, it is incomplete; and the promisor's response is missing—that is, the requestor has made a serious request to someone with whom he has previously agreed to be in conversation, and until the promisor makes some move in the conversation opened by the requestor, the requestor is missing "hearing from the promisor", which means specifically that he is missing whatever declaration the promisor will make in response to the request is missing.

In the moment that a participant (in this case, let us say it is a different participant, although it need not be in The Coordinator system), playing the role of the promisor, reads this request, that the promisor then also has two incompletions, corresponding to those of the requestor:

the promisor's response is missing; and the requestor's fulfillment is missing.

The promisor's own fulfillment is not missing: he has not yet declared for himself any possibility of declaration or action in the conversation.

(2) Example of Definition of Subsequent Conversational Moves

In the current embodiment, moves subsequent to the initial moves in conversations are defined for the purpose of allowing the participants, playing their conversational roles, to declare possibilities, to complete incompletions and to realize the possibilities declared in the conversations.

Let us examine the definition of some moves. For example, here, after the opening move of "request" we have introduced the situation where the requestor is missing the requestor's fulfillment the promisor's response
and the promisor is missing
the requestor's fulfillment
the promisor's response Let us first define moves for the promisor. One possible move is to have the promisor respond to the requestor and take on as his own the requestor's declared possibility. (For example, "I'll be there at 4 as you ask.") In the moment of declaring for himself the possibility of the requestor, the promisor is now missing his own—the promisor's—fulfillment, which corresponds to the requestor's fulfillment, which the promisor is also still missing. We will call this move, "promise", and we see that in the moment that the promisor makes the move his incompletions in the conversion change to:

the promisor is missing
the requestor's fulfillment
the promisor's fulfillment

Then, in the moment that the requestor reads the response of the promisor, his incompletions also change, to:

the requestor is missing
the requestor's fulfillment
the promisor's fulfillment

Another possible move for the promisor would be to declare that what is a possibility for the requestor will NOT be a possibility for him. (For example, "Sorry, I am out of town all day Thursday.") We will call this move, "decline", and we see that in the moment that the promisor makes the move his incompletions in the conversation change; we might say that he no longer has any incompletions in the conversation. What the requestor proposed as possibilities for the promisor, the promisor has not declared for himself. On the other hand, in defining the moves in the current embodiment, the inventors specified that after making a decline, the promisor would in fact be missing the requestor's response—that due to the way in which people normally work together, such a conversation generally will remain incomplete for the promisor until he has heard that the requestor has listened to the promisor's decline. In the moment that the requestor reads the decline of the promisor, his incompletions change to:

the requestor is missing the requestor's fulfillment, and
the requestor is missing the requestor's response.

That is, the requestor still has a declared, realizable, and unrealized possibility—the report due at the end of the week—preparation of which was to have been fulfilled by the action requested—the assistance of a colleague on Thursday. The request will not be fulfilled; however, the possibility in which the request originally arose is still present until declared complete by the requestor, and the conversation remains open with the incompletion of the requestor's fulfillment, awaiting other action from the requestor.

Now let us look for a moment at the definition of moves for the requestor, beginning at the moment immediately after the request has been made. At this point, the requestor has two incompletions: his own fulfillment, and the promisor's response.

One move would be for requestor to declare that he was no longer incomplete in regards to his own fulfillment, independent of declared actions by the promisor. This would be appropriate if, for example, he were to realize that the report he prepared last week for his own thinking is exactly what the boss now is asking for. ("Cancel Thursday—I just realized I've already done the work!") We call this move "cancel". After making the move, the requestor is still incomplete, missing the promisor's response to this new declaration of no possibility where before there was a possibility. On reading the requestor's cancel, the promisor is no longer missing the requestor's fulfillment—attendance Thursday is no longer a declared possibility for the requestor. However, in the definitions in the current embodiment, the promisor is still missing his own (the promisor's) response in the conversation, an incompletion defined so as to take account for the fact that a requestor's act of cancellation alters the promisor's possibilities. For an example of one case of the working of this particular definition, consider the case where, on reading the request for the Thursday meeting, the promisor immediately cancels his own previously scheduled out-of-town trip so as to be available to the requestor, and, now that the requestor has cancelled, and the promisor is not able to re-schedule the trip. Then the conversation remains open until the promisor declares it complete, whereas before the requestor's cancellation, declaration of completion by the requestor would have removed all records of incompletion in the conversation and so closed it.

(3) Types of Permitted Moves

For each type of conversation in The Coordinator system we define a set of permitted types of moves on the basis of recurring incompletions and the roles defined for participants in the conversation to play.

The types of permitted moves are first defined in terms of the logical method,

"Define a case in which defined incompletions (a,b,c, . . . > occur in a conversation of type <A>;
assess the combination of those incompletions with the role of <role type>;
define types of moves <1,2,3, . . . > that will be permitted in such circumstances in such types of conversations (where "circumstances" is determined by type of conversation, current incompletions, and conversational role);
and, given that a participant makes that type of move, define the completions, remaining incompletions, and new incompletions, of types <x,y,z, . . . > that will be produced by the participant making the move."

Tables 7 through 10 contain descriptions of all the moves defined in The Coordinator system, according to this definitional notation. In addition, later in this section, under "Conversational States", we present these moves a second time, in terms of the development of programs and computational and database "machinery" developed for implementing the method in a practical communications system.

(4) Conversational States

For the programming of the current embodiment the programming notational convention of naming "States of Conversations" was adopted. The notation is used in this way: a series of States, corresponding to general conditions of incompletion found recurringly in conversations, is named. Then, based upon the incompletions found in those states, rules are developed about what roles may be permitted what moves at that state.

This allows the definition and storage of sets of permitted moves in data structures called "finite state machines". The data elements included in these data structures are:

the number of states for each category of conversation;
for each state the name of the state and the number of permitted moves;

for each move the role of the participant that can make that move, the state to which the conversation will change after the move, and the token manipulations associated with the move.

For each category of conversation The Coordinator system defines a set of conversational states.

The states defined for a conversation for possibilities are:
open; and
final.

The states defined for the Conversation for Action of the REQUEST type are:
request;
commit-to-commit;
promise;
counter;
report;
decline;
cancel; and
final.

The states defined for the Conversation for Action of type OFFER are:
offer;
commit-to-commit;
accept;
counter;
report;
decline;
cancel; and
final.

The states defined for the Conversation for Action with one role are:
promise; and
final.

(5) Finite State Machines

Each conversational state then serves as a locus of definitions of sets of permitted moves and incompletions for conversational roles. Once itself defined, a finite state machine defined in terms of these states can be used to determine the permitted moves for every state and for each role that a participant may play in a conversation. As will be shown in detail, requestor and promisor have different permitted moves in any particular state of a conversation.

The following discussion will refer to FIGS. 1 through 10, which illustrate the overall structure and principles of construction of finite state machines (hereafter also referred to as "FSM") in The Coordinator system. In all of these figures, the state-transitions produced by permitted moves for the role of REQUESTOR are shown with double lines, and permitted moves for the role of PROMISOR are shown with single lines. (Permitted roles for OBSERVERS are shown in a separate Figure.) "States" themselves are identified in the Figures by rectangular boxes containing the name of a state, to and from which lines representing state-transitions travel. The names of the moves are shown accompanying the lines, with the notation "R: . . . " to indicate a REQUESTOR move, or "P: . . . " to indicate a PROMISOR move.

Figures 5, 6:
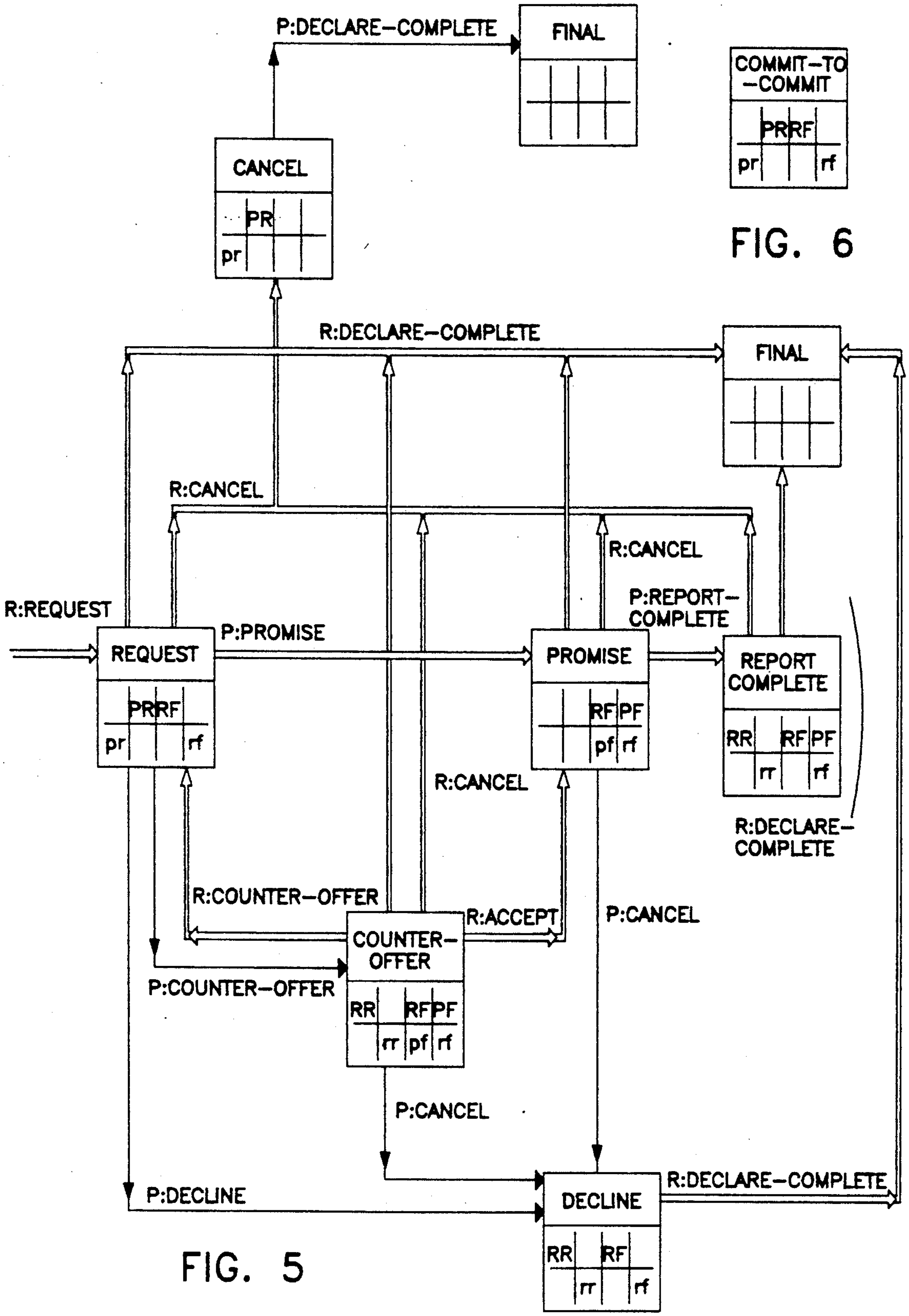
Figure 7:
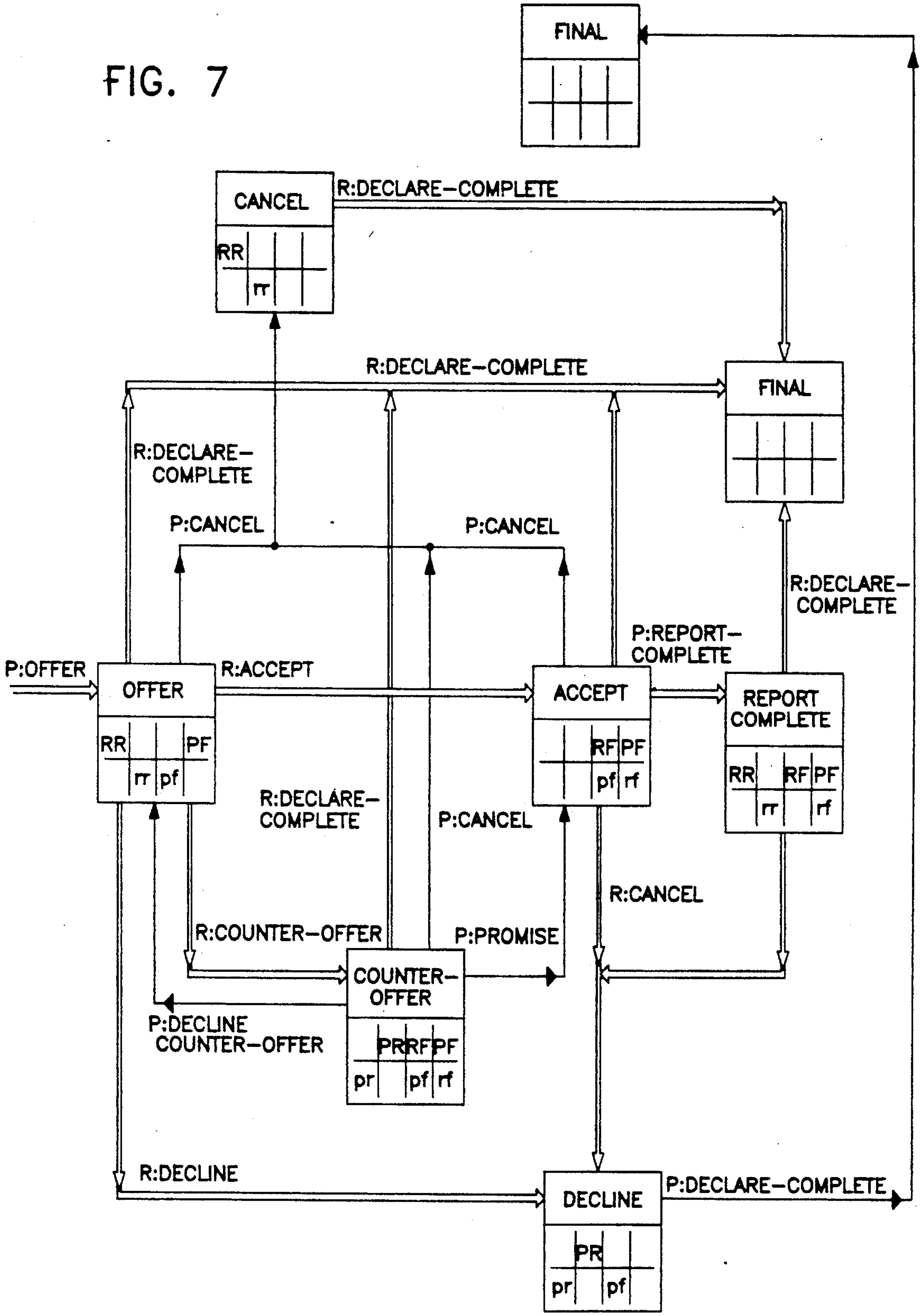

FIGS. 5, 6, and 7 also include notation to describe the incompletions and tokens representing incompletions at states in conversations. The token notation will be described later in this section.

(5a) Permitted Moves for REQUESTOR in REQUEST Conversations

Let us begin to examine the finite state machines by looking at FIG. 1. FIG. 1 shows the outline of the finite state machine for the REQUESTOR's moves in a Conversation for Action of the REQUEST type. In The Coordinator system, such conversations are opened by the move called "Request", made by a participant who takes on the role of REQUESTOR in the conversation in the moment of opening the conversation.

Notice the darker line beginning in the left center of the Figure. For each Figure describing a FSM for a conversation of the Conversation for Action category (for example, FIG. 1), a darker single line will be found that traces a set of "basic moves" through the conversation—the path of progression through conversation states which traverses the minimum number of steps if no major changes occur to the realizable possibilities within which the conversation was begun. In FIG. 1, for example, illustrating the FSM for Conversations for Action of the REQUEST type, the basic moves are:

requestor makes request (for example, "Jones" asks "Brown" to prepare an agenda for a meeting three days hence);

promisor makes promise (Brown replies that he will do it);

promisor makes report-complete (Brown delivers the agenda to Jones);

requestor makes declare-complete (Jones says "Thank you").

FIGS. 1 and 2 and FIGS. 3 and 4 are paired with each other. The first pair represent FSMs for REQUEST conversations, and the second pair represent FSMs for OFFER conversations. The first Figure of each pair shows permitted moves for the role of REQUESTOR, plus the "basic moves", and the second of each pair shows the moves for the role of PROMISOR. The descriptions of permitted moves within FSMs are separated in this manner—one role to a Figure—to make them easily readable.

Although the FSMs illustrated in these Figures may be referred to as a "protocol" of conversation, notice that crucial moves for dealing with incompletions, changing circumstances, and changing assessments of the possibilities to be realized in the conversation are present all the time. For example, in FIG. 1 the REQUESTOR is permitted to declare-complete, and permitted to cancel, at any moment after opening the conversation. For example again, in FIG. 2 it can be seen that the PROMISOR has the same freedom to (a) decline the initial request, or (b) to cancel his promise at any moment after opening the conversation. In these ways it may begin to be apparent how this method of defining a system for supporting communications and conversations provides fundamental differences from "protocol-generating" communications methods.

Other features worthy of note include the state, "commit-to-commit" and the accompanying type of move of the same name, appearing in each of FIGS. 1 through 4, which permits participants to declare an incompletion in a conversation without declaring any specific realizable possibilities for himself or for other participants in the conversation until such time as the participant is in condition to make such declarations. This move and state, which are not essentially part of the minimal embodiment of the method, is found in The Coordinator system, and represents an example of the type of refinement of conversational support possible with this method. Another move of similar character, in that it "tunes" the system to particular conversations, can be seen in FIG. 1 in the definition of the "decline-report" move: in the state "report-complete" a requestor can make a decline report move that moves the conversation back to state promise.

(5b) Permitted Moves for PROMISOR in REQUEST Conversations

Figure 2:
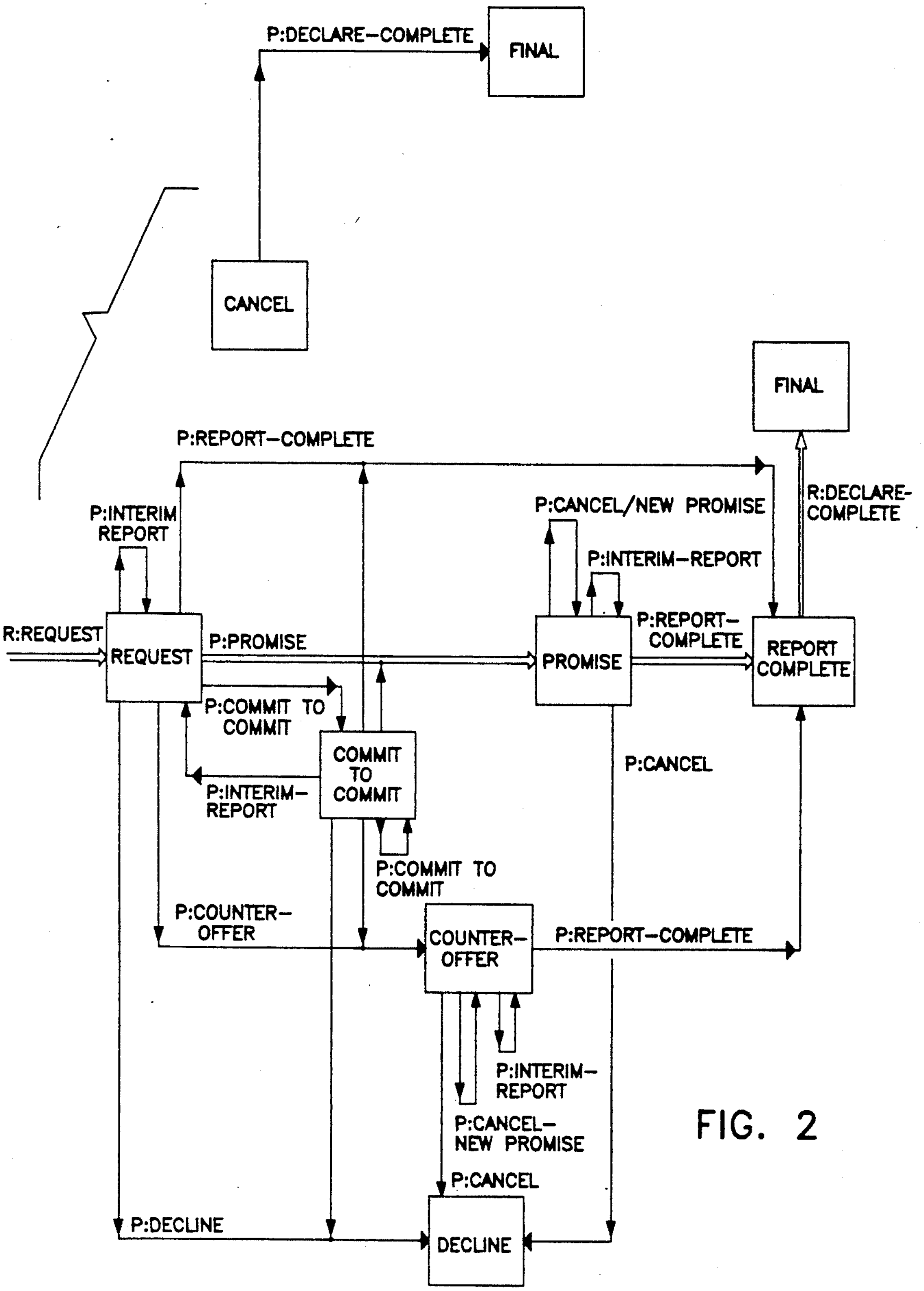

FIG. 2 illustrates the FSM state machine for PROMISOR's moves in a Conversation for Action of the REQUEST type.

(5c) Permitted Moves for REQUESTOR in OFFER Conversations

Figure 3:
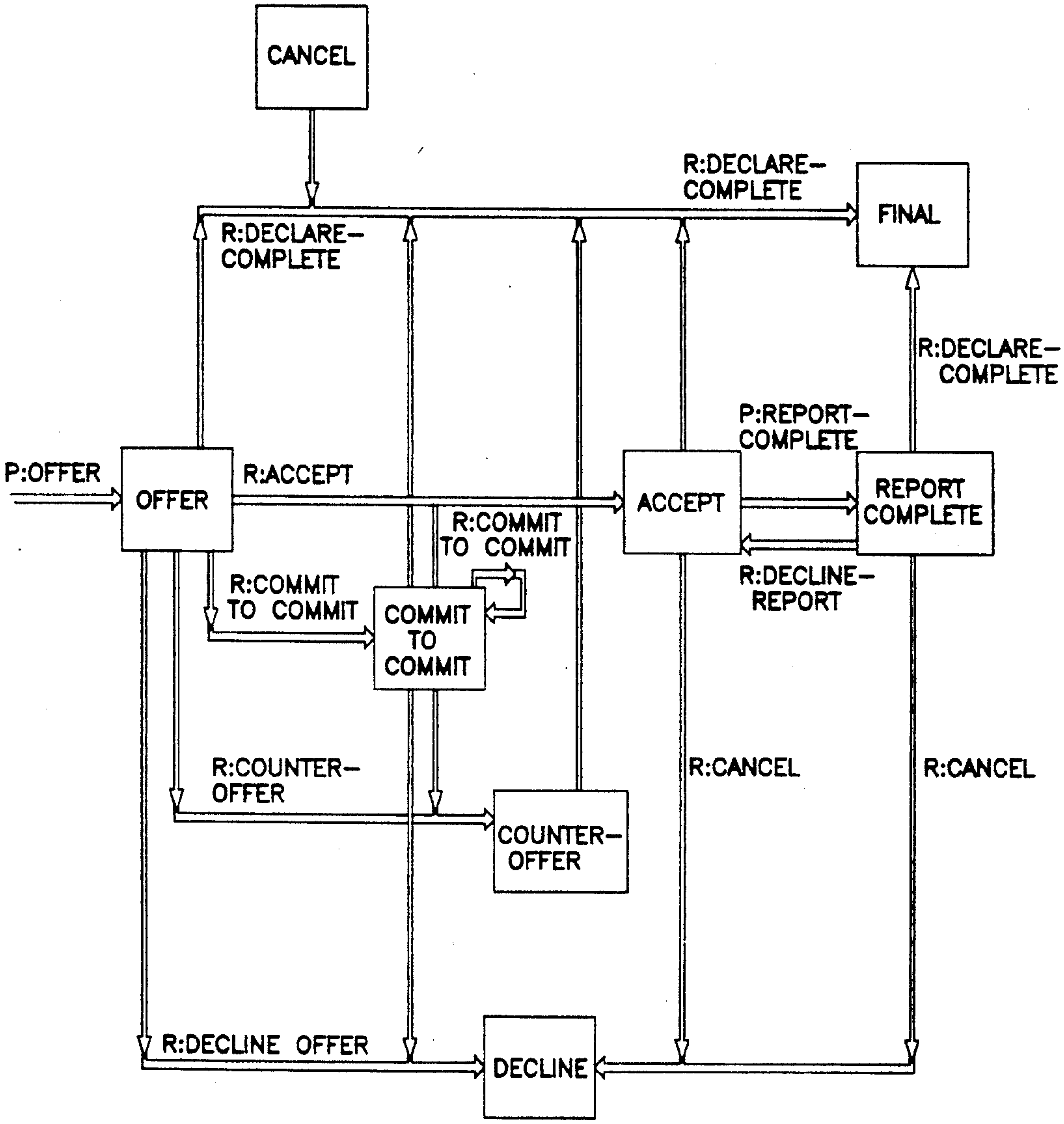

FIG. 3 illustrates the FSM for the REQUESTOR's moves in a Conversation for Action of the OFFER type. In The Coordinator system such conversations are opened by a PROMISOR, who takes on that role in the conversation in the moment that he opens it. The next Figure shows the PROMISOR's moves.

(5d) Permitted Moves for PROMISOR in OFFER Conversations

Figure 4:
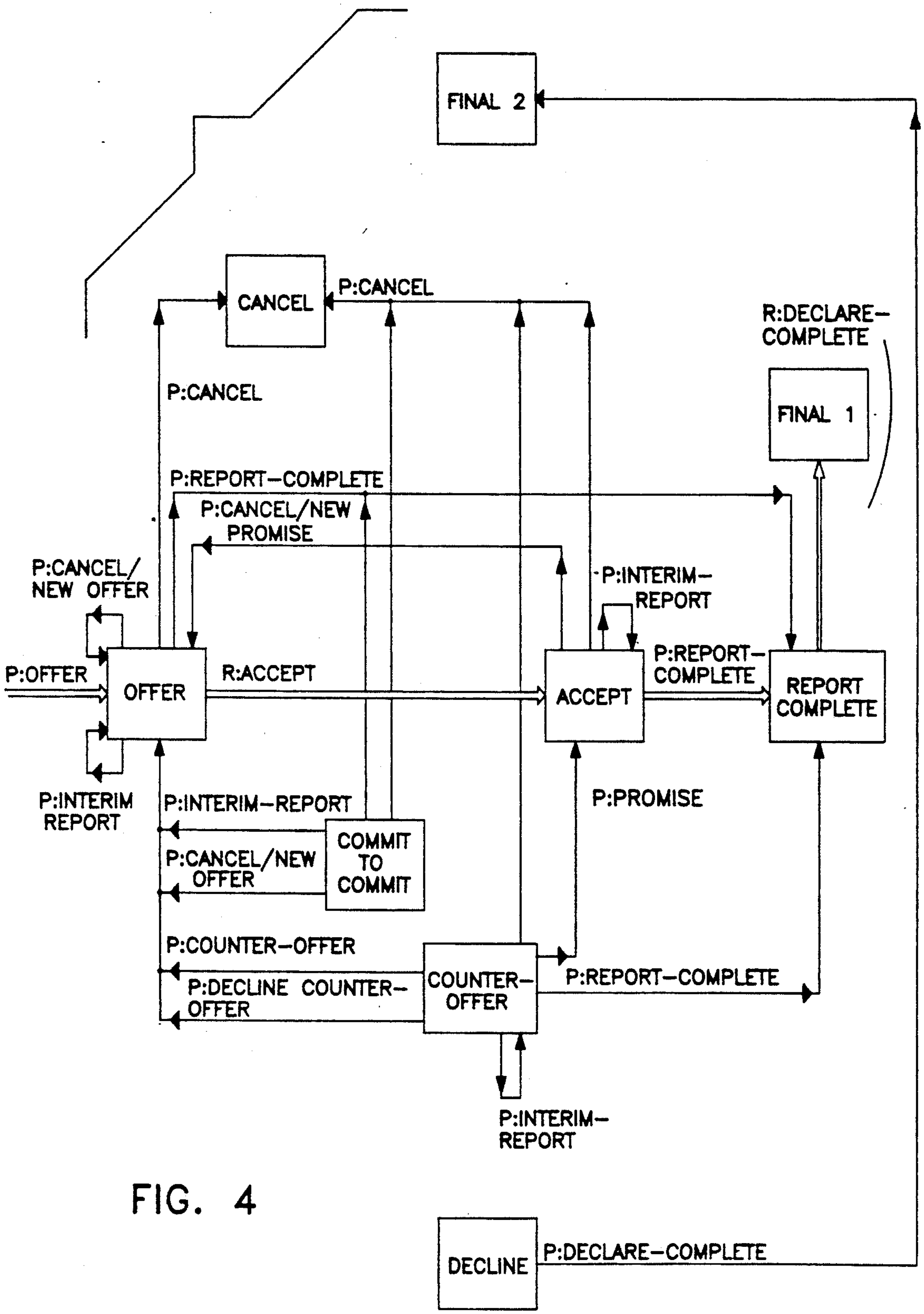

FIG. 4 illustrates the FSM for the PROMISOR's moves in a Conversation for Action of the OFFER type.

(5e) Incompletions at States in Conversations for Action

FIGS. 5 and 7 show the minimum essential set of moves and states for REQUEST and OFFER types of conversations. Not shown in these two Figures is the Commit-to-Commit state, nor are the moves of commit-to-commit, interim-report, decline-report, or cancel/-make new promise. These two figures also illustrate the incompletions and tokens representing incompletions at states in conversations. The incompletions of the Commit-to-Commit state in a REQUEST conversation are illustrated in FIG. 6.

We now describe the notation of representation of tokens representing incompletions in FIGS. 5 through 7. Each token of incompletion is represented by two letters. There are illustrated in the Figures a total of four tokens for a requestor and four for a promisor in every state—not all of which will be present in any state. In each box representing a state, the requestor's tokens appear on top in capital letters and the promisor's tokens are indicated on bottom, in lower case letters:

(1) The incompletions of REQUESTOR are remarked in UPPERCASE characters, namely:
 RR: missing requestor's response
 PR: missing promisor's response
 RF: missing requestor's fulfillment
 PF: missing promisor's fulfillment (2) The incompletions of PROMISOR are remarked in lowercase characters, namely
 rr: missing requestor's response
 pr: missing promisor's response
 rf: missing requestor's fulfillment
 pf: missing promisor's fulfillment For the requestor, then, the RF token indicates that he is missing the fulfillment of a request he has made, the PF token indicates that he is missing the fulfillment of a promise made to him. The RR token indicates that it is the requestor's move in the conversation and the PR token indicates that it is promisor's move.

For the promisor, the pf token indicates that he is missing the fulfillment of a promise that he has made, the rf token indicates that he is missing the fulfillment of a request made to him. The response tokens for promisor, pr and rr, have the same meaning as the counterpart response tokens for requestor.

In The Coordinator system, the fulfillment-missing tokens are presented to the participant as "Complete-by" and "New-complete-by" dates, and the response-missing tokens are presented as a "Respond-by" date.

The final states in conversations are defined as the states in which no token is present. That is, there is no incompletion in the conversation. The declare-complete move in a Conversation for Action is interpreted by the system as an instruction to record as "complete" all previously recorded incompletions in the conversation.

Reviewing FIG. 5, note that in the state, "request", if the most recent previous move was a counter-offer by a requestor, different dates of fulfillment and response may have been declared by the participants in the conversation, and the tokens may be correspondingly different. We will give a detailed example of this phenomenon later in this section. What has happened in this example is that REQUESTOR's "requestor's fulfillment" token has recorded a new-complete-by data declared in the counter-offer move, and REQUESTOR's "promisor's response" token has recorded for it a new respond-by date. (PROMISOR's tokens will have corresponding differences.)

Also in FIG. 5, note that in the state, "promise", if the last move was an accept of a counter-offer by the requestor, REQUESTOR's "requestor's fulfillment" token date becomes the complete-by date of the counter-offer (if that date differs from the complete-by date of the original request). PROMISOR's "requestor's fulfillment" token will be modified in similar fashion.

Also in FIG. 5, note that in the state, "decline", PROMISOR's "requestor's fulfillment" token is only present if the last move was promisor's cancel of his promise. This token is not present if the last move was a promisor's decline of the request. The REQUESTOR's "requestor's response" token takes the new respond-by date.

Also in FIG. 5, note that in the state, "cancel", the date of response tokens is that produced in the requestor's cancel move, and is not the date of the original request, nor of the promisor's report-complete move.

In FIG. 7, note that in the state, "accept", if the last move was a promise, the dates given to tokens may differ from those originally given in the conversation. REQUESTOR's "promisor's fulfillment" token is given a "New-complete-by" date if one was produced in the previous counter-offer move by REQUESTOR. Similarly, the date of PROMISOR's "promisor's fulfillment" token changes.

In FIG. 7, note that in the state, "cancel", dates given to response tokens are those produced in PROMISOR's cancel move.

In FIG. 7, note that in the state, "decline", PROMISOR's fulfillment token is only present if the last move was a requestor's decline of his offer. This token is not present if the last move was a requestor's cancel of the offer. PROMISOR's "promisor's response" token takes the respond-by date of the requestor's decline or cancel move.

(5f) Permitted Moves for OBSERVERS in Conversations

Figure 8A:
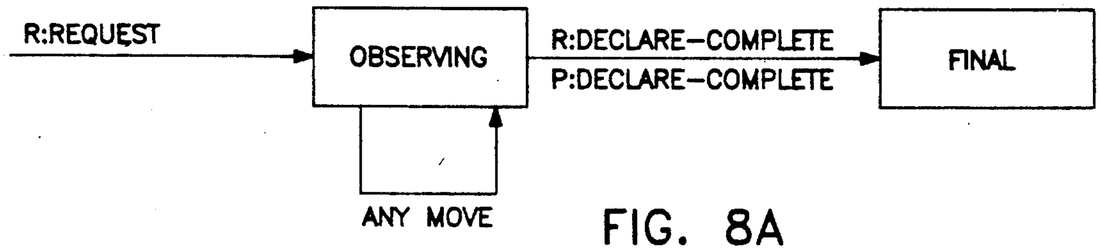
Figure 8B:
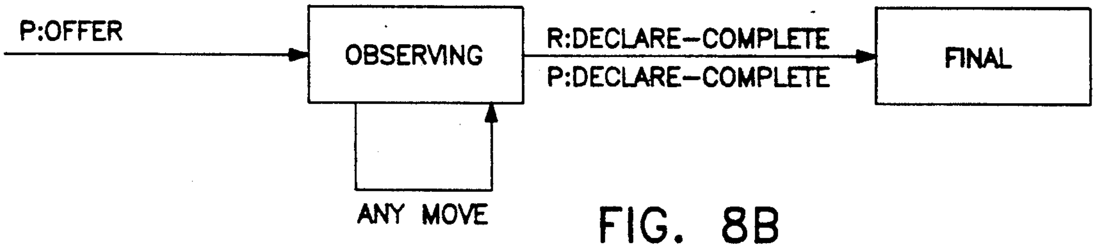
Figure 8C:
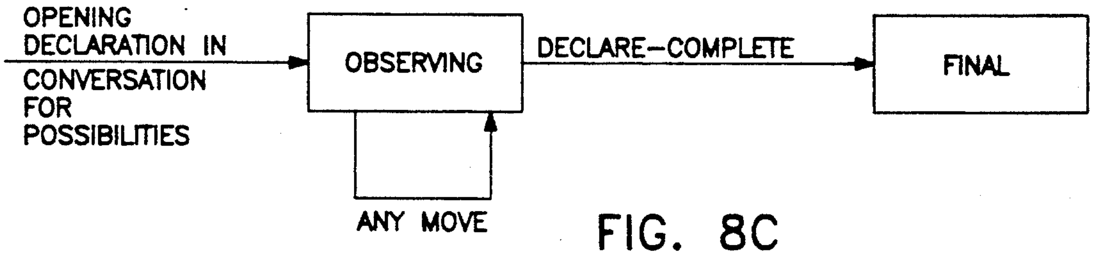

For OBSERVERS, open conversations are placed in the state "Observing". FIGS. 8*a*, 8*b*, and 8*c* illustrate the state, "Observing". For an observer in a conversation the state of the conversation has only two states. When an observer receives a communication in a new conversation, that conversation is moved, from the observer's point of view, to the state, "Observing". All conversations remain in that state until a declare-complete move is made by one of the primary participants in the conversation—that is, until a communication is received in which a participant permitted to do so declares the conversation complete. Observers are permitted only "comment" moves in Conversations for Action, and, although they are permitted the moves of PROMISOR in Conversations for Possibilities, such conversations are nevertheless held in the state "Observing" in OBSERVERS' conversation records.

(5g) Permitted Moves in Conversations for Action with One Role

Figure 9A:
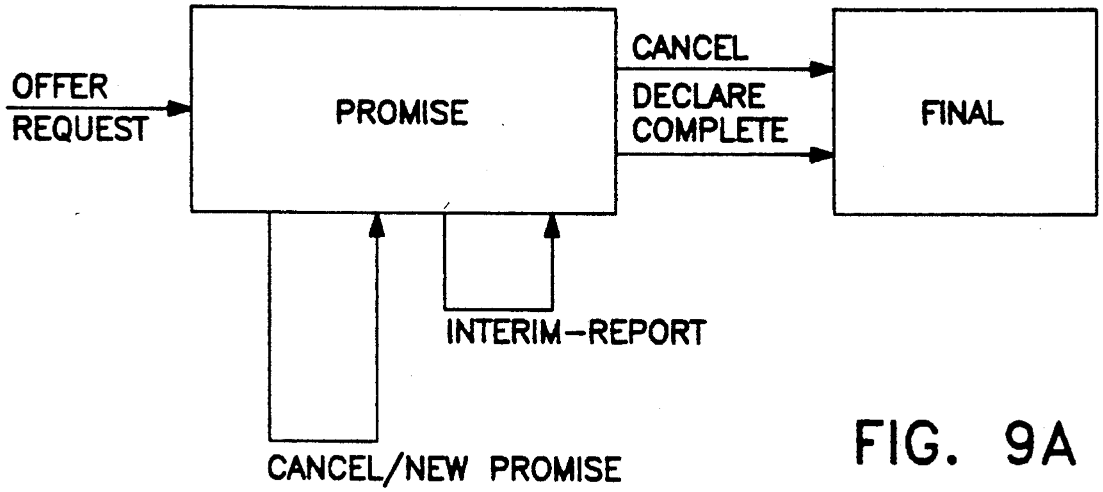

FIG. 9*a* illustrates the FSM in The Coordinator system for a Conversation for Action in which participants play in only one role. Such conversations may be initiated with either a request or an offer move addressed to the participant himself. In either case, the FSM will interpret the move as a declaration of incompletion of fulfillment of some realizable possibility, in the state "promise". The minimum permitted moves of such conversations are the opening request or offer move, cancel, and declare-complete. The states of such conversations are "promise" and "final". The response and fulfillment tokens are both present at all times while such conversations are open, and both absent when such conversations reach the final state. Thus, in this simple protocol, it is always the participant's turn to make a move in the conversation, and he may declare distinct dates for completion of the incompletions of fulfillment—his "promise-to-himself"—and response—the date for next declaring in the conversation, until he either cancels the promise or declares the conversation complete.

Augmentation of this basic FSM is achieved by adding the cancel/make new promise move and the interim-report move to the repertoire of permitted moves.

(In The Coordinator system, participants are permitted to add observers to conversations they are conducting with themselves.)

(5h) Follow-Up and Acknowledge Moves

The moves, follow-up and acknowledge, are not handled within the FSM of The Coordinator system, but rather are added to those permitted moves derived from a FSM before the full list of permitted moves is presented to a participant by The Coordinator system.

A follow-up move is permitted to REQUESTOR when he is missing requestor's fulfillment, and to either of the primary participants when they are missing the response of the other.

As a consequence, REQUESTOR is permitted follow-up moves from any state until he declares the conversation complete. PROMISOR is permitted follow-up moves in states counter-offer, decline and report.

The rules according to which acknowledge moves are permitted to participants are based not only upon the conversational role of the participant and the current fulfillment and response incompletions of the conversation, but also upon a type of incompletion not previously discussed, in which what is missing is the declaration that a participant has listened to a specific declaration by another participant. In normal human conversations, an acknowledge is a kind of move made by a participant to complete an incompletion—the concern that a participant is not listening—that will in turn make it possible for the next declaration to be made in confidence.

The rules governing the making of an acknowledge move are: (a) the participant preparing to make a move must not have previously made a move in response to the move he might now acknowledge, (b) the move being acknowledged must have been made by a participant participating in this conversation in the role of requestor or promisor, and (c) the move being acknowledged may not be itself an acknowledge move.

Follow-up and acknowledge moves do not cause any change in the state of a conversation.

(5i) The Comment (or "Free-form") Move

The move, "Comment" (called "Free-form") move is always permitted, even in conversations that have been closed (i.e., conversations that are in final state).

Comment moves do not cause any change in the state of the conversation.

(5j) Permitted Moves in Conversations for Possibilities

Figure 10:
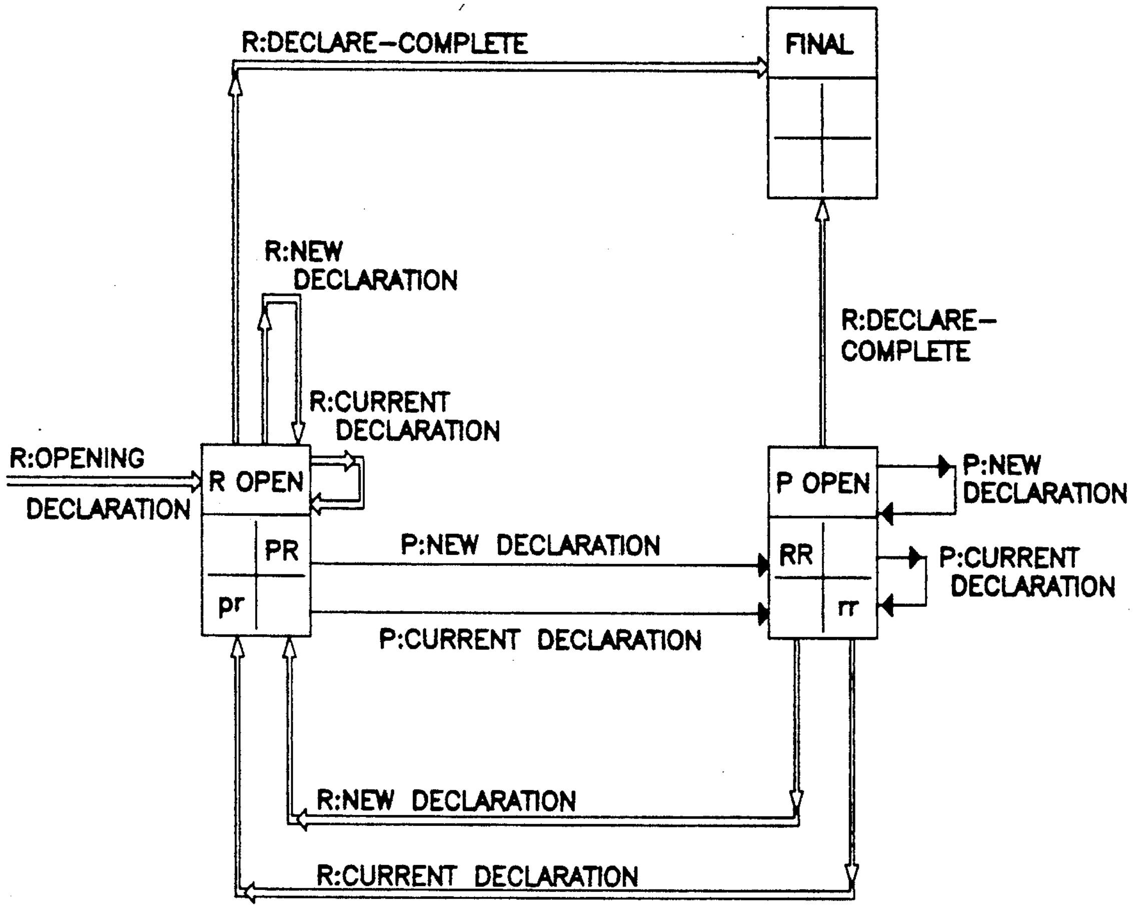

FIG. 10 illustrates the FSM for Conversations for Possibilities. In Conversations for Possibilities The Coordinator system manipulates only two tokens for each role in the conversation: the requestor's response and the promisor's response tokens. The conversation states are r-open, p-open, and final. The difference between the two open states is given by the token combination.

(5k) Permitted Moves in Conversations for Possibilities with One Role

Figure 9B:
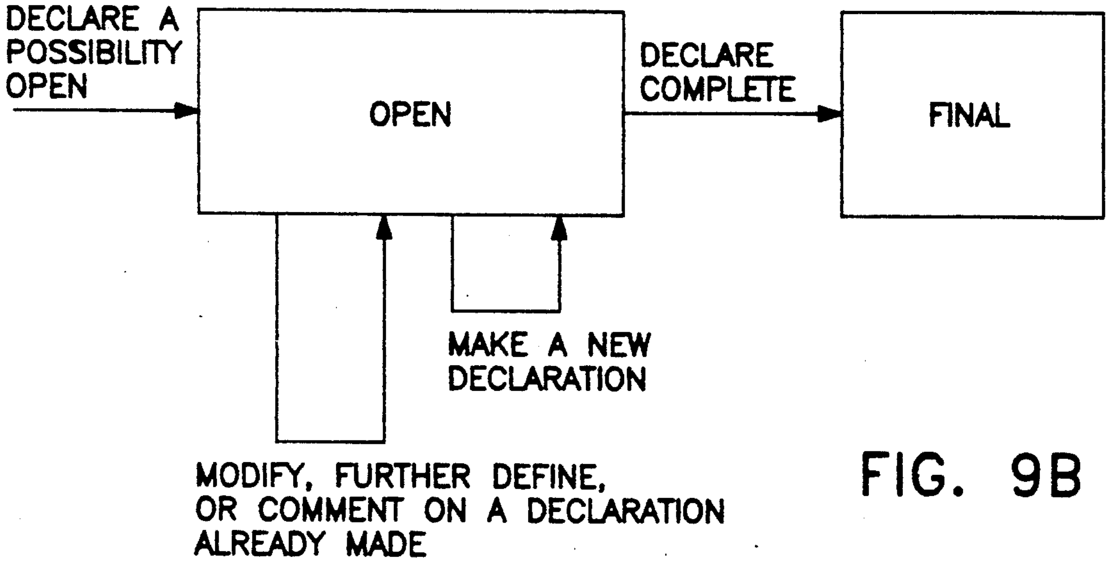

FIG. 9*b* illustrates The Coordinator system's protocol for a Conversation for Possibilities with one role. The conversation is initiated by an opening declaration of a possibility addressed to the participant himself. Only one recurring incompletion is recorded in the conversation: missing response.

In this protocol the response token is present at all times in the open state: it is always the participant's turn to respond to himself (or to his role) in the conversation. The continuing moves in the conversation may update the associated date of the response token. The conversation is terminated when the participant declares it complete.

(In The Coordinator system, participants are permitted to add observers to conversations they are conducting with themselves.)

(6) Operation of Finite State Machines

In the following we give examples of the operation of The Coordinator system's finite state machines during the conduct of conversations among participants in a sample set of conversations. An example of the functioning of these machines for each type and sub-type of conversation in The Coordinator system is provided.

Each description includes two parts: a part in which moves are described in the language of an observer who is observing participants in a conversation, and a part in the language of an observer who is specifying the structure and operation of the system which is recording the conversation and placing tokens (and other data) in database to represent incompletions and the declared dates of completion for those incompletions.

(6a) Example of a Conversation for Action of the Request Type

As an example of this type of conversation, consider a conversation opened by "Alex" making a request to "Robin", in the domain "newsales".

Throughout this discussion the reader will find it useful to consult FIG. 5, which shows the structure of permitted moves given the minimum defined set of permitted moves in this type of conversation. The Figure is organized to show the moves according to the notational construction of "Conversational States", and thus shows moves as transitions from and to the states of a conversation.

The specific incompletions found at each state (i.e., produced by moves which deliver the conversation to that state), and the representative tokens to be found in the conversation record at that state are also indicated in the FIG. Incompletions are noted with alphabetic characters inside boxes representing the states of the conversation as described above in this section. Now let us examine a conversation. It begins when Alex makes a request to Robin, asking Robin to deliver a budget to him by Oct. 1st (the "complete-by", or "missing fulfillment" token date).

In addition, he asks Robin to confirm that Robin will be able to fulfill the promise before Sep. 15th (by entering a "Respond-by" date for the incompletion he is creating for the "missing response").

In the conversation record in The Coordinator system that Alex uses, the conversation opened by Alex is in the state "request" after Alex makes the request. For Alex, the requestor, two tokens are recorded: the promisor's response token (PR) for the date he declared for completion of the incompletion of Robin's response he created in making the request, and the requestor's fulfillment token (RF) for the date he declared for completion of the incompletion he declared, of the possibility of Robin fulfilling Alex's possibility of a new budget.

It becomes simpler to follow if we produce a "picture" of the tokens. Immediately after making his initial move, The Coordinator system conversation records show tokens for Alex as illustrated in Table 12. The numbers shown in the Table are date-references: 100185 expands to Oct. 1, 1985.

The Coordinator system that Robin uses receives the request from Alex, processes the communication using the algorithm illustrated in FIG. 5, and creates a new conversation record the token structure of which shows the conversation to be in the state, request. For Robin, as promisor, the tokens recorded are the promisor's response token (pr), indicating an incompletion regarding his speaking to Alex, and the requestor's fulfillment token (rf), indicating the incompletion of Alex's missing fulfillment of an action for realizing a possibility.

The token records in Robin's conversation records for this conversation in the state, REQUEST, are illustrated in Table 12.

When Robin reads the request from Alex at his personal computer, he decides to answer immediately, and presses a function key that has the indicated function, "answer". The Coordinator system constructs a list of permitted moves according to processes that will be described later, and presents a menu to Alex on which are listed the moves permitted to the promisor at this moment in this type of Conversation for Action (of the "REQUEST" type). Table 11 shows a facsimile of the menu which The Coordinator system will present to a participant making such a move. On the right-hand column notice the four moves permitted to promisor—"Promise", "Counter-offer", "Decline", and "Report-completion". (The options in the left-hand column will be introduced later.) Now turn to FIG. 5 again. Notice the two thin arrows showing permitted moves of decline and counteroffer, and the dark lines indicating promise and report-complete. (Permitting the report-complete move directly from the state of Request is a variation in which, in the moment of the report, the promisor assumes incompletions equivalent to those he would have if he had in fact first promised, and then reported. Doing the two moves in one is a move to produce facility in the system.)

For a next move, from among those permitted and presented on the screen, Robin will make a counteroffer to respond to Alex's request. Robin counteroffers that he is willing to commit himself to complete the budget, not as Alex has asked for on the 1st of Oct., but on the 10th of Oct. Having selected the move counteroffer, which produces a new incompletion for the promisor of the promisor's fulfillment, The Coordinator system presents a "token menu" for Robin to fill in as he "commits" to his counteroffer, showing these fields:

"New-complete-by:"

"Respond-by:"

"New-complete-by" allows Robin to declare a date for the incompletion of his own fulfillment that he is creating by making the move, counteroffer. When he does the move of a counteroffer, that is, he is declaring into existence that he is now incomplete in this conversation, and his incompletion has to do with fulfillment of an action, and the date he declares for fulfillment is Oct. 10th.

The Coordinator system records the move in Robin's conversation records and sends a record of the move to Alex as well. In Robin's personal computer this counteroffer changes the conversational state recorded in his conversation records to "Counteroffer", and triggers the following token manipulations: for Robin, the promisor, the promisor's response token is removed, since his response is no longer missing; the requestor's response token is added with the date of Sep. 25th, since now Alex's response is missing; the promisor's fulfillment token is added with the date of Oct. 10th. The requestor's fulfillment token remains unchanged, since the requestor's declared incompletion is still incomplete, and will remain so until he accepts the counteroffer or takes another permitted move towards fulfillment.

Robin's token records are illustrated, now for the state, COUNTEROFFER, in Table 12.

When Alex, the requestor, receives this counteroffer, the Coordinator system that he uses processes it, changes the conversational state in his conversation record "Counteroffer", and changes the records of incompletions for Alex, the requestor, in his token records. The promisor's response token is removed, since the promisor has responded. The requestor's response token is added, with the date of Sep. 25th. The promisor's fulfillment token is added with the date of Oct. 10th, since now the promisor's is incomplete with respect to fulfillment of some action in this conversation. The requestor's fulfillment token remains unchanged. Notice now that in both Robin and Alex's conversation records the tokens of fulfillment show different dates (see Table 12 for state, COUNTEROFFER.)

As indicated in FIG. 5, in the state of counteroffer, in a Conversation for Action of type REQUEST, three tokens, requestor's response,
requestor's fulfillment, and
promisor's fulfillment . . . are recorded for the requestor, and three tokens, requestor's response,
promisor's fulfillment, and
requestor's fulfillment . . . are recorded for the promisor.

Now, suppose that Alex reads Robin's counteroffer, presses the function key for "answer", and, from among the presented permitted moves, selects the move "accept", declaring that he will accept Robin's counteroffer, and thereby take on as his own the declaration of missing fulfillment with which Robin has countered. Once he has "committed" to his move, the conversation record in Alex's personal computer has its conversational state changed from counteroffer to "promise". The requestor's response token is removed, since Alex, the requestor, has responded; and the date associated with the requestor's fulfillment token is changed from Oct. 1st to Oct. 10th, since, by accepting the counteroffer, he has declared for himself a new date for completing that incomplete fulfillment. The promisor's fulfillment token is left unchanged. (See Table 12.)

The move arrives at The Coordinator system that Robin uses, is processed, and the conversational state in his conversation records are changed from counteroffer to promise. The requestor's response token is removed: the requestor has responded. The date associated with the requestor's fulfillment token is changed from Oct. 1st to Oct. 10th. The promisor's fulfillment token is left unchanged. Robin's token records for this conversation in the state, PROMISE, are again illustrated in Table 12.

As can be seen in FIG. 5, in the state, "promise", in a Conversation for Action of the REQUEST type, the requestor's fulfillment and promisor's fulfillment tokens are recorded for the requestor and the promisor's fulfillment and requestor's fulfillment tokens are recorded for the promisor.

FIG. 5 also discloses that in the promise state Robin has two moves available: cancel and report-complete. In this state, Alex's possible moves are: cancel and declare-complete, the latter being a move he might make if someone else already had fulfilled the request.

Now, suppose for the next move in the conversation, Robin makes a report-complete, after finishing the preparation of the budget. Suppose also that when Robin makes this move he asks Alex to respond by Oct. 11th. In the conversation record the conversational state is changed from promise to report-complete. Notice the token changes in Table 12. The requestor's response token is added with the date by which Robin declares for response. The promisor's fulfillment token is removed, since Robin is declaring that the promise's conditions of satisfaction have been fulfilled. The requestor's fulfillment token is not changed: it will not be removed until Alex accepts Robin's report (or either of the participants take other relevant action in the conversation).

When Alex's personal computer receives the report move, the conversational state his conversation records is changed from promise to report. Again, refer to Table 12. The requestor's response token is added, with its date declared to match the respond-by date declared by Robin. The requestor's fulfillment and promisor's fulfillment tokens are not changed, since Alex's request and Robin's promise to him will remain pending until he accepts Robin's report and declares the conversation complete.

Finally, suppose that Alex accepts Robin's report and declares the conversation complete. In the conversation record the conversational state is changed from report-complete to the state, "final" and, as Table 12 shows, all tokens are removed, since no incompletions remain in the conversation. And, when The Coordinator system that Robin uses receives Alex's declaration, the conversational state is changed from that of report-complete to that of final and all tokens are removed.

As long as a conversation is not purged from a participant's conversation records, that participant will be able to review it by using The Coordinator system's selection tools (described below). Sorting criteria that could be used to gain access to this conversation while in the final state include: "closed conversations", domain ("newsales"), specific participant and dates of moves.

In this discussion, we examine only one move at each state. But the manner in which alternative moves would be described should be evident on the basis of that examination. Note also that in this discussion we do not deal with more complex conversations, e.g., conversations that include such moves as commit-to-commit, free-form and follow-up. The manner in which such moves would occur will be evident from the present discussion and FIGS. 1 and 2.

A traditional problem in methodologies for development of social systems of communication can be referred to as "getting messages crossed". It is the problem of conflicting declarations when systems have been structured in the presupposition that what people are doing when they are communicating is matching descriptions of some external physical reality. In such systems, the question of whose declaration will be given precedence in being recorded as the "accurate", "final", or "authoritative" declaration in a database is a major issue.

The present methodology presents an entirely alternative approach, and the problem of conflicting declarations does not arise in this methodology in the way it arises in traditional methodologies. The reason for this is that the "objects" worked upon in this methodology are participants' individual declarations of possibilities for action and declared incompletions with regard to actions to complete possibilities; and these declarations are linguistic objects which, as such, are always attributable to particular declarers, rather than being objects which (as is often supposed) exist independent of declarations (and which are therefore not attributable). Conflicts will arise in the conduct of conversations on systems built according to this method. For example, one participant may promise in the moment that the requestor cancels. And, when such conflicts arise, they arise within the very domain in which the system is itself a method for producing resolution—that is, in the domain of human conversations, where people will have conversations about coordinating their actions and possibilities.

(6b) Example of a Conversation for Action of the Offer Type

Throughout this discussion the reader will find it useful to consult FIG. 7. As the Figure indicates, a variety of moves are possible in each state of this type of conversation. Changes in conversational state and results of token manipulation triggered by each of the various moves are also indicated there. Again, in this discussion, we examine only one move at each state.

As an example of this type of conversation, consider a conversation initiated by an offer Alex makes to Dianne on Sep. 25th in a domain of possibilities he called "personel". Alex enters Oct. 3rd as the complete-by date and Oct. 1st as the respond-by date. In the conversation record begun when Alex makes this move, the conversational state is termed "offer" and the tokens that are recorded for Alex, the promisor, include: requestor's response, with the date of Oct. 1st, and promisor's fulfillment with the date of Oct. 3rd. Now, suppose that in composing his offer, the opportunity to declare an alert date leads Alex to open a brief private conversation with himself concerning whether or not to declared an alert date. Further suppose that in this brief conversation Alex concludes he will prompt (remind) himself to get certain personnel records into his hands before the respond-by date he has specified. (He declares to himself that failure to have those records in hand by that date might cause him to miss the possibility of fulfilling his promise.) Consequently, Alex specifies an alert date in this conversation for Sep. 30th, one day before the date by which he has requested a response. An alert token dated Sep. 30th is stored in the token records in Alex's personal computer, and an alert will appear in his daily calendar for Sep. 30th, as well as appearing in lists of commitments due on that date.

For example, Table 13 presents a facsimile of the "calendar" that The Coordinator system produces when a participant selects options presented under the name, "Today's appointments and commitments". In the calendar can be seen numbers of alerts. A participant may place the cursor on the screen at the location of any of the summaries shown, and The Coordinator system will go to the conversation records and retrieve to the screen the latest move in the conversation so selected. Further, the participant can then instruct The Coordinator system, with "control key commands", or by going to other menu and function key commands, to "trace backwards" in the selected conversation. Tracing backwards (and forwards) allows a participant to thereby review the entire history of the conversation so selected, and, as alerts are incompletions declared for the purpose of completing declared realizable possibilities, the participant can, in the moment of review, move in the conversation to declare new actions, declare new possibilities, or take other relevant action.

Declaring an alert allows the participant to request and be given by The Coordinator system summaries of conversations in such alerts have been declared, and to have these summaries displayed, in pre-defined formats, in displays of "commitments due" on the date of the alert. Such displays include daily calendars, lists of "commitments due" on particular dates, and also it is possible to get a list of all conversations in which alerts have been declared. Table 14 presents a facsimile of one of the types of pre-defined formats of conversational summaries which The Coordinator system will present on a participant's instructions.

Alerts disappear from conversation records only when one of the principal participants in the conversation makes a move that affects the state of the conversation (i.e., not interim-report, comment, acknowledgement, or followup). A move that affects the state of the conversation will cause alerts declared by the primary participants in the conversation to be removed from their respective conversation records—alerts in the records of the maker of the move being removed in the moment that the move is recorded in his conversation records, and alerts declared by the other primary participant (requestor or promisor, whoever is "receiving" the move), and occuring in their respective conversation records being removed in the moment that this "other" participant's copy of The Coordinator system stores the new move in his own conversation records. (This "moment" will be approximately the same for both participants if they are working at the same personal computer, and will be different moments if they are working at personal computers attached to different storage devices with communications facilities between them.)

Once The Coordinator system that Dianne uses processes Alex's offer a new conversation record is opened and it shows the conversation to be in the state of offer. For Dianne, the requestor, the tokens recorded are requestor's response, for Oct. 1st, and promisor's fulfillment for Oct. 3rd.

Suppose Dianne accepts Alex's offer rather than exercising her option to make a counteroffer. In the conversation record, the conversational state is changed to that of accept, the requestor's response token is removed and the requestor's fulfillment token is added, with the date of Oct. 3rd.

After Alex's personal computer processes Diane's accept move, the conversational state in his personal computer's conversation record is changed to that of accept, the requestor's response token is removed, since Dianne has answered Alex's offer, the requestor's fulfillment token is added with the date of Oct. 3rd, and Alex's alert token for this conversation is removed from Alex's conversation records.

Suppose that Alex decides that he cannot fulfill his original offer and so makes a cancel move with a respond-by date of Oct. 2nd. The conversational state is changed to that of cancel, the requestor's fulfillment and promisor's fulfillment tokens are removed and the requestor's response token is added with the date of Oct. 2nd.

After Dianne's personal computer processes Alex's cancel move, the conversational state in her personal computer's conversation record is changed to cancel, the promisor's fulfillment and requestor's fulfillment tokens are removed and a requestor's response token with the date of Oct. 2nd is added.

Suppose, next, that Dianne then declares the conversation complete. In the conversation record in her personal computer, the conversational state is changed from cancel to the state termed "final" and all tokens are removed, since no incompletions remain in the conversation.

When The Coordinator system that Alex uses receives Dianne's declaration, the conversational state is changed from that of cancel to that of final and all tokens are removed.

As long as the conversation is not purged from a participant's conversation records that participant can review it by using The Coordinator system's selection mechanisms. Illustrated in Table 15 is the most general tool provided in The Coordinator system for selecting conversation and move records from a participant's conversation records database. Brief examination of the Table reveals that sorting criteria available there that could be used to gain access to this conversation in its final state include: "closed conversations", selection by domain ("personel"), selection of all conversations within some time parameter, selection of specific participant and selections by specific dates of moves.

Table 16 illustrates a list of conversation summaries sorted according to the person with whom the participant is in conversation. This can be helpful, for example, in conducting meetings with personnel whom one works with, where The Coordinator system assists in the preparation of an assessment of the current conversations between colleagues, manager and subordinate, customer and supplier, etc.

(6c) Example of a Conversation for Possibilities

We recommend the reader consult FIG. 10 during the following discussion.

As an example of a Conversation for Possibilities, consider a conversation that Alex opens in the domain "sales" with Dianne, proposing certain writing that he has done as a possible basis of a new advertising initiative, and asking that she review the writing and give some response by Oct. 10th. In the conversation record opened in Alex's personal computer when he makes this move, the conversational state is "r-open" and the promisor's response token is recorded with a date of Oct. 10th.

When The Coordinator system that Dianne uses processes Alex's move, a new conversation record is opened, showing the conversation to be in the state of p-open, and a promisor's response token is recorded with a date of Oct. 10th. Suppose she responds to Alex's declaration with a "reformulation of the same declaration"—which in this means that she comments within and edits and delivers back to Alex the same writing he gave to her with her modifications—and suppose she declares a respond-by date of Oct. 4th. This move changes the conversational state to r-open, the promisor's response token is removed and a requestor's response token is added with the date of Oct. 4th.

After Alex's personal computer receives the new move from Dianne, the conversational state in his personal computer's conversation record is changed to r-open, the promisor's response token is removed and a requestor's response token is added with the date of Oct. 4th.

We may suppose that this conversation continues in a similar fashion for several interactions, until Alex declares the Conversation for Possibilities complete. In the conversation record in his personal computer, the conversational state is then changed from open to the state termed "final" and all tokens are removed, since no incompletions remain in the conversation.

When The Coordinator system that Dianne uses receives Alex's declaration, it changes the conversational state from that of cancel to that of final and removes all tokens.

As long as the conversation is not purged from a participant's conversation records that participant can review it by using The Coordinator system's selection mechanisms. Sorting criteria that could be used to gain access to this conversation include: "closed conversations", domain ("sales"), specific participant and dates of moves.

Table 17 presents an example of a list of conversations sorted according to the domain of possibilities in which conversations have been conducted.

(6d) Example of a Conversation for Action with One Role

Suppose that Dianne initiates a REQUEST conversation in the domain "vacation", selects herself as the "other" participant in the conversation, enters Nov. 1st as the date of completion and Oct. 25th as the date of response. The Coordinator system identifies her move as a "promise to myself", which opens a type of conversation having its own finite state machine. FIG. 9*a* illustrates this type of FSM.

Once The Coordinator system processes the move, a new conversation record is opened and it shows the conversation to be in the state of promise; a response token is recorded with an associated date of Oct. 25th, and a fulfillment token is recorded with an associated date of Nov. 1st. This conversation will appear among summaries of conversations selected from menus in The Coordinator system with the choice, "missing my response" and also in summaries of conversations selected with the choice, "my promises" (see Tables 1 and 15) It will also appear in the daily calendar on Oct. 25th with the warning, "my response due", and on Nov. 1st with the warning, "my promise due".

If Dianne selects this conversation as one in which to make a move, her options will be: cancel, declare-complete, cancel and make a new promise (cancel/new promise) and interim-report. Suppose that she chooses to make an interim-report. She may indicate a new response date in the communication. If she makes an interim-report the conversation will remain in the same state but the response token will be updated to the new response date, if she assigns one.

Eventually Dianne declares the conversation complete. Then, in the conversation record in her personal computer, the conversational state is changed from open to the state termed "final" and both tokens are removed, since no incompletions remain in the conversation.

As long as the conversation is not purged from Dianne's conversation records she can review it by using The Coordinator system's selection mechanisms. Once in final state, sorting criteria that could be used to gain access to this conversation include: "closed conversations", domain ("vacation"), "conversations with Dianne" and dates of moves.

(6e) Example of a Conversation for Possibilities with One Role

FIG. 9*b* illustrates the FSM that The Coordinator system uses to manage a Conversation for Possibilities with one role. Suppose Alex makes an opening declaration of a possibility and addresses the conversation to himself and enters Nov. 10th as the date for response.

The Coordinator system identifies the move as an opening in a Conversation for Possibilities with himself. The conversational state in the conversation record begun for this conversation is termed "open". A response token is recorded with an associated date of Nov. 10th. At this juncture Alex's possible moves are: make a new declaration, re-formulate the current declaration and declare the conversation complete.

Should he make a new declaration in the conversation, the conversation would remain in the same state. The response token would be updated whenever a new move included specification of a new date of response.

Suppose Alex eventually declares the conversation complete. Then, in the conversation record in his personal computer, the conversational state is changed from open to the state termed "final" and the token is removed.

As long as the conversation is not purged from Alex's conversation records he can review it by using The Coordinator system's selection mechanisms. At that time, sorting criteria that could be used to gain access to this conversation include: "closed conversations", domain, "conversations with Alex" and dates of moves.

sections f and g f. Data Associated with Moves

For each type of move, a set of data associated with that move is defined. Below, the data associated with the moves of the three types of conversations defined in the current embodiment are described.

(1) Data Associated with Moves in Conversations for Possibilities

In a Conversation for Possibilities, the initial move, DECLARE A POSSIBILITY OPEN, has the following data associated with it:

(a) identity of participants, including:
identity of requestor
identity of promisor
identities of any observers
(b) domain of possibilities,
where the domain of possibilities of the conversation is the particular name given by the participant to the domain in which the participant will interpret the conversation;
(c) tokens representing the incompletions of the conversation, including data representing:
the type of token ("missing response" or "alert"), and
the data declared for completion of the incompletion which the token represents;
(d) tokens representing declared possibilities, including:
the "possibility" of the conversation, which is the phrase-name given to the declared possibility of the conversation, and
the "text" associated with the move, which includes the specific spelling-out of the declaration of specific realizable possibilities.

Notice that, as a consequence of our employment of conversations as the basic unit of recordkeeping in this methodology, the identities and roles of participants, declaration of domain of possibilities, previous incompletions of the conversation, and previous moves of the conversation, all are defined already in the moment that a participant makes a move after the initial move in any conversation.

Three other moves are permitted in a Conversation for Possibilities, namely:

MAKE A NEW DECLARATION
RE-FORMULATE CURRENT DECLARATION
DECLARE-COMPLETE

In the case of each of the three, the data associated with the move are:

(a) identities of speaker, listener, and any observers
(b) tokens representing the incompletion of the conversation, including data representing:
the type of token ("missing response" or "alert"), and
the date declared for completion of the incompletion which the token represents;
(c) tokens representing declared possibilities, including:
the "possibility" of the conversation, which is the phrase-name given to the declared possibility of the conversation, and
the "text" associated with the move, which includes the specific spelling-out of the declaration of specific realizable possibilities.

(2) Data Associated with Moves in REQUEST Conversations

In a Conversation for Action of the REQUEST type, the initial move, request, has the following data associated with it:

(a) identity of participants, including:
identity of requestor
identity of promisor
identities of any observers
(b) domain of possibilities, where the domain of possibilities of the conversation is the particular name given by the participant to the domain in which the participant will interpret the conversation;
(c) tokens representing the incompletions of the conversation, including data representing:
the type of token ("missing response""missing fulfillment" or "alert"), and
the date declared for completion of the incompletion which the token represents;
(d) tokens representing declared possibilities, including:
the "action" of the conversation, which is the phrase-name given to the action(s) declared in the move for completing a realizable possibility in the conversation, and
the "text" associated with the move, which includes the specific spelling-out of the declaration of action(s) for completing specific realizable possibilities.

Fifteen other moves are permitted in a Conversation for Action of the REQUEST type, namely:

CANCEL
DECLARE-COMPLETE
PROMISE
DECLINE
COUNTEROFFER
REPORT-COMPLETE
ACCEPT
COMMIT-TO-COMMIT
INTERIM-REPORT
DECLINE REPORT
DECLINE COUNTEROFFER
CANCEL/MAKE NEW PROMISE
FOLLOW-UP
ACKNOWLEDGE
COMMENT

Each of the fifteen have the following data associated with the move:

(a) identities of speaker, listener, and any observers
(b) tokens representing declared possibilities, including:
the "possibility" of the conversation, which is the phrase-name given to the declared possibility of the conversation, and
the "text" associated with the move, which includes the specific spelling-out of the declaration of specific realizable possibilities.

Pre-defined text for prompting the participant to interpret the move according to the participant's role and the current incompletions of the conversation is presented for all the fifteen moves except the COMMENT move. The participant may modify or delete altogether the pre-defined text, substituting text of his own invention in the cases of all such moves except for the ACKNOWLEDGE move, in which case The Coordinator system sends the text automatically without the participant's review.

In addition, moves which complete incompletions and/or produce new incompletions (according to the definition of these moves described in section e., above) have the following additional data associated with them:

(c) tokens representing the incompletion of the conversation, including data representing:
the type of token ("missing response", "missing fulfillment", or "alert"), and
the date declared for completion of the incompletion which the token represents.

(3) Data Associated with Moves in OFFER Conversations

In a Conversation for Action of the OFFER type, the initial move, "Offer", has the following data associated with it:

(a) identity of participants, including:
identity of requestor
identity of promisor
identities of any observers
(b) domain of possibilities, wherein the domain of possibilities of the conversation is the particular name given by the participant to the domain in which the participant will interpret the conversation;

(c) tokens representing the incompletions of the conversation, including data representing:

the type of token ("missing response""missing fulfillment" or "alert"), and the date declared for completion of the incompletion which the token represents;

(d) tokens representing declared possibilities, including:

the "action" of the conversation, which is the phrase-name given to the action(s) declared in the move for completing a realizable possibility in the conversation, and the "text" associated with the move, which includes the specific spelling-out of the declaration of action(s) for completing specific realizable possibilities;

Fifteen other moves are permitted in a Conversation for Action of the OFFER type, namely:

ACCEPT
COUNTEROFFER
DECLINE
DECLARE-COMPLETE
CANCEL
REPORT-COMPLETE
PROMISE
COMMIT-TO-COMMIT
INTERIM-REPORT
DECLINE REPORT
DECLINE COUNTEROFFER
CANCEL/MAKE NEW OFFER
FOLLOW-UP
ACKNOWLEDGE
COMMENT

Each of the fifteen have the following data associated with the move:

(a) identities of speaker, listener, and any observers (b) tokens representing declared possibilities, including:

the "possibility" of the conversation, which is the phrase-name given to the declared possibility of the conversation, and the "text" associated with the move, which includes the specific spelling-out of the declaration of specific realizable possibilities.

Pre-defined text for prompting the participant to interpret the move according to the participant's role and the current incompletions of the conversation is presented for all the fifteen moves except the COMMENT move. The participant may modify or delete altogether the pre-defined text, substituting text of his own invention in the cases of all such moves except for the ACKNOWLEDGE move, in which case The Coordinator system sends the text automatically without the participant's review.

In addition, moves which complete incompletions and/or produce new incompletions (according to the definition of these moves described in section e., above) have the following additional data associated with them:

(c) tokens representing the incompletion of the conversation, including data representing:

the type of token ("missing response", "missing fulfillment", or "alert"), and the date declared for completion of the incompletion which the token represents.

At the time of making a move that is not the initial move in a conversation, the declaration of specific action or possibility of the move is inherited from the immediately previous move in the conversation, and the participant can produce a new declaration of the specific action or possibility of the move.

Also at the time of making a move that is not the initial move in a conversation, the identities of observers in the conversation are inherited from the particular move that the participant is reviewing in the moment that he initiates the move. At that time, the participant can add observers to or remove observers from the conversation as of the move he is making.

g. Conversation Records

Figure 11A:
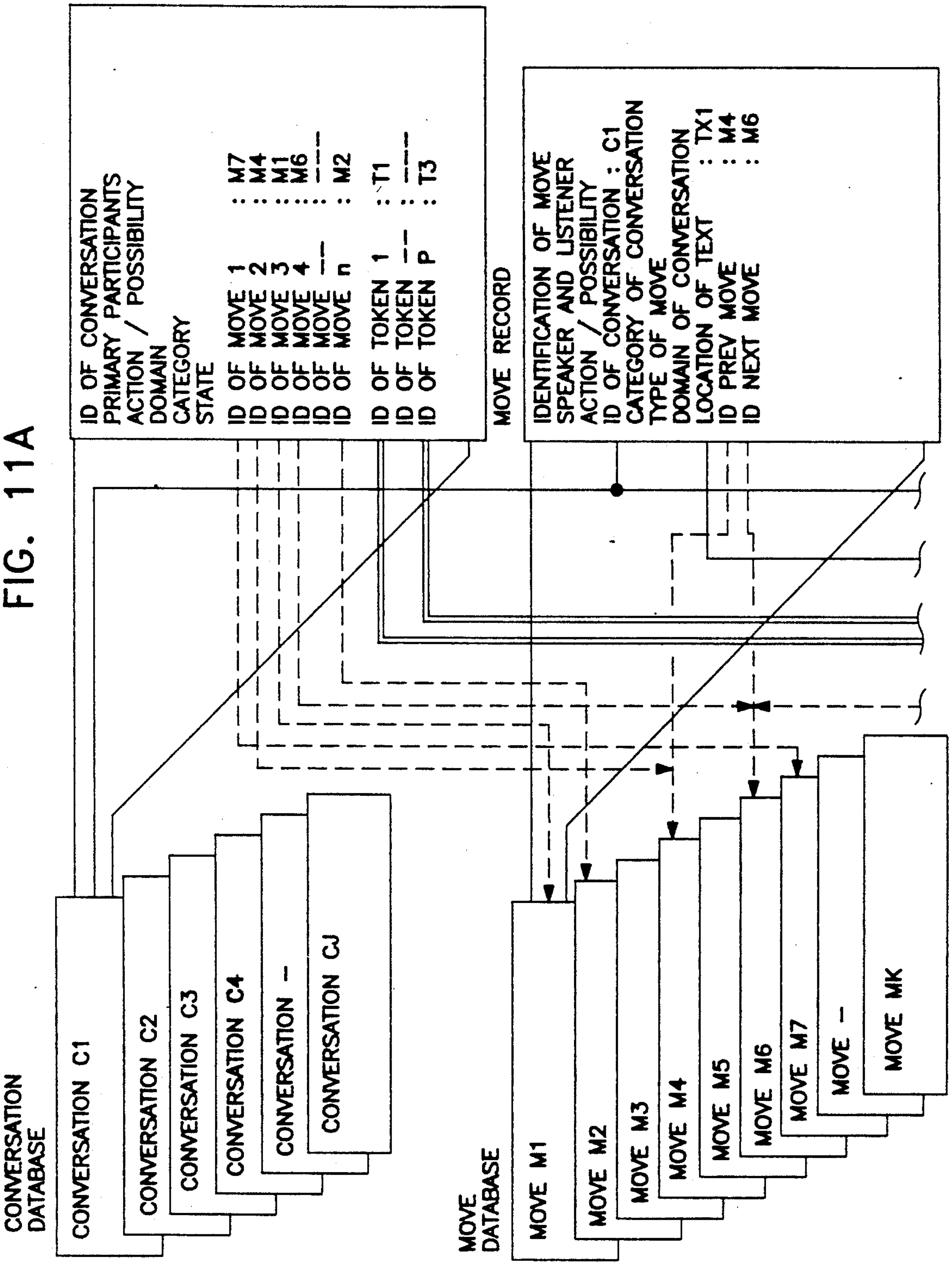
FIGS. 11A-11B is a diagram of the conversation record format and record structure employed in a system incorporating the method of this invention.
Figure 11B:
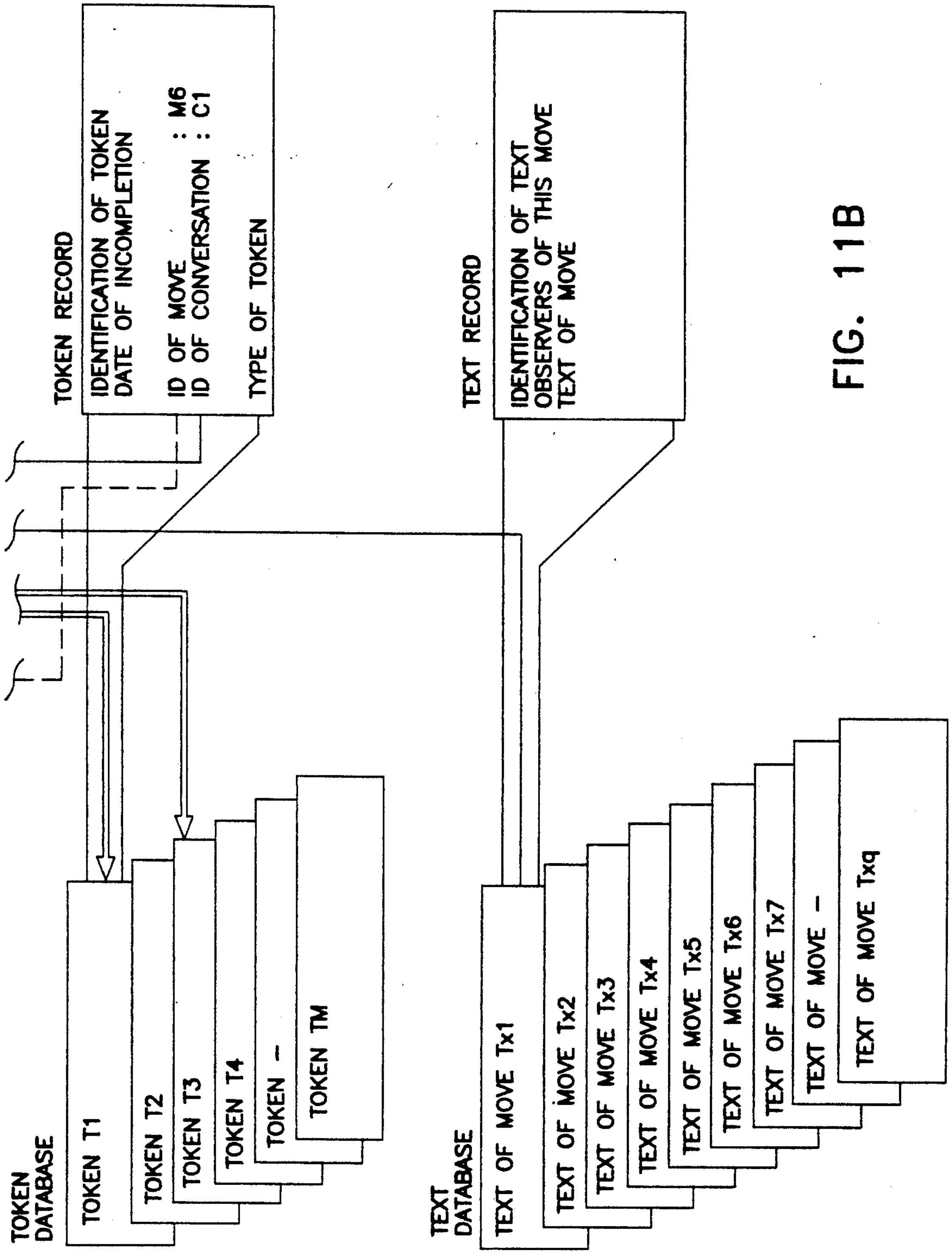

The conversation record format defined for storage and retrieval of records of conversations conducted with The Coordinator system is illustrated in FIG. 11 and described in the following.

In the current embodiment of The Coordinator system, a complete set of conversation records is generated for each participant, and stored in a storage device connected to the personal computer on which the participant works.

All filing and recovery of records in The Coordinator system is accomplished with a "B*-Tree"-type data base, which data base was built specifically for the purpose of managing conversation records within The Coordinator system, and which has a conventional scheme of instructions and procedures for programmers to use, similar to that which will be found in the B-Trees studied in the curricula of most graduate departments of computer science.

Figure 12:
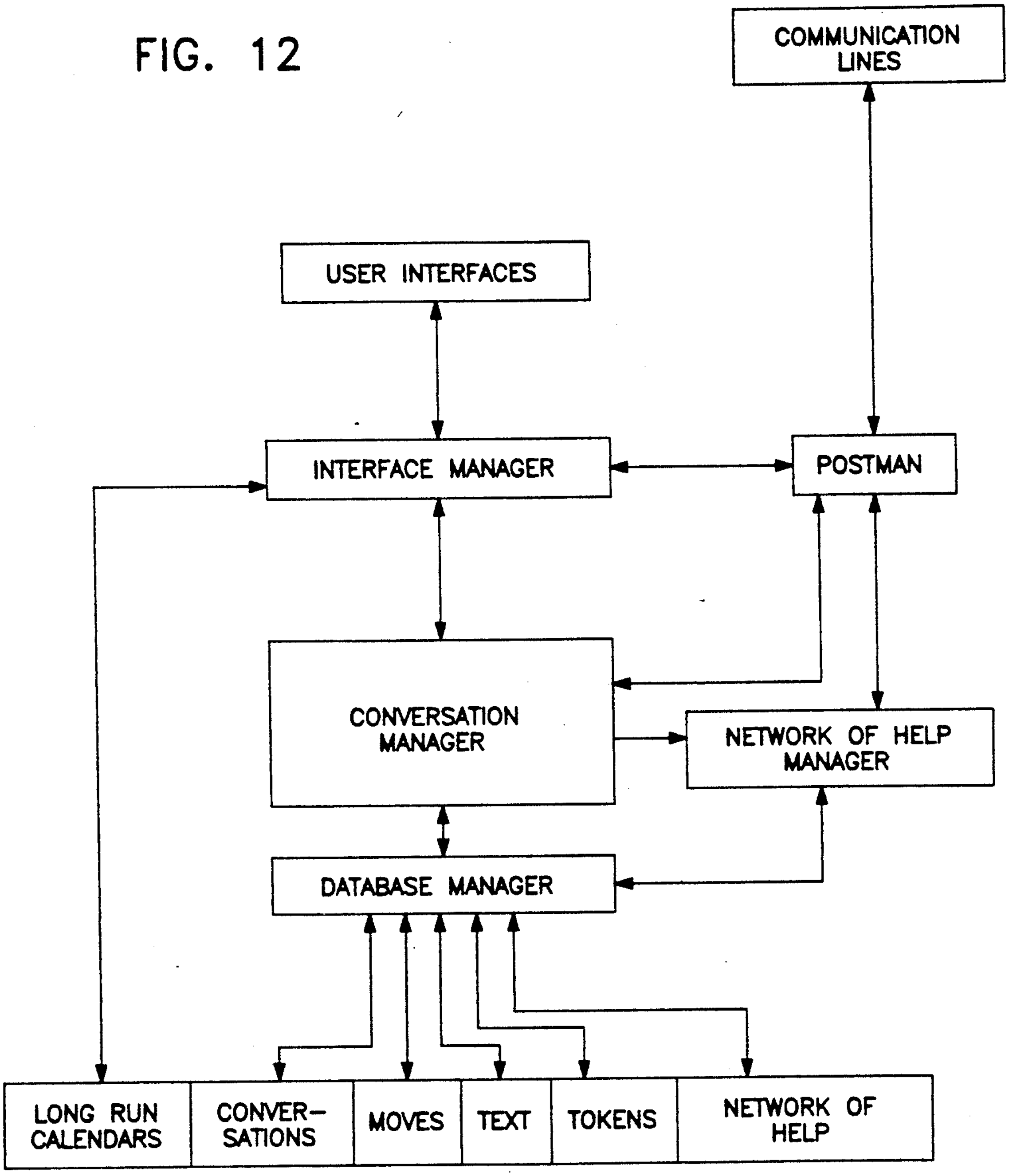
FIG. 12 is a schematic diagram illustrating the basic functional components and relationships used in a system incorporating the method of this invention.

The structure of the basic functional components of The Coordinator system is illustrated in FIG. 12, including the pivotal "Conversation Manager", the overall work of which is described in Section h., below. In this Figure can be seen the various databases of The Coordinator system, including the conversations, moves, tokens, and text databases described in this Section, along with the Database Manager which manages the mechanics of efficient storage and retrieval of data in these databases. As can be seen in the Figure, the participant, working at the point labelled "User Interfaces", is far removed from the operation of the Database Manager, which gets all of its operational instructions from the Conversation Manager, and which in turn interacts with an Interface Manager that manages the elements of the User Interface. Other features introduced in this Figure will be discussed in later Sections.

The Coordinator system maintains four separate data bases of records of conversations and the moves taken within them. FIG. *e*10 displays the data elements included in the records in each of these data bases, and the relationships among the data bases. These data bases are:

The Conversation Data Base, containing records of the set of all current conversations;

The Moves Data Base, containing records of the set of all moves made by participants in those conversations;

The Token Data Base, containing records of current incompletions in those conversations;

The Text Data Base, containing records (also called "tokens" in other contexts) representing the possibilities that have been declared in those conversations.

(1) Conversation Data Base

The conversation data base is formed of a set of records with one record kept for each conversation. Each record contains data referring to the following elements:

(a) a unique identification for each conversation generated automatically by The Coordinator system, which identification will maintain its uniqueness over an indefinite period of time, and in different storage devices used for the conversation records of different participants in the conversation;
(b) the identities of the participants (requestor, promisor, and observers) in the conversation;
(c) the type of conversation—is it a request-type Conversation for Action, or a Conversation for Action of the OFFER type, or a Conversation for Possibilities;
(d) the role that the particular participant, whose conversation records these are, plays in the conversation;
(e) the domain of possibilities of the conversation;
(f) the "action or possibility" of the conversation;
(g) the current state of the conversation ("Conversational State" is a notational convention used in the programming of The Coordinator system, where such states correspond to specific conditions of incompletion of specific categories of conversations and are defined by the presence and absence of particular incompletions. The definition of states and the operation of "finite state machines" within the program are discussed above in section e.;
(h) the identification of moves that have been taken in the conversation, including where records of moves may be found in the Moves Data Base;
(i) the identification of tokens of incompletion associated with the conversation.

(2) Moves Data Base

The Moves Data Base contains a set of records of individual moves in conversations. For a given conversation, this data base may contain only one move, if only one has been taken, or 15 moves, or a very large number of moves. Each record of a move is identified as to the conversation in which it occurred. Each record of a move contains the following data elements:
(a) a unique identification associated with the particular move;
(b) the identification of the conversation in which the move took place;
(c) the speaker and listener of the move;
(c) the action or possibility of the move;
(d) the category of the conversation;
(e) the specific type of permitted move it is;
(f) the domain of possibilities of the conversation;
(g) the address, in the Text Data Base, of the "text" associated with the move;
(h) the addresses, in the Moves Data Base, of the next and previous communications in the conversation, which addresses are enumerated here as a programming convention to accelerate the rate at which records can be found and presented to a participant.

(3) Token Data Base

The Token Data Base contains records of the tokens associated with current incompletions the conversation. The Token Data Base contains a set of records each of which has the following data elements:
(a) a unique identification associated with each token;
(b) the type of token (in the current implementation, "response", "fulfillment", or "alert"), which types of tokens are discussed above in section d.;
(c) the date declared for completion of the incompletion to which the token refers;
(d) the identification of the conversation in which the incompletion is declared;
(e) the identification of the move in which the incompletion was produced.

(4) Text Data Base

The text associated with moves is kept in a separate Text Data Base. The address of text associated with each move is stored in the record of the move, for purposes of fast recovery of the complete records of moves. Also located in this data base is the identities of the observers of each particular move, thereby allowing (a) participants making moves to "inherit" the current observers of a conversation, and (b) allowing the list of observers in a conversation to be modified by the participants as the conversation progresses.

Figure 13:
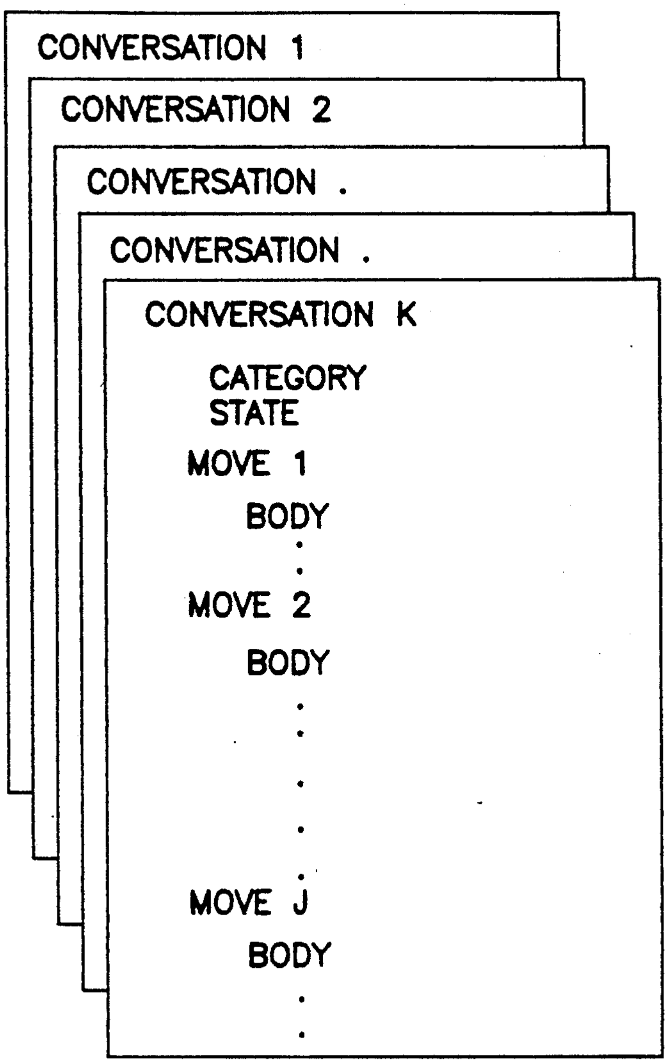
FIG. 13 illustrates an alternative conversation record structure which may be employed in a system implementing the method of this invention.

The particular conversation record format employed in the current embodiment is defined specifically for the purpose of producing speed and facility for a participant engaged in conversations through The Coordinator system using IBM PC-XT-type personal computers communicating across phone lines and local area networks. A simpler conversation record format would suffice in centralized and other architectures, such as that depicted in FIG. 13.

h. The Conversation Management Program

The Coordinator system implements a conversation management program that allows participants to engage in a very large number of conversations with the support, control, and coaching of a "Conversation Manager". Operation of the Conversation Manager incorporates the steps and features described in this section.

(1) Initiating Conversations

Figure 14:
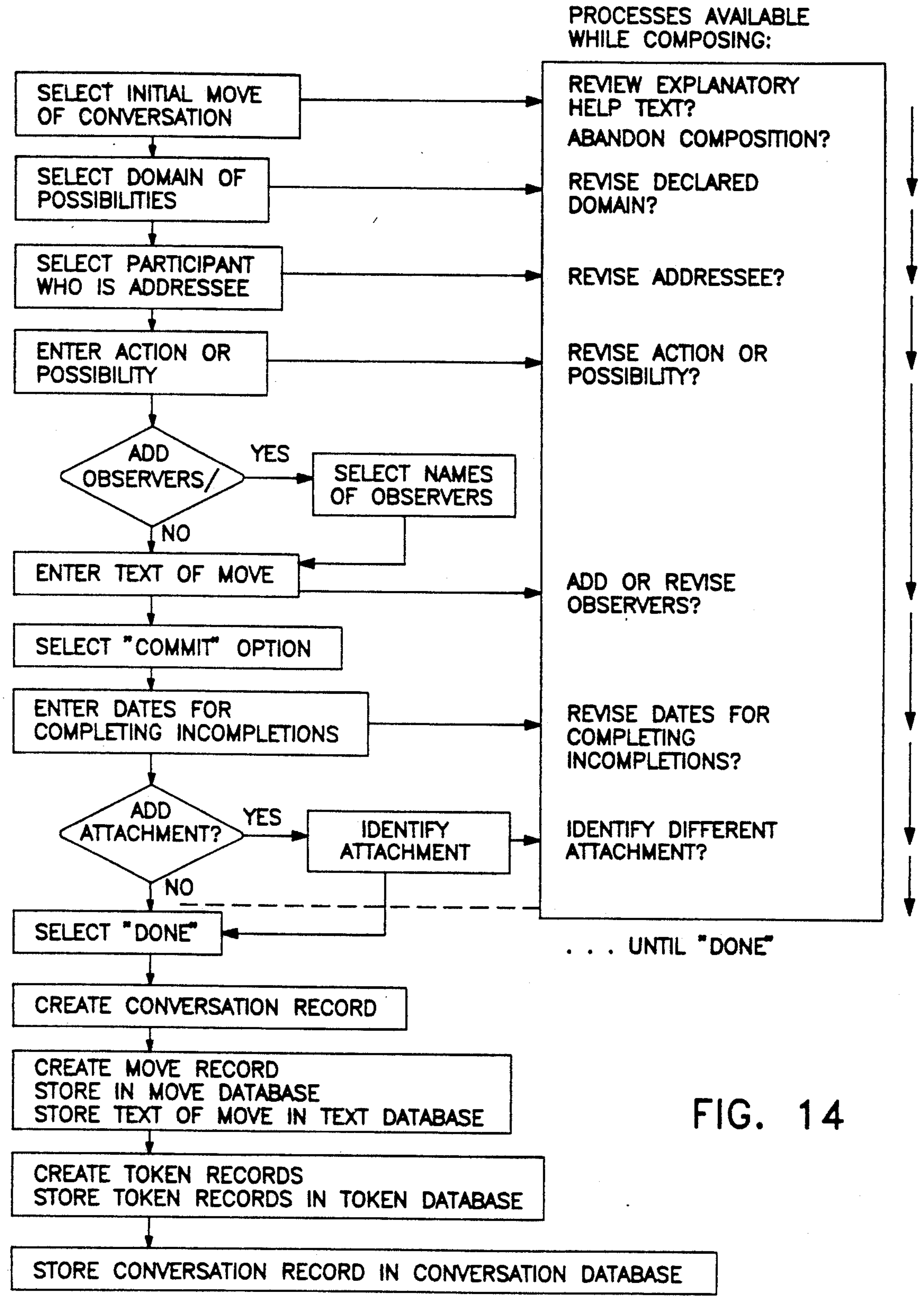
FIG. 14 is a flowchart illustrating method steps for opening a conversation and making an initial move in accordance with one embodiment of a system incorporating the method of this invention.

The Conversation Manager provides facilities for use of each participant in opening a new conversation with an initial move and entering associated data. A participant may initiate a conversation in The Coordinator system by selecting a starting move from the "CONVERSE" menu (illustrated in Table 1). The process of initiating a conversation under control of the Conversation Manager is illustrated in FIG. 14. The starting conversational moves presented in the CONVERSE menu are: Request, Offer and Declare an opening in a Conversation for Possibilities. It is also possible to open conversations by using "control-key commands".

After a participant selects a starting move, The Coordinator system presents a menu of declared domains of possibilities. (This menu is illustrated in Table 2.) The participant may select an entry from that menu to be the domain of possibilities for the conversation he is initiating, or he may use utilities available through a function key to add a declaration of a domain to the menu and then select that one as the conversation's domain of possibilities.

The Coordinator system then presents a list of participants with whom the participant regularly converses, assembled from names entered in the Network of Help, described below in item j. Typically, the participant selects the other participant from this list. If the participant decides that the conversation will have observers, a similar list is presented from which the participant can choose observers. (See Tables 3, 4, and 5.)

The Coordinator system then presents a menu in which the participant types a brief reminder of the action—an action to realize a possibility in a Conversation for Action—or a reminder of the possibility—a possibility to be declared in a Conversation for Possibilities.

After performing the actions indicated above, The Coordinator system presents an open space on the screen where the participant may compose text associated with his opening move in a conversation (using word processing facilities which are, in the current embodiment, integrated in The Coordinator system).

When the participant is finished entering the text, and presses a function key indicated on the screen and named "commit", he is presented with a form into which dates associated with an incompletion in the conversation are entered: date of completion, date of response, date of alert. (See Table 6.)

In this same form the participant may specify an "attachment"—by which is meant a data file of any type (including text files, executable programs, and other binary files)—that may be sent along with the communication to the other participant and to all the observers.

While preparing and composing a move, and before the participant selects "Done", means are available to him to do the following: review explanatory help text concerning his move; abandon his composition; revise the declared domain in which the conversation takes place; revise the addressee of this opening move; revise the action or possibility of the move; add observers to, or revise, the list of observers; revise dates for completing incompletions; and identify a different attachment than one had previously identified. (See FIG. 14.)

(2) Creating New Conversation Records

When the participant completes this menu by selecting "Done", (a) a new conversation record is created, and data associated with the conversation and the move are delivered to the Database Manager for storage in the participant's conversation records, and (b) a packet of data associated with the move is "posted" for delivery to each of its addressees, unless the communication is part of a conversation the participant is having with himself.

The Conversation Manager then generates a unique identification for the conversation; creates a conversation record in which it places all the gathered data and inserts the conversation record in the conversation data base; gathers the data that has been entered and selected for the initial conversational move; generates a unique identification for the move; creates a move record in which it places all the gathered data and inserts the move record in the move data base; gathers data for the associated tokens; generates a unique identification for each token; creates a token record for each tokens in which it places the gathered data; and inserts the token records in the token data base.

(3) Selecting an Existing Conversation

The Coordinator system provides a variety of facilities for use by a participant to select a conversation from among the existing conversations in which to make a move. One of the ways in which such selections are commonly made is described below under (7), where the facilities for reviewing new moves by other participants are described.

(a) Menus and Tools for Selecting Conversations

Table 30 shows a facsimile of the "Starting Menu" of The Coordinator system, wherein the options of selecting from among conversations that may be selected according to several criteria is presented:

- Read new mail, which gives new moves by other participants;
- Appointments and commitments, which gives a calendar for "today", on which selected incompletions declared for completion today will appear;
- Future appointments, which offers the option of reviewing calendars in the future (or past);
- Commitments due today, which gives a display of all incompletions declared by completion today by any participant in any conversation in which the participant is playing any conversational role.

Table 1 shows a facsimile of the CONVERSE menu, upon which appear in the right-hand column important sort criteria in The Coordinator system:

- Missing my response, giving a list of conversations in which the participant is missing his own declaration;
- Missing other's response, giving a list of conversations in which the participant is missing the declaration of another participant;
- My promises/offers, giving a list of conversations in which the participant is missing the fulfillment of another participant;
- My requests, giving a list of conversations in which the participant is missing his own fulfillment;
- Commitments due: <date>, giving a list of all conversations in which the participant is playing a role in which there are incompletions declared for a specified date;
- Conversation records, giving the menu shown in Table 15, which presents options for selecting conversations according to criteria in addition to that already described.

Table 15 shows a facsimile of the most comprehensive tool available in The Coordinator system for selecting specific conversations for making a move, or for considering the possibility of making a move. There, the participant may build lists of conversations based upon the following criteria, singly and in combination:

- conversations where the participant's response is missing;
- conversations where the other participant's response is missing;
- conversations in which a participant has made a promise and has not fulfilled it;
- conversations in which a participant has made a request which has not been fulfilled;
- conversations in which the other participant has made promises to the participant and those have not been fulfilled;
- conversations in which the other participant has made requests to the participant and those have not been fulfilled;
- conversations in a specific domain of possibilities;
- conversations a participant has with a specific other participant;
- conversations that were initiated within a specific range of dates;
- conversations having a date associated with an incompletion which date lies within a specific range of dates;
- conversations that are marked for purging;
- conversations that are open;
- conversations that are closed;
- conversations that have alert dates.

In addition, using the same menu, lists of individual moves may be selected based upon many of these same sort criteria.

(b) Lists of Conversations (or Moves) Selected

Selecting one or more sorting criteria from any of the menus described above will cause The Coordinator system to execute a search of the conversation records database and to produce on the screen a list, in a predetermined format, selected data summarizing the current list of selected conversations. See Table 17 for an example of a list of conversations in a particular domain.

The program incorporates the notion of "the current list", by which is meant that at any time some list of conversations has "already" been selected. If the participant has not specifically selected a list, then the list "already" selected is the list of all conversations. At times, for example, a participant may have previously been reviewing newly arrived communications from other participants, in which case the current list will be a list of "New Mail", or may have been reviewing conversations in a particular domain, in which case the current list will be a list of conversations in that domain.

(c) Algorithm of Selection from Conversation Records

The foregoing discussion describes the selection process in terms of the possible selection criteria and what the participant "sees" as a result.

Figure 17:
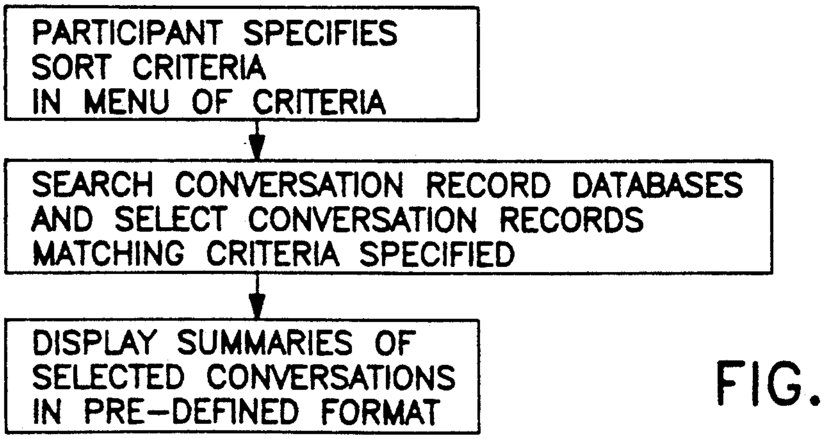
FIG. 17 is a flowchart illustrating method steps for performing conversation record sort and display operations in accordance with this invention

Inside The Coordinator system, the following algorithm implements the selection process. FIG. 17 gives a conceptual overview of the selection method.

First, when making a selection the participant decides if the list that will be built is a conversations or a communications list. If it is a conversations list, the conversations data base will be searched. If The Coordinator system is going to build a communications list, the moves data base will be searched. In either case, The Coordinator system tests one by one the selection criteria, to determine if a conversation or communication belongs to the specified list. So for example, suppose that a participant requests a list of all open conversations in the domain "people" and in which his response is missing.

The Coordinator system searches through the conversation data base, according to an ordering of criteria that may differ from the order of their appearance in the menu shown in Table 15. For each conversation The Coordinator system first determines whether or not that conversation is still open. If a reviewed conversation is not open, The Coordinator system stops reviewing that conversation and continues its search.

If The Coordinator system determines that a conversation is open, it next determines whether or not the response token for the participant is present. If that token is not present for the participant in the conversation under review, The Coordinator system stops reviewing that conversation and continues its search.

If the conversation being reviewed is open and the response token for the participant is present, The Coordinator system next determines whether or not the conversation takes place in the domain "people"?. If it does, the conversation will be included in the list being produced. If the conversation under review does not take place in the domain "people", The Coordinator system stops reviewing that conversation and continues its search.

The Coordinator system proceeds in this manner until all conversations in the database have been tested according to the selection criteria specified by the participant. The Coordinator system proceeds in a similar manner when the participant specifies selection criteria other than those considered in the above example. If no conversation or communication is found to meet the selection criteria, the message "Nothing pending. . ." is displayed.

(d) Tools for Reviewing Moves in Conversations

When a participant is working within the set of tools called "CONVERSATION" or "CONVERSE", the pressing of a specific function key will bring the "Read/Handle-by" menu to the screen. A facsimile of this menu is shown in Table 18. With the options presented in this menu, the participant may trace forwards and backwards through the moves of a conversation, go directly to the first or latest moves in the conversation, (if the current list is of new moves of other participants) go to the next or previous move in the current listed of new moves, produce the current list of conversations, and certain other options.

(e) Tools for Reviewing Whole Conversations

The Coordinator system includes facilities for reviewing the whole of any selected conversation as a utility available while working with conversations. These facilities allow for the following: the display of the initial and latest moves of the conversation; the possibility of tracing backwards and forwards through the moves of a conversation; the display of conversation category; the display of the domain of possibilities within which the conversation takes place; the display of the action or possibility of the conversation; the display of the conversation state; the display of the names of the conversation's participants; the display of the role of the participant in the conversation; the display of the dates associated with incompletions; the display of the number of moves in the conversation and of the number of moves that have been answered.

In addition, a participant may examine each move in a conversation, including for each move the following: the display of the type of move; the display of the action or possibility of the move; the display of the names of the participants and those of the observers; the display of the date on which the move was made; the display of the associated text of the move; the display of an indication that the move has or has not been answered.

(4) Deriving Permitted Moves

The Conversation Manager derives from the definitions of types of permitted moves and the conversation record corresponding to a selected conversation the set of currently permitted moves consistent with the role of the participant in the selected conversation.

The Coordinator system includes five FSMs to store the data structures of permitted moves. These FSMs are described above in Section e. They correspond to the three primary types and two sub-types of conversation defined in the current embodiment: REQUEST, OFFER, and PROMISE-TO-MYSELF Conversations for Action, Conversations for Possibilities a participant has with himself and Conversations for Possibilities a participant has with one or more other participants.

Figure 16:
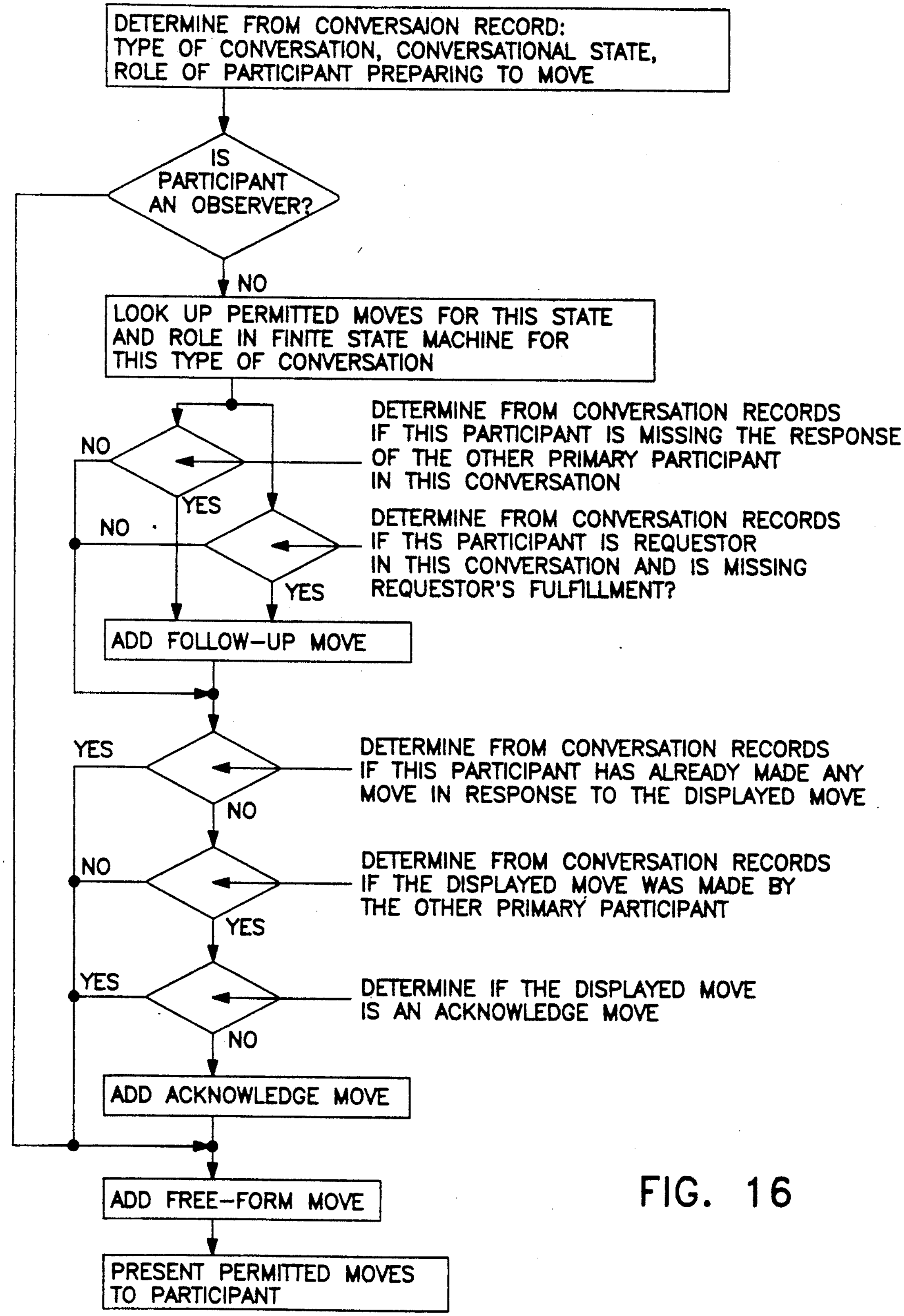
FIG. 16 is a flowchart illustrating method steps for determining the permitted moves in a conversation in accordance with one embodiment of a system incorporating the method of this invention.

FIG. 16 shows the steps The Coordinator system takes to produce the list of permitted moves when a participant selects an existing conversation in which to make a move.

If the selected existing conversation is a Conversation for Action, then when the list of permitted moves is assembled, it is presented on the screen in a menu of which Table 11 shows a facsimile. In this menu The Coordinator system distinguishes between moves that will produce a change in the state of the conversation—which appear in the right-hand column, and moves that will not affect the state of the conversation, which appear on the left.

If the selected existing conversation is a Conversation for Possibilities, then when a different menu will be presented, offering the list of permitted moves.

(5) Moves in Existing Conversations

The Conversation Manager provides facilities for selecting and making a move from those permitted in a selected conversation, and entering data associated with the move. From a list of conversations presented on the screen in one of the several pre-defined formats provided, selected with one of the several tools listed above, a participant selects an individual conversation in which to make a move by selecting new mail (described below), by pointing to the conversation in a list with the cursor and pushing the "Return" button, or with the "Read/Handle-by" menu described earlier.

When a participant has selected a conversation where he wants to make a move, The Coordinator system presents one of the two menus described above, for moves in a Conversation for Action, or for moves in a Conversation for Possibilities. From the presented menu, the participant selects a type of move to make.

Figure 15:
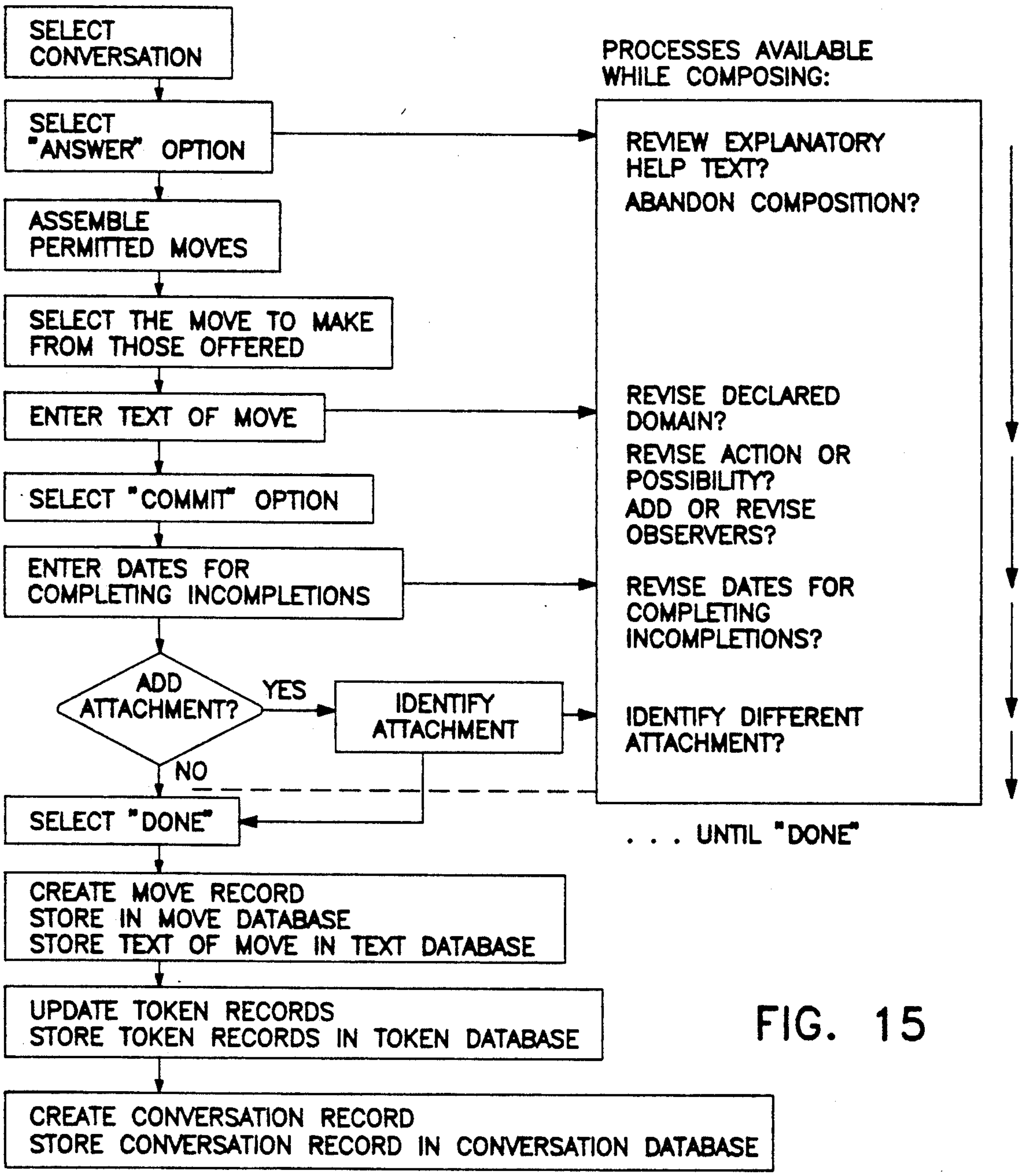
FIG. 15 is a flowchart illustrating method steps for making a move in an existing conversation in accordance with one embodiment of a system incorporating the method of this invention.

FIG. 15 illustrates the method of the program for making a move in an existing conversation which has previously been selected by one of the aforementioned methods. The process is directly parallel to the process of opening a conversation, described in h. (1) above, with these exceptions:

the domain of the conversation is given automatically (and it may be revised);

the primary participants of the conversation are given automatically (and may not be revised);

the observers of the conversation are given automatically (and may be revised);

the "action" or "possibility" of the conversation is given automatically (and may be revised);

the "action" or "possibility" of the particular move is given automatically (and may be revised);

recommended declarative text is presented automatically for most types of moves (and may be revised);

no conversation record needs to be created, as one has previously been created;

Then the participant edits the recommended text presented by the Conversation Manager and/or enters new text associated with the move, "commits" to his move, declares dates according to the incompletions presented by the Conversation Manager for the selected move, and specifies an attachment if any.

(6) Updating Stored Conversation Records

After a participant has made a move in an existing conversation, and has entered data and selected other data from menus, Conversation Manager issues instructions to the Database Manager to update the stored conversation record associated with the conversation in which the participant has made his move. Of course this updating includes storing the (previously defined) data that is associated with the move and the incompletions produced the move. This process is accomplished according to the method already described.

(7) Reviewing New Moves of Other Participants

The conversation manager provides facilities for a participant to review new moves made by other participants in conversations.

In the construction of a normal office environment, new mail arrives and is placed in holding facilities such as "in-baskets". In the tradition of electronic mail systems, such facilities have been copied into the electronic medium, and newly-arriving communications are held for review in some separate file or file structure until a person has dealt with them.

It would have been possible to construct a system according to the method described herein with such a facility. In such a case, when a participant made a move, one record of the move would be placed in the conversation records of the each participant in the conversation, and, for each participant, a packet of data would be placed into a discrete location, from which it would later be taken for review by the participant. After each participant reviewed this new move, the system would discard this copy, leaving the copy already present in the conversation records. It would also be possible to construct the system in such a way that it was not put into the conversation records until it was reviewed.

However, the present method allows a major innovation from traditional practices of handing new incoming communications. Specifically, according to the present method, an additional incompletion is defined in which what is missing is the declaration by a participant that he has had the opportunity to review a new move by another participant, and has had the consequent opportunity to make a move himself in response. In the current implementation, a new move token of binary value is stored in the token data base of each participant addressed in the new move. In the current embodiment token records for this incompletion are declared automatically by the system on recording a new move in an addressed participant's conversation records, and are declared complete also automatically by the system after the participant has reviewed the new move.

When a participant "logs" into The Coordinator system, as part of the procedure followed by The Coordinator system for initiating a work session, the Conversation Manager reviews the Moves Data Base and, if it encounters a new mail token it places on the screen, as part of the starting menu, the option, "Read new mail" and places the cursor at that option to call attention to the presence of new moves. (See Table 30.)

The "Read new mail" indication also appears on other menus, including the CONVERSE menu (Table 1), if new moves are present.

The result of this method is that each new move arrives to the attention of a participant in the context of the full set of records of the conversation in which the move was generated. This permits tracing through conversation records even as new mail is received.

i. Coaching

For each defined type of permitted move in The Coordinator system a particular name is defined in a way that is specifically adapted for use of the system by a predetermined community of participants in conversations. Each such name has been chosen so as to prompt participants to distinguish the characteristics of the named type of move according to the common understanding of members of the American English-speaking community. The process of prompting a participant in a conversation to distinguish for himself new and valid possibilities for declaration and for action which may be taken within the conversation we call "coaching".

(1) Naming Moves in a Specific Community of Speakers and Listeners

As described above, The Coordinator system displays to participants using the system the names of permitted moves in the form of menus and provides the facility to participants to select a move from such menus.

Further, the method of this invention has been adapted for use by participants among and/or between different communities having different languages and different terminologies for the same conversational move. In these cases—in the development of versions operating in the Spanish and Italian languages—the step of defining a set of types of permitted moves includes individually defining particular names for each move which name corresponds to the particular community, where the names defined for each community are names that will prompt participants in that community to distinguish the characteristics of the move according to the common understanding of that community.

It is understood that the step of establishing a conversation management program in this case still includes the steps of providing a facility for selecting for each participant one of the defined set of names of moves according to the participant's community, and displaying to participants the permitted moves in the form of menus, and providing the facility to participants to select a move from such menus.

This method of constructing a version of the embodiment of this system in a community of participants who have inherited a different language than American English is NOT a matter of "translating" the words from American English to some other language. Systems constructed according to this method present conversational moves to a participant consistent with the possibilities for invention or realization the participant is distinguishing (or being invited to distinguish) as the participant uses the system, within some particular community. We note for example that the moves defined rigorously within the current embodiment in terms of the structure of (a) conversational roles, (b) incompletions of possibilities and actions, and (c) moves that have been taken already in a conversation, are not by any means most effectively named—even within every definable segment of the American-English-speaking community—with the same names given in the current embodiment. Different geographic segments, different corporate cultures, different social and religious groupings may be more effectively prompted to distinguish the specific social conversational moves that are presentable through this method with different names.

The conversational moves presented by this method prompt (a) the speaker, listening to his own possibilities in some moment, to move in a way that is consistent with declaring specific realizable possibilities or producing actions to complete specific possibilities; and prompt (b) other listeners (when the speaker is not speaking to himself) to distinguish specific realizable possibilities or possible actions for completing specific possibilities, all within a specific community of participants.

Let us give an example. In a conversation with himself, person "a" distinguishes a new possibility for himself within a domain of possibilities. Next, "a" distinguishes actions which might be taken by person "b" to realize that possibility. The system will present a move for opening a conversation for producing action by "b" to realize a specific possibility distinguished by "a" for "a".

For the purpose of coaching "a" to invite "b" to distinguish for himself this moment in a social conversation for realizing possibilities in a way consistent with American English-speaking peoples' social conventions of distinguishing this type of moment, the system presents the name, "request" for the possibility of this move. A version of the system for Italian-speaking people presents coaching in the equivalent moment of the opening of social possibilities with the word, "invitazione" (cognate to the American English "invitation"). A version of the system for Spanish-speaking people presents coaching in the equivalent moment of the opening of social possibilities with the word, "peticion" (cognate to the American English "petition").

When "a" distinguishes a possibility for "b", and "a" distinguishes actions which might be taken by himself to realize that possibility, the system will present another move. For the purpose of coaching "a" to invite "b" to produce for "b" this distinction in a way consistent with American English-speaking peoples' social conventions of distinguishing this moment in a social conversation for realizing possibilities, the system presents the particular name, "offer" for the possibility of this move.

In this way (a) the structure of the social distinction, invention, and realization of possibilities in conversations, (b) the moves of speakers in such conversations, and (c) the particular distinctions presented by the system for coaching speakers' and listeners' distinguishing, are related to each other in the definition of the system and the conversations it will support.

Versions of this system specifically constructed for use in particular communities of speakers and listeners could coach participants by presenting words which prompt the making of distinctions for specific realizable possibilities or for producing actions to complete specific possibilities in those particular communities.

For example:

(a) Instead of the word, "request" to prompt the making of a particular distinction, the system might present "ask", "invite", "command", "petition", "order", "recommend", "want", "need", "require", "hope", or other words, tokens, sounds or pictures for coaching in this moment of the social invention and realization of possibilities in some English-speaking community of speakers and listeners.

(b) Instead of the word, "offer", the system might present "propose", "invite", "recommend", "advise", or other words, tokens, sounds or pictures for coaching in this moment of the social invention and realization of possibilities in some English-speaking community of speakers and listeners.

(c) Instead of the word, "promise", the system might present "agree", "will do", "OK", "commit", "can do", "guarantee", "consent", "will attempt", or other words, tokens, sounds or pictures for coaching in this moment of the social invention and realization of possibilities in some English-speaking community of speakers and listeners.

(d) Instead of the phrase, "Declare an opening" (for the move initiating a conversation to invent possibilities), the system might present "speculate", "what if . . .?", "formulate", "comment", "assess", "what do you think about this?", "dream", "visualize", "wonder", "explore", "imagine", "plan", or other words, tokens, sounds or pictures for coaching in this moment of the social invention and realization of possibilities in some English-speaking community of speakers and listeners.

(2) Explanatory Help Text

For each of the defined types of moves The Coordinator system provides explanatory help text discussing the distinctions of that type of move, in common terms indicating the structure of role, incompletion, and prior moves in the conversation. The Conversation Manager enables participants to access explanatory help text for each displayed permitted move. Tables 19 through 28 show samples of such text from the American English-speaking version of The Coordinator system. A participant may review such coaching text for specific moves when he is in the process of selecting among the permitted moves, by pressing a function key which, in The Coordinator system and according to the traditions of the personal computers upon which it operates, is the key, "F1".

(3) Recommended Declarative Texts

For each of a plurality of defined types of moves the Conversation Manager presents a body of recommended declarative text pertinent to that move. These pre-worded texts may be deleted or changed. As recommended declarations, these texts serve as models to the participant for composing his own texts.

The following are examples of the pre-worded texts presented by The Coordinator system.

The following is presented upon selecting the move, "decline", responding to a request move.

I decline your request.

Notice that the coaching coaches the participant to distinguish the elements of this social move that are concerned with the future of the participant's possibilities, and not with the social-approval dimensions of declinations, as in "I reject you."

The following is presented upon a requestor or promisor's selecting the move, "counteroffer", responding to a request, offer, or other counteroffer move:

No; I counteroffer:

. . . leaving the participant in condition to "finish the sentence."

The following is presented upon a promisor's selecting the move, "promise", responding to a request move (or to a counteroffer by a requestor):

I promise to do as you request.

Frequently a participant need only press a key or two to verify and record this text as his move, and because the conversational history is maintained by the Conversation Manager, no further recording actions by the promisor are required to fully invent and communicate a social commitment and coordination out of which work will be done.

The following is presented upon a requestor's selecting the move, "declare complete" at one of the times it is permitted in a Conversation for Action:

Thank you. I declare that we have fulfilled our conditions of satisfaction in this conversation.

Notice that the coaching points directly at the phenomenon of completion. At the completion of conversations participants in conversations discover that they have new possibilities available to them.

The following is presented as a participant in the role of requestor selects the move of declining a promisor's counteroffer.

I decline your counter-offer. My last request still stands, and I ask that you respond to that.

Notice the way in which the Conversation Manager prompts ("coaches") the participant to attend to particular elements of the history of the conversation which are relevant to the fulfillment of the possibilities already declared in the conversation: a requestor's prior request is declared, in the set of permitted moves implemented in The Coordinator system, to remain open until declared complete, declined or cancelled by one of the participants. Counteroffers within the conversation do not have the incidental side effect of causing the disappearance of the original request and opening of possibilities it declared. This gives an example of how this method of invention can itself participate directly in the improvement of management.

The following is presented as a participant selects the move, "declare-complete" for himself, following the move of "decline" made by the other primary participant in the conversation:

I have received your communication informing me that you have committed not to fulfill the conditions of satisfaction in this conversation.

The following is presented as a participant in the conversational role of requestor selects the move, "cancel".

I apologize; I am cancelling my request. Thank you for any work you have performed on it. Please make a request for compensation if you conclude it is warranted.

Notice that in this case the coaching presented by The Coordinator system includes coaching regarding (a) the repair of the mutual social space of possibilities in which participants have previously had the opportunity of conversation with each other to begin with ("I apologize"), (b) regarding likely or possible historical circumstances which, while not visible in the specific declarations of the records of the conversation, are a part of the structure of conversation of this type ("Thank you for any work you have performed on it."), and (c) regarding future moves that the participant may elect to take in order to produce the possibility of other declarations and actions in the future ("Please make a request for compensation if you conclude it is warranted.")

We draw the reader's attention to this NOT as a "good way of saying something"; in fact, we recommend in instruction manuals for The Coordinator system that the participant change this specific wording and regard it only for its presence as a coach of possibilities. Rather, we draw the reader's attention to the extraordinary richness, rigor, and unity of the system of distinctions of this method evidenced in these examples. The specific text presented above, as it appears at various points in conversations, are not "suggested protocols" for conversation. Rather, The Coordinator system itself is a system for supporting the declaring of possibilities and the taking of action in conversations, and all of the distinctions drawn in the text shown above are brought forth specifically from and according to the distinctions of the methodology itself, which begins with the definitional steps of:

a. defining all communications between a set of participants as moves in conversations for declaring specific realizable possibilities or as moves in conversations for producing actions to complete specific possibilities;

b. defining the conversations as taking place within a set of declared or understood domains of possibilities;

c. defining a set of conversational roles played by participants in the conversations, with each participant playing at least one conversational role in any such conversation; and d. defining a set of types of incompletions which occur recurringly within the conversations, including a first type in which a conversational move by at least one participant to declare at least one specific realizable possibility is missing, and a second type in which a conversational move by at least one participant to complete a specific realizable possibility is missing.

(4) Implementation in Different Languages

All of the pre-worded (suggested) messages, strings, and coaching and other texts of The Coordinator system are maintained as separate files during the construction of The Coordinator system, and are only brought together during the compilation of a particular (language or community) version of the programs. With this implementation organization, it is possible to efficiently produce versions of The Coordinator system for multiple languages.

In the Spanish version of The Coordinator system, the defined moves for the requestor are: "petición", "contra oferta", "cancela", "declina", "seguimiento", "texto libre", "enterado" and "declaración de completo".

In a Conversation for Action of the REQUEST type the defined moves for the promisor are: "promesa", "declina", "contra oferta", "cancela", "cancela con una nueva promesa", "prometo prometer", "reporte preliminar", "reporte de completo", "seguimiento", "texto libre", "enterado"y "declaración de completo".

In a Conversation for Action of the OFFER type the defined moves for the promisor are: "oferta", "promesa", "contra oferta", "reporte preliminar", "cancela oferta", "cancela con nueva oferta", "reporte de completo", "seguimiento", "texto libre", "enterado"y "declaración de completo".

In a Conversation for Action of the OFFER type the defined moves for the requestor are: "acepta oferta", "contra oferta", "prometo prometer", "declinar reporte", "cancela", "seguimiento", "texto libre", "enterado"y "declaración de completo".

While different compilations of The Coordinator system present all menus, coaching and other texts in different languages, nevertheless, the system is constructed such that different compilations share a unified data structure and, as a consequence, it is possible for participants working with equivalent English and Spanish versions of The Coordinator system to communicate with each other without requiring modification of communications, labels, token names, move names, or other texts provided by The Coordinator system. Someone observing such a conversation will see all the coaching, menu, and other texts appearing in two different languages, while the declarative texts spelled out by the participants will appear in whatever language they are speaking.

Another effect of this is to simplify the interpretation of social transactions conducted across languages, because for each participant The Coordinator system is providing coaching regarding the move being taken in the language of the participant.

j. Calendars

The Coordinator system includes a set of facilities for presenting calendars and like displays of incompletions. The particular relevance of this facility within the present method is rooted in the fact that participants, speaking in conversations, speak from physical bodies, and from time to time those physical bodies, and physical artifacts that are related to the capacity of those bodies to support conversations (e.g., buildings, rooms, vehicles, equipment) need to be located in particular locations or committed to particular purposes, in order that participants may declare possibilities for action and may declare specific actions for completion of possibilities.

In The Coordinator system an additional type of incompletion is defined. In that type of incompletion what is incomplete is the realization of the declared possibility that a physical entity will be located in a specified location, or will be employed for a specified purpose, at a particular time. In other words, a participant has declared the possibility of something (including his body as a possible "something") will be located somewhere or committed to some purpose at some time, AND that participant declares a specific time at which this incompletion is to be completed with the action of putting the "thing" in a location or committing it to a purpose. (This structure of incompletion corresponds to the structure of "missing declaration" and "missing move" found in the definitions of conversational incompletions.)

This incompletion is represented by a token which records the date/time combination:

(a) beginning date/time, (b) ending date/time.

In addition, we define a type of move in which the participant declares an action for completing the incompletion of a declared realizable possibility of the future location or commitment of an entity. This type of move is permitted to any participant in any role. This move is defined to be the opening move in a conversation that a participant conducts with himself, called "set time" or "set a commitment". In this discussion, this move will also be referred to as "make a time commitment".

The Coordinator system includes facilities to make "time commitments" (appointments);

to cancel previously made time commitments;

to revise previously made time commitments;

to review a list of conversations in which alerts are declared for a calendar date;

to review a list of conversations in which the response of the participant is missing and declared due on a calendar date;

to review a list of conversations in which the response of the other participant is missing and declared due on a calendar date;

to review a list of conversations in which fulfillment of promises are missing and declared due on a calendar date;

to review a list of conversations in which fulfillment of requests are missing and declared due on a calendar date;

to enable the user to review daily and weekly calendars in the present, future, and past.

To make a time commitment, the user completes a form provided by The Coordinator system in response to the user's selection of "Set time" or "Set a commitment" from the appropriate menus. Table 19 illustrates a facsimile of that form. The form allows for entry of the following data:

date for which a time commitment is declared;

starting and ending time of the time commitment;

the declared action to complete the declared realizable possibility of the "time commitment", which includes a short name that is displayed in all summary lists of time commitments and in calendars, and further opportunities to declare specifics;

an alert date that may be declared for this conversation;

further remarks, which gives space for extensive declaration of the participant's agenda for the time commitment;

an indication as to whether the time commitment will be included as a move in some other conversation in which this participant is playing a conversational role.

If the participant chooses to link a time commitment into an existing conversation, the time commitment is added as a move in a presently-selected conversation in the participant's conversation record, and this new move does not change the state of the conversation; the move can be reviewed when the conversation is reviewed.

If the time commitment conflicts with a previously declared time commitment, The Coordinator system shows both time commitments and gives the participant the following choices: commit to the new time commitment, cancel the previous commitment; keep the previous commitment and cancel the new one; revise the previous commitment; revise the new commitment; or, commit to both time commitments, in which case a special mark is placed in the calendar to indicate the time conflict.

Calendars are operated in The Coordinator system under the control of the Conversation Manager. The Conversation Manager gives special instructions to the Interface Manager regarding the special displays that are presented as facilities for handling this type of conversation in which what is missing pertains to location or commitment to purpose of a physical entity. (See FIG. 12.)

Time commitments are stored as moves in the moves data base, and associated tokens are stored in the tokens data base. Time tokens take the declarations of date and two associated times corresponding to starting and ending times of the declared incompletion. The date and times of these tokens are used to produce listings and displays of time commitments in daily and weekly calendars.

In the daily calendars, along with the time commitments, The Coordinator system shows conversations which have incompletions declared for completion on the day for which the daily calendar is displayed. In this manner The Coordinator system builds a unified display of the commitments of a participant on a particular day emanating from all conversational moves handled by the Conversation Manager.

From the calendar display, the particpant may select a time commitment to review, revise, or cancel. Multiple windows are used by the Interface Manager to display selected time commitments together with text declarations made with the commitment. If the time commitment had been linked to an existing conversation, that conversation can be reviewed at the same time.

To build a calendar, The Coordinator system uses the token data base. In that data base all tokens can be sorted according to the associated date. The Coordinator system searches that data base and selects those tokens whose date is the date for which a calendar is being built, and at the same time builds the lists of time commitments and conversations with incompletions due that date.

The resulting list of conversations is sorted by the type of incompletion, such that the conversations are grouped by type of incompletion. Table 13 is a facsimile of this calendar display. The resulting calendar display shows the time commitments for that date, then the list of conversations with alerts declared for the day of the calendar, the list of conversations where the response of the participant is missing, where the response of the other participant is missing, where a promise is due, and where a request is due.

For every conversation listed, the following information is displayed: the type of incompletion, the state of the conversation, the domain of possibilities of the conversation and the action or possibility string. From the calendar, a participant may select a specific conversation for review by pressing the "Enter" key on the keyboard.

The participant may make a permitted move in such a selected conversation. If after making that move the incompletion that caused the conversation to appear in the calendar is no longer present, the conversation will no longer appear in the calendar when it is requested again.

k. Postman: Processing Incoming and Outgoing Communications

The current embodiment of the method of this invention is adapted for use in situations in which each participant utilizes a separate version of The Coordinator system on a personal computer, and their separate systems are linked by a communication channel.

The conversation record format in The Coordinator system includes a conversation identification token, and the system's conversation management program creates a unique identifier for each new conversation and enters that identifier into the identification token of the appropriate conversation record.

The Conversation Manager assembles a predefined packet of data associated with each move by a participant (in a new or existing conversation) in which another participant is participating at different personal computer, together with the conversation identifier for the conversation; provides a facility to send and receive that predefined packet of data via that communication channel; uses the conversation identifier included in each received packet of date to determine whether the received packet is associated with a new conversation or an existing conversation; creates a new conversation record for each received packet of data associated with a new conversation; and retrieves and updates a stored conversation record for each received packets of data associated with an existing conversation.

(1) The Postman and the Network of Help

The "Postman" is a subsystem of The Coordinator system that allows a participant using the system to communicate with other participants who use The Coordinator system, on computer systems that are not physically connected. Each such computer system—consisting of a microcomputer system or a "local area network" to which microcomputer systems are attached—is termed a "host" in the following discussion. The postman assembles all communications that have been produced by participant at a host that are directed to participants at other hosts, and then makes connections, directly or through a "Hub", and sends and receives such communications to other hosts.

Although more than one participant can use The Coordinator system on a single microcomputer "host", it is presently more common for each participant to run The Coordinator system on his own personal computer. Participants' computers can be located in geographically distinct locations. Postman links separated hosts.

In the files of every host (individual personal computer or local area network/personal computer installation), The Coordinator system keeps a table of individuals and hosts declared available to participate in conversations. That table is sometimes referred to as the "Network of Help". The Coordinator system provides facilities for reviewing and modifying Networks of Help.

Notice, in FIG. 12, the relationship of the postman among the basic functional elements of The Coordinator system, including the network of help.

In the current embodiment, the postman interfaces directly to a telephone system by using modems that may answer the telephone automatically and that may dial it automatically too. The postman uses a high-level telecommunications protocol to transfer communications between one host and another.

Since it is impractical and ineconomic for each host to individually connect separately to each of many hosts in order to exchange communications with them, The Coordinator system is structured for use with "communication servers", called "hubs", that function as "store and forward" communications systems. These are personal computers with modems, normally operating in "standby" mode, ready to accept incoming communications, 24 hours a day. If the number of communications that a hub must process is too large for a single microcomputer to handle, The Coordinator system handles such communications with a suitable number of personal computers inter-connected in a local area network and linked with a rotary telephone system.

Network of Help facilities enable a participant to define the characteristics of the different hosts he may communicate with. These characteristics include: the name of the host; the "routing", that is, the telephone number at which to reach either the host or a hub through which, in turn, communications may directly, or indirectly, reach the host; and the preferred times of connection.

By interconnecting hubs it becomes possible for communications to go from one host to another by passing through one or more hosts and hubs before reaching their destinations. To make that possible, the host name and routing is defined in every host or hub through which the communication is routed.

(2) Communications Packets and Headers

Each communication composed in The Coordinator system and destined for communication to a different storage device or location contains two distinct parts: a "header part", and a "body part". The header part contains information about the communication, including such components as: date of creation, identification of communication, originator, recipient, action or possibility of communication, observers, associated dates of incompletion, identification of conversation, domain of possibilities, and the other elements defined in the previous section on conversation records. When a communication is being composed and when it is brought to the window, some parts of these "headers" (components of the header part) may be viewed at the top of the window.

The headers are identified with special keywords, such as "date", "message-id", "from", "to", "action", "conversation-id", "copies", "complete-by", "respond-by", "domain", and such phrases.

Every one of these headers has a value which is a string. Each of these values has a specific format, which varies according to the type of information the value contains. For example the "date", "complete-by" and "respond-by" headers have string values that corresponds to a special format for dates. The "from" and "to" fields contain a string formed by the composition of two strings and a symbol '@' between them. The first string is a participant name and the second string is a location or host name. The "copies" field contains a sequence of these name/host strings separated by commas.

The body part of a communication is the text that the participant enters when composing the communication. Within The Coordinator system, special characters are used to identify the start of a communication, to separate each header field and to separate the headers from the body of the communication. This structure allows The Coordinator system to combine several communications in one single file for transmission.

When a new communication arrives, The Coordinator system "parses" the header part of the communication in order to gather data needed to identify the communication. The gathered data includes specification of the following: the conversation to which the communication belongs; the identity of the sender, the type of move, the declared domain, dates of incompletion, the identifier of the conversation and the identifier of the communication,.

When a communication is being composed, its headers are constructed with values obtained from data that is automatically generated (the identifications of communications and conversations) and with data entered by the participant.

Once this data is collected the communication record is built and inserted into the communication data base. A conversation record is created if the communication starts a new conversation, if the conversation already exists, the corresponding conversation record is updated. Such updating involves computation of the new conversational state and modification or creation of tokens. Such tokens are modified or created depending on the type of move and the state of the conversation and are then inserted into the token data base.

Finally the communication itself, including headers and body, is inserted into the text data base. The location at which the communication is stored in the text data base is kept in the communication record, to expedite retrieval when the communication is to be displayed.

As a result of such manipulation of data structures, every communication resides in several data bases simultaneously, one for each participant and observer of the conversation. Even though each conversation record exists in the database of The Coordinator system used by each participant, the data of the record is not necessarily the same in each database. For example, the state of the conversation is different for participants and observers, and the tokens of the conversation are different for each participant and observers.

When a participant has committed to sending a communication, The Coordinator system prepares one copy of the communication for delivery to each participant in the conversation. Note that a recipient may be a "local user", that is a participant in the same location or host as is the participant sending the communication. (The local user relation between two participants may obtain for people sharing a stand-alone version of The Coordinator system or for people in the same local area networks.) If a recipient is a local user, the communication is appended to a "mail" file that contains all the communications that have been delivered to the participant but that have not yet been integrated into the participant's mailbox.

If the participant is not a local user, a special file, called a "boxout" file, is generated for the outgoing communication. Each such file has a special structure that includes the communication itself as it is stored plus extra data, in a format that the postman will handle, which data indicates the host to which the message is to be delivered.

When the postman is invoked by the participant, it collects all such "boxout" files and either creates a special file, called an "out" file, or appends them to an already existing "out" file, for each host to which it has moves to send. "Out" files have a special format that the postman uses to process them. Each "out" file contains all the communications that will be sent to a particular host in a single file.

The Coordinator system maintains a reviewable list of all queued communications—of all communications contained in "out" files. A participant may discard any queued communication. If a communication is not discarded it remains queued until it is sent to the appropriate host. Should a telecommunications connection be broken before the whole of any queued communication is sent then that whole communication remains in a boxout file.

When a connection is established with another host or hub, the postman looks up the corresponding "out" file and sends it to that host or hub. Such connections are established between two postman systems operating at each of two hosts. One postman functions as the "sender" while the other functions as the "receiver". In the course of a single connection the two postman systems can play both roles, so that one postman sends while the other receives, and then the roles are reversed. As a result, the postman that originated the call can also receive, in the same connection, the communications that are pending for it in the other host.

After the connection is terminated, the received communications are placed in one file, called the "in" file. This file has a structure similar to that of the "out" file. The postman then processes each communication in the "in" file. If a communication is for a local user in this host, the communication is placed in the "mail" file for that participant. If the communication is for another host (that is, if it has to be rerouted to another host) it is placed in the "out" file corresponding to that host and will be sent to that host the next time there is a connection with that host.

(3) Processing Incoming Mail

Figure 18:
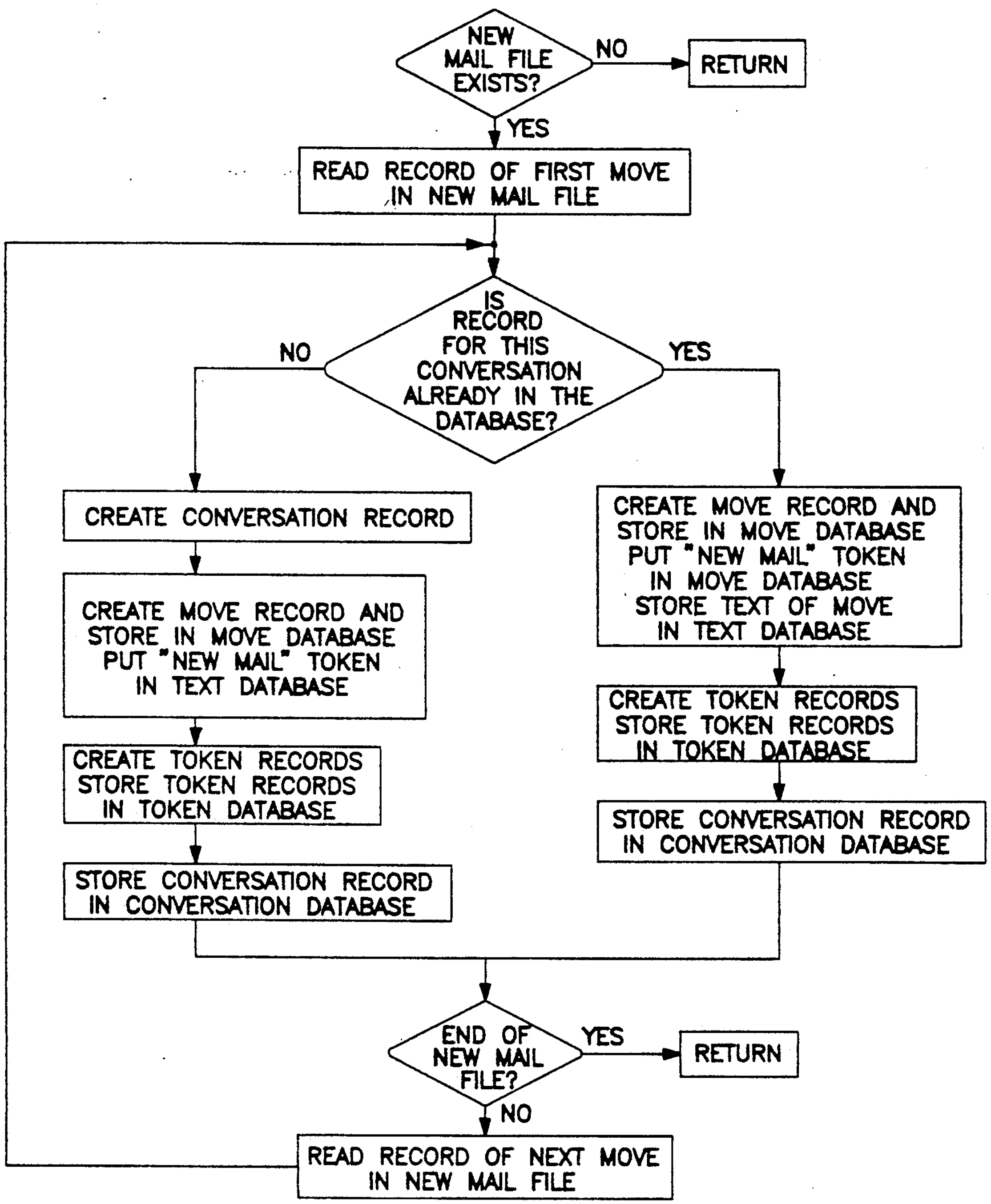
FIG. 18 is a flowchart illustrating method steps for processing new mail in a system incorporating the method of this invention.

Whenever a participant "logs in", to begin use of The Coordinator system, The Coordinator system looks up the "mail" file and if any communications are contained in that file those communications are processed and integrated in the data base according to the algorithm described in FIG. 18. The Coordinator system performs similarly whenever the participant presses the function keys corresponding to "TODAY" or to "CONVERSE". (As part of the processing and integration of incoming communications, The Coordinator system "parses" the header part of each incoming communication to gather the data needed to handle the communication. That data includes: conversation to which the communication belongs, identity of the sender, domain, dates of incompletion, communication identification, conversation identification, etc. For each incoming communication, The Coordinator system determines whether or not it is part of an existing conversation. If it is not, a new conversation record is created for it. In either case, The Coordinator system determines if the move is a permitted move given the category of the conversation, the state of The Coordinator system and the role of the participant. If it is not a permitted move then it is treated as a free-form move and processed accordingly. Next, The Coordinator system creates the move and token records, gathers the associated data and inserts it in those records, performs the token manipulations for the state-transition and updates all the corresponding conversation, move and token data structures. Finally, note that in local area networks delivery of communications happens continuously while the participant uses The Coordinator system.)

If any new communications have in fact been processed, the participant is presented with the option "Read new mail".

l. Overall Structure of the Coordinator system

FIG. 12 illustrates the overall structure and functional relationships of the program and data base management facilities of The Coordinator system. All conversation records (including records of time commitments) are maintained in a conversation record data base under the basic management of a Database Manager. However, the actual supervisory management of the creation, storage and retrieval of conversation records is handled by the Conversation Manager.

The Database Manager may be of any standard type having the capability to handle the types of records that The Coordinator system is required to manage. For example, in the current embodiment of The Coordinator system, a B-tree data base system was used as discussed above. The Database Manager also maintains, under the supervision of the Network of Help Manager, the data relating to participants in the Network of Help.

Long Run calendar data is stored in a separate data base or file structure under the control of the Interface Manager which includes separate program facilities for managing such data. The Interface Manager manages displays of screens, including windowing. It also manages integration of other program facilities such as word processing, and controls the operational significance of function keys on the keyboard.

The Conversation Manager and the Network of Help Manager together coordinate and control the sending and receiving of messages through the Postman facility. All of these functional relationships involve standard computer and communications technologies which are well understood and need not be explained in detail here.

m. Function Key Facilities of The Coordinator System

Figure 19:
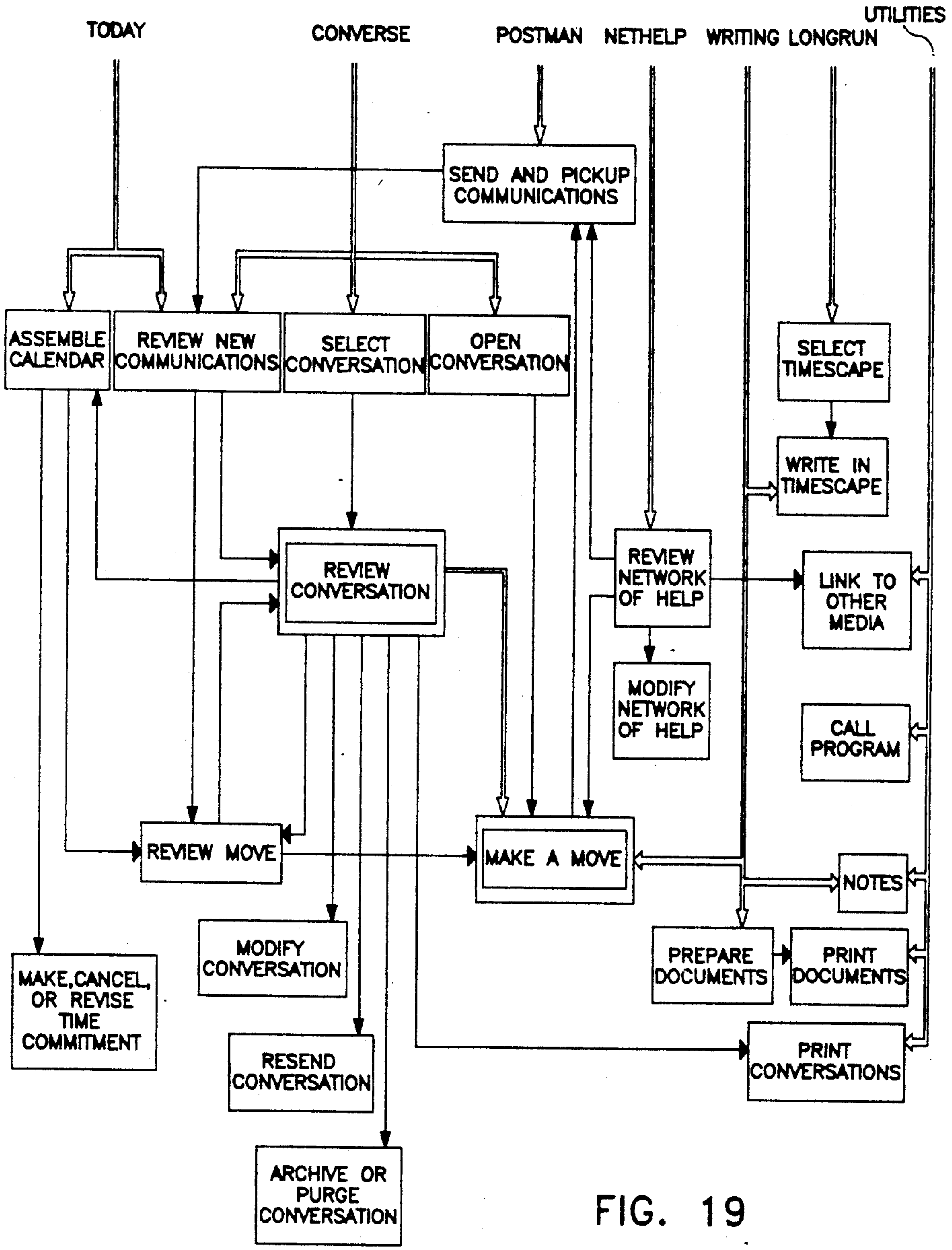
FIG. 19 is a schematic diagram illustrating functional relationships between various features and facilities of a system incorporating the method of this invention.

FIG. 19 illustrates the facilities of The Coordinator system which can be accessed with the use of the function keys that appear with the starting menu. The top line in the Figure illustrates the labels for the function keys appearing on that screen display but does not show them in the order in which they actually appear.

Pressing the TODAY function key brings to the screen a menu which provides access to a number of different facilities, including reading new mail, displaying a calendar and making time commitments.

The CONVERSE function key brings to the screen the CONNVERSE menu depicted in Table 1 and thus provides access to all of the facilities which are identified in that menu.

The POSTMAN function key calls the Postman program facility and enables a participant to send and pickup communications.

The NETHELP function key calls up a program which enables the participant to review and modify a table of participants already declared eligible to participate in conversations and to declare or modify host machines in the communication network of the participant. It also enables links to other media to be configured.

The WRITING function key brings up a new set of function key labels which provide access to word processing and text file management facilities.

The LONGRUN function key brings up facilities that aid the participant in inventing possibilities and formulating future commitments within a structure of selected long-run calendars or "timescapes".

The UTILITIES function key brings up a menu of utility facilities which include calling other resident programs for execution, storing and printing documents and a wide variety of other functions which enhance the utility of The Coordinator system.

n. Future Developments

The current implementation discussed above is a foundation for much more expanded system implementations of the method of this invention. Central to the method of this invention is the managing of conversations in a structured manner. This managing importantly involves defining roles, permitted moves, incompletions and the relationships therebetween. This has dramatic implications for further implementations which structure new ways for people to carry out conversations. Work and management of work are conversations. Personal relationships are conversations. The methods of this invention will promote innovations in the structure of conversations themselves and innovations in the media, including computer hardware innovations, for conducting conversations.

Within the definition of conversations, new conversational roles may be defined to expand the opportunities for participants in conversations. For example, a role such as "advisor" may be added to Conversations for Action, in order to enable a participant to enter a conversation to make suggestions and recommendations, without becoming the promisor or requestor of action in the conversation. Also, the role of "delegate" may be added to Conversations for Action, designating a participant to whom actions are delegated by promisors who do not carry out actions themselves but choose to delegate them to others. Further, a role such as "arbiter" may be added to Conversations for Possibilities, whose role is to settle disputes and reach decisions regarding what possibilities are realizable.

Each such newly defined role would introduce new conversational moves (e.g. "recommend", "delegate", "resolve") to the current implementation, based on new specific incompletions in conversations, and would lead to correspondingly new conversational protocols. Such innovations represent open opportunities for expanding participants' possibilities in conversations.

Particular conversational protocols might be defined for recurrent conversations in particular domains between participants in recurrent roles. Thus, for example, within a certain domain, called "funding", a role could be defined for disbursor, who could open a conversation with an offer, but not with a request. Recurrent requests in some domain could be triggered automatically by selection of a domain. For instance, requests by a sales manager for weekly reports from his salespeople could be triggered automatically by weekly selection of a domain, rather than by the manager's composing individual requests each week. Furthermore, participants may be given the opportunity to play more than one role in conversations, given their concerns in more than one domain of possibilities to which the conversation is relevant.

Coaching within conversations has endless possibilities. Coaching texts and exercises can be added to the implementation to provide participants the opportunity to leave their conversations for the moment, in order to learn and sharpen their conversational practices as, for example, managers or speculators about possibilities.

The method of this invention can be the foundation for development of and integration of new hardware and systems innovations. For example, voice activation of computers and voice synthesis can be integrated in systems incorporating the method of this invention thus providing spontaneous conversational opportunities, in the manner of direct speaking and listening, rather than through the instrument of a keyboard. Conversations could be managed and conducted directly in speech.

The Coordinator system lends itself to implementation in a variety of possible technological environments, including variations in the data processing, storage, and communications components, and also including variations in the technologies of interfaces (of which voice implementation might be considered an example).

In the architecture of one of these environments—which happens to be that of the current embodiment—every host for The Coordinator system is a single PC microcomputer that may be used by one or a set of participants. These hosts are linked with each other through a set of hubs forming a decentralized network.

Another architecture in which The Coordinator system can be used consists in a local area network with microcomputers inter-connected and sharing disk storage and other resources. In such an architecture no postman is needed for transfering communications among participants connected to the network. A postman will connect such a local area network with other hosts which can themselves be single microcomputers, or local area networks. In such local area network architectures the transferring of communications between participants is done automatically, under program control, within the shared disk storage space.

Figure 20:
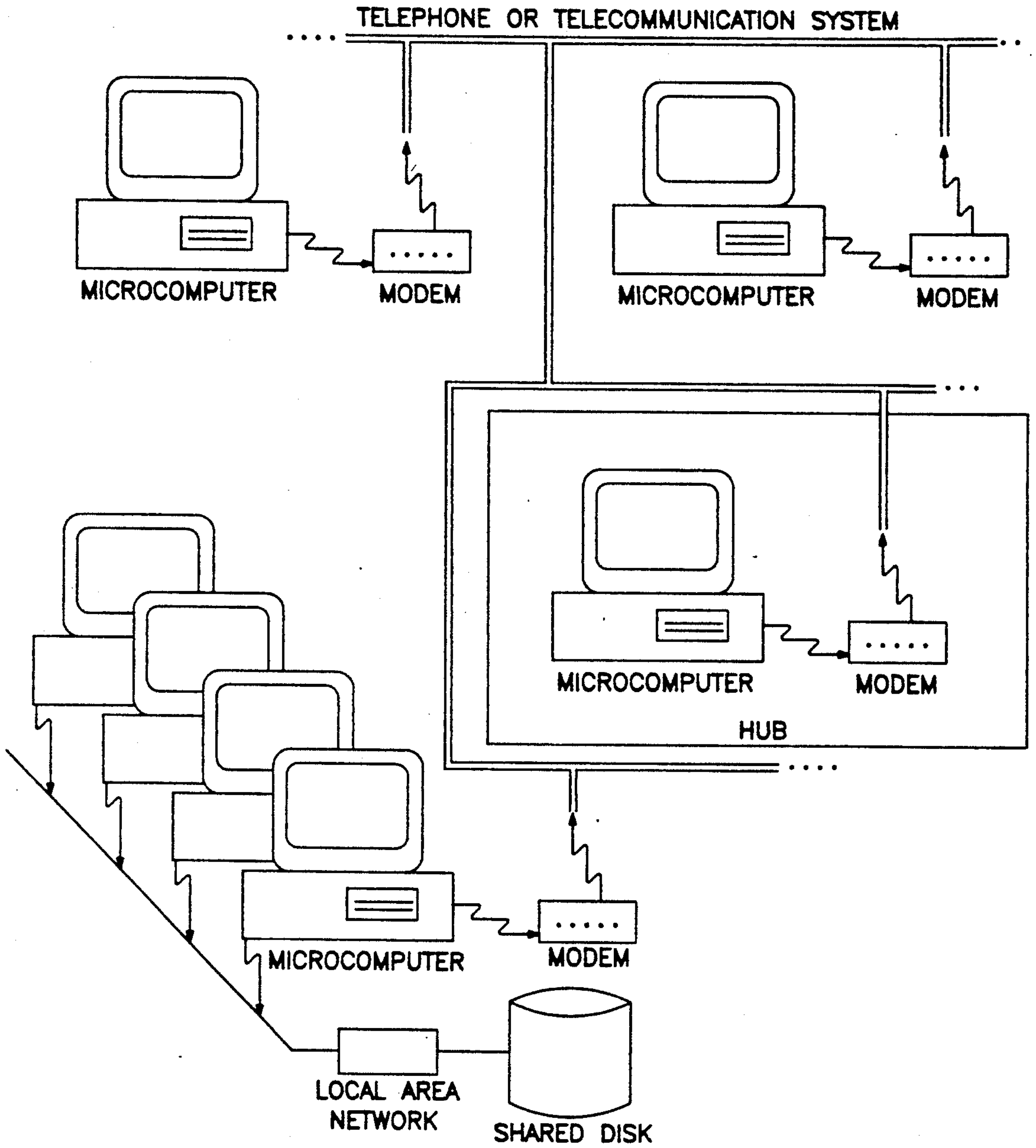
FIGS. 20-22 are schematic diagrams of alternative computer and communication systems which may be employed in implementing the method of this invention.

Both these architectures can be combined to form an extended network formed of individual microcomputers, local area networks, and hubs all interconnected using telephone or telecommunications connections. These combined architectures can be seen in FIG. 20. Such networks may be very large. Versions of The Coordinator system might also be produced for use within the architectures of different types of computer—e.g., on minicomputer, mainframe, networked mini- or mainframe, or within telecommunications processors, such as PBX equipment.

Figure 21:
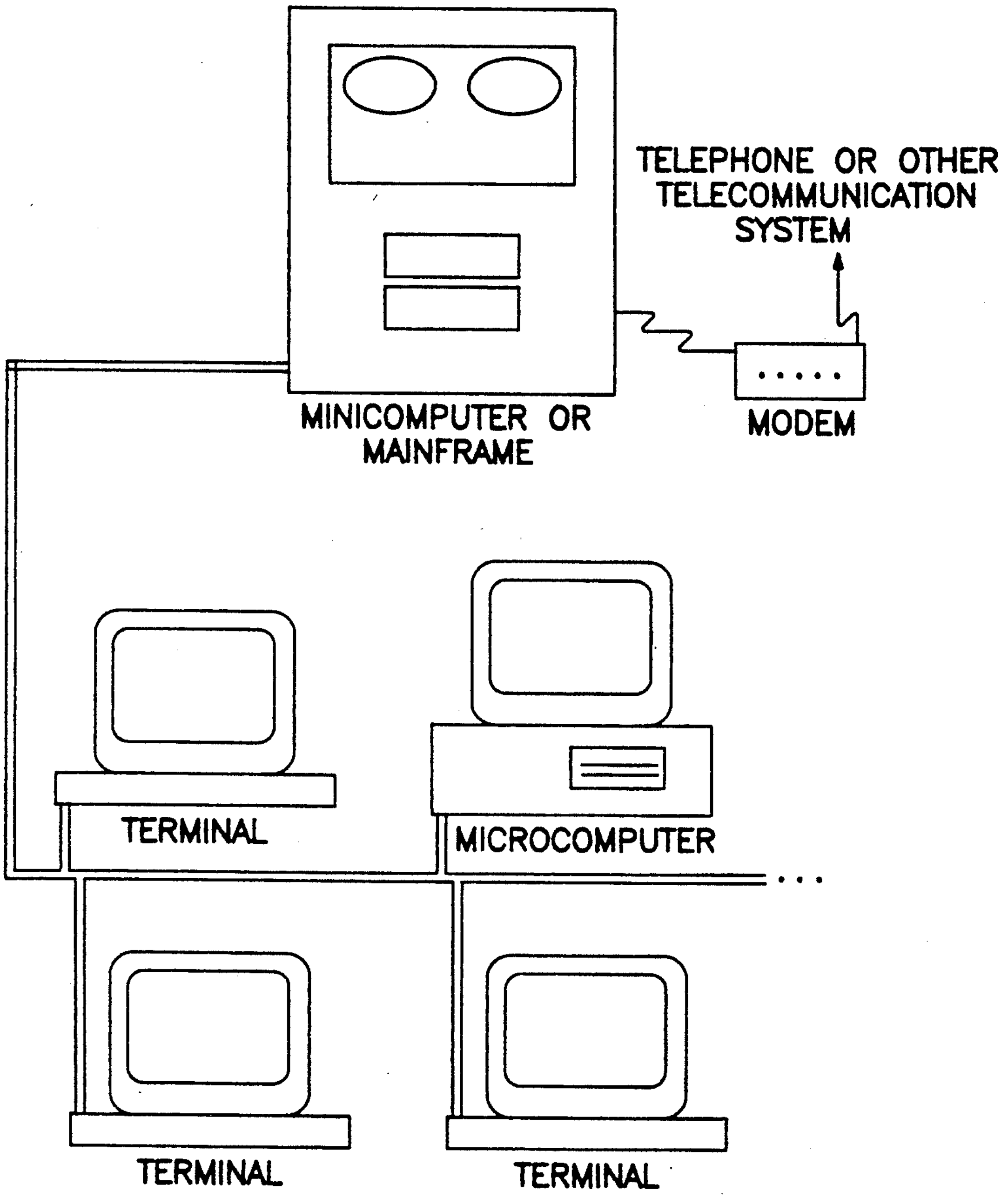

One example of such an embodiment would use a central machine to store all the participants' conversation data bases. Participants would run The Coordinator system through terminals connected to said central machine, as shown in FIG. 21. The transfer of communications would be done internally, in the central machine disk storage, in a manner similar to the manner in which communications are transferred in the local area network architecture of The Coordinator system.

Figure 22:
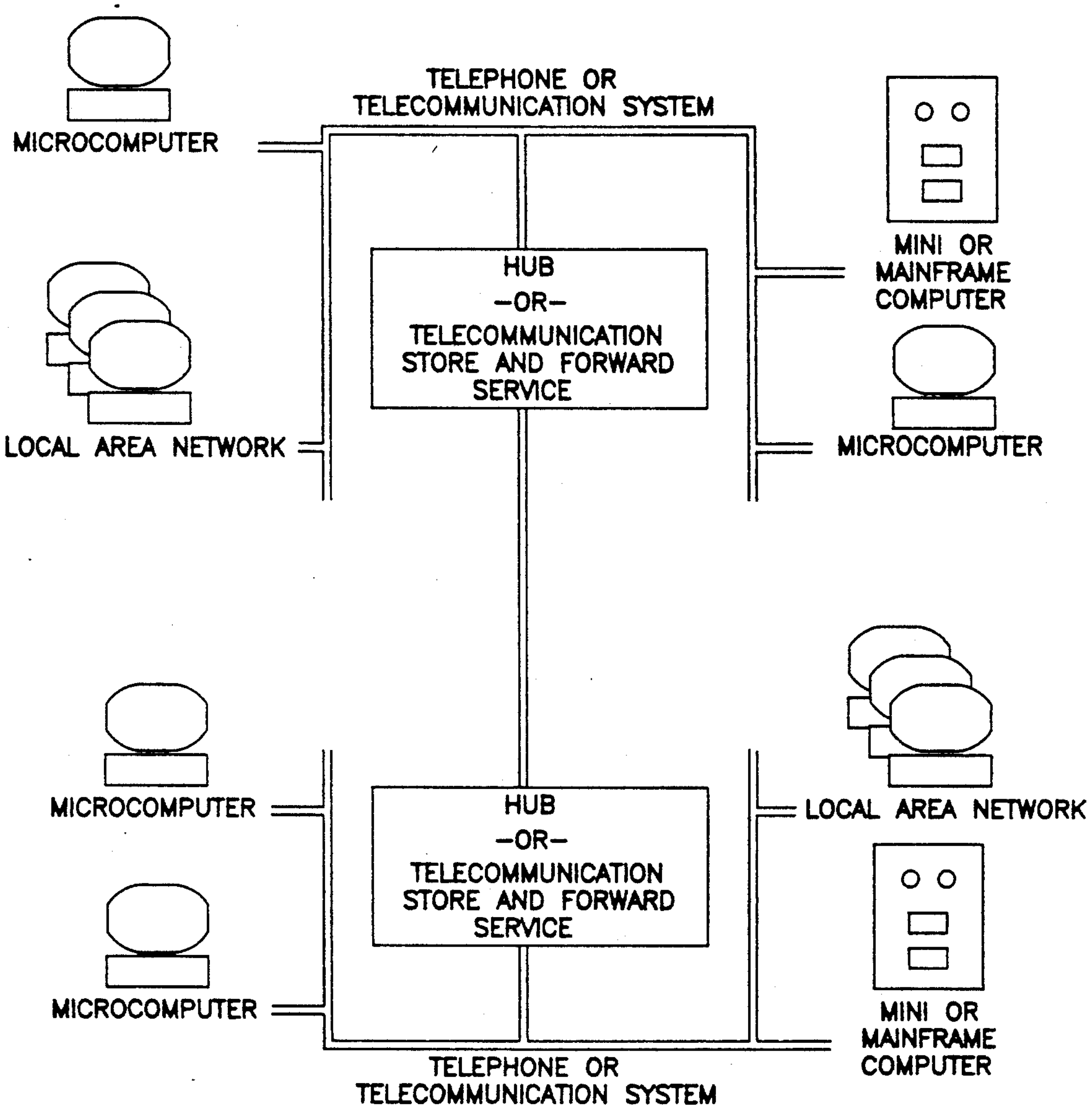

Such systems could also be interconnected, through telephone lines or local area networks or other telecommunications networks, with other similar systems and with PC microcomputers and local area networks on which The Coordinator system is running. Hub services, for storing and forwarding communications could be performed by commercial store-and-forward telecommunications services. An extended network employing a combination of the above-described architectures and hub services is depicted in FIG. 22.

It should be understood that the above description of this invention and the examples of embodiments of systems which practice the method of this invention are given to illustrate the principles of the invention and not to delimit its scope. It will be readily apparent to persons of skill in the art or arts to which this invention is addressed that numerous variations could be introduced into the specific embodiments described without departing from the scope of the invention as set forth in the following claims.

TABLE 1

| CONVERSE | |
|---|---|
| OPEN CONVERSATION FOR ACTION | REVIEW / HANDLE |
| Request | Read new mail |
| Offer | Missing my response |
| | Missing other's response |
| OPEN CONVERSATION FOR POSSIBILITIES | |
| Declare an opening | My promises/offers |
| | My requests |
| | Commitments due: 13-Nov-85 |
| NOTES | Conversation records |

TABLE 2

SELECT A DOMAIN

| | | | | |
|---|---|---|---|---|
| <none> | chile | hub | office | support |
| accounts | com-1 | hub-bill | oof | syntex |
| atc15ano | dealer | hubano | patent | test |
| atcdevel | design | lan | personel | tools |
| atcupd | directry | manual | productn | um |
| att | eds | money | rtd | unix |
| beta | friends | next | sales | |
| books | guides | novell | shipmnts | |
| business | hardware | oc | software | |

(<Esc> to cancel)

TABLE 3

(Skip 'To:' to select addressee from list)
To:

Action:
Send copies?
<Done>

TABLE 4

TO

| | |
|---|---|
| jmcafee | JeanSTEV |
| -PatSTEU | JohnGORS |
| -PattTOM | JohnSTRL |
| -PaulJOH | Juan |
| Alice | Lowell |
| Alicia | MarcOKRE |
| AnnBRAND | MarcSTEU |
| Bart | MareCroo |
| BillJorg | MerleSPE |
| BillTWST | MikeGRAV |
| Chauncey | PeteHART |
| ChauncJr | RafaelSA |
| DanielSH | Ralph |
| DaveDEGR | Raul |
| dealers | Rodrigo |
| DickBaum | RogerBUR |
| FrancisU | RussellR |
| Gayle | staff |
| Gloria | WarrenW |

TABLE 5

COPIES-TO

| | |
|---|---|
| ADD OTHERS | JohnGORS |
| -PatSTEU | JohnSTRL |
| -PattTOM | Juan |
| -PaulJOH | Lowell |
| Alice | MarcOKRE |
| Alicia | MarcSTEU |
| AnnBRAND | MareCroo |
| Bart | MerleSPE |
| BillJorg | MikeGRAV |
| BillTWST | PeteHART |
| Chauncey | RafaelSA |
| ChauncJr | Ralph |
| DanielSH | Raul |
| DaveDEGR | Rodrigo |
| dealers | RogerBUR |
| DickBaum | RussellR |
| FrancisU | staff |
| Gayle | WarrenW |
| Gloria | <Done> |
| JeanSTEV | |

TABLE 6

Today is : Wed 13-Nov-85

| | |
|---|---|
| Complete-by | : |
| Respond-by | : |
| Alert-date | : |
| Attach file | : |

<Done>

(Monday is: 18-Nov-85)

TABLE 7

PERMITTED MOVES IN CONVERSATIONS FOR POSSIBILITIES

For each type of conversation in The Coordinator system we define a set of permitted types of moves on the basis of recurring incompletions and the roles TABLE 7-continued

PERMITTED MOVES IN CONVERSATIONS FOR POSSIBILITIES defined for participants in the conversation to play. The methodology of these definitions is described in section e. of the document.

The table lays out the definition of permitted moves for conversations for declaring specific realizable possibilities, called "Conversations for Possibilities", with three roles, called REQUESTOR, PROMISOR, and OBSERVER, and one recurring incompletion, called MISSING RESPONSE.

1. A participant authorized to play the role of requestor in the domains of conversation in which he participates in a community pf speakers and listeners with whom he is conversing through use of this system may at any time start a new conversation with the move,
    DECLARE A POSSIBILITY OPEN, after which move,
        requestor is missing:
            promisor's response
        and promisor is missing:
            promisor's response
2. If requestor is missing:
        promisor's response
    and promisor is missing:
        promisor's response
    then requestor is permitted to:
        MAKE A NEW DECLARATION, after which move,
            requestor is missing:
                promisor's response
            and promisor is missing:
                promisor's response
        RE-FORMULATE CURRENT DECLARATION,
                after which move,
            requestor is missing:
                promisor's response
            and promisor is missing:
                promisor's response
        DECLARE-COMPLETE, after which move,
            requestor has no incompletions
            and promisor has no incompletions
    and
    then promisor is permitted to:
        MAKE A NEW DECLARATION, after which move,
            requestor is missing:
                requestor's response
            and promisor is missing:
                requestor's response
        RE-FORMULATE CURRENT DECLARATION,
                after which move,
            requestor is missing:
                requestor's response
            and promisor is missing:
                requestor's response
3. If requestor is missing:
        requestor's response
    and promisor is missing:
        requestor's response
    then requestor is permitted to:
        MAKE A NEW DECLARATION, after which move,
            requestor is missing:
                promisor's response
            and promisor is missing:
                promisor's response
        RE-FORMULATE CURRENT DECLARATION,
                after which move,
            requestor is missing:
                promisor's response
            and promisor is missing:
                promisor's response
        DECLARE-COMPLETE, after which move,
            requestor has no incompletions
            and promisor has no incompletions
    and
    then promisor is permitted to:
        MAKE A NEW DECLARATION, after which move,
            requestor is missing:
                requestor's response
            and promisor is missing:
                requestor's response
        RE-FORMULATE CURRENT DECLARATION,
                after which move,
            requestor is missing:
                requestor's response
            and promisor is missing:
                requestor's response
4. An observer is permitted the moves of a promisor.
5. When such a conversation is conducted by a set of participants speaking TABLE 7-continued

| PERMITTED MOVES IN CONVERSATIONS FOR POSSIBILITIES |
|---|
| in one role only (for example, in conversation with himself), each participant will be permitted the moves of a requestor. |

TABLE 8

PERMITTED MOVES IN CONVERSATIONS FOR ACTION OF THE TYPE, "REQUEST"

For each type of conversation in The Coordinator system we define a set of permitted types of moves on the basis of recurring incompletions and the roles defined for participants in the conversation to play. The methodology of these definitions is described in section e. of the document.
This table lays out the definition of permitted moves for conversations for producing actions to complete specific possibilities, called "Conversations for Action", of the type, "REQUEST", with three roles, called REQUESTOR, PROMISOR, AND OBSERVER, and two recurring incompletions, called MISSING RESPONSE and MISSING FULFILLMENT.

1. A participant authorized to play the role of requestor in the domains of conversation in which he participates in a community of speakers and listeners with whom he is conversing through use of this system may at any time start a new conversation with the move,
   - REQUEST, after which move,
     - requestor is missing:
       - requestor's fulfillment
       - promisor's response
     - and promisor is missing:
       - requestor's fulfillment
       - promisor's response
2. If requestor is missing:
   - requestor's fulfillment
   - promisor's response and promisor is missing:
   - requestor's fulfillment
   - promisor's response then requestor is permitted to:
   - CANCEL, after which move,
     - requestor is missing:
       - promisor's response
     - and promisor is missing:
       - promisor's response
   - DECLARE-COMPLETE, after which move,
     - requestor has no incompletions
     - and promisor has no incompletions and then promisor is permitted to:
   - PROMISE, after which move,
     - requestor is missing:
       - requestor's fulfillment
       - promisor's fulfillment
     - and promisor is missing:
       - requestor's fulfillment
       - promisor's fulfillment
   - DECLINE, after which move,
     - requestor is missing:
       - requestor's fulfillment
       - requestor's response
     - and promisor is missing:
       - requestor's response
   - COUNTEROFFER, after which move,
     - requestor is missing:
       - requestor's fulfillment
       - requestor's response
       - promisor's fulfillment
     - and promisor is missing:
       - requestor's fulfillment
       - requestor's response
       - promisor's fulfillment
3. If requestor is missing:
   - requestor's fulfillment
   - promisor's fulfillment and promisor is missing:
   - requestor's fulfillment
   - promisor's fulfillment then requestor is permitted to:
   - CANCEL, after which move,
     - requestor is missing:
       - promisor's response
     - and promisor is missing:
       - promisor's response
   - DECLARE-COMPLETE, after which move, TABLE 8-continued

PERMITTED MOVES IN CONVERSATIONS FOR ACTION OF THE TYPE, "REQUEST"

```
                requestor has no incompletions
                and promisor has no incompletions
     and
      then promisor is permitted to:
           REPORT-COMPLETE, after which move,
                requestor is missing:
                  requestor's fulfillment
                  requestor's response
                  promisor's fulfillment
                and promisor is missing:
                  requestor's fulfillment
                  requestor's response
           CANCEL, after which move,
                requestor is missing:
                  requestor's fulfillment
                  requestor's response
                and promisor is missing:
                  requestor's fulfillment
                  requestor's response
4.   If requestor is missing:
           requestor's fulfillment
           requestor's response
           promisor's fulfillment
     and promisor is missing:
           requestor's fulfillment
           requestor's response
      then requestor is permitted to:
           CANCEL, after which move,
                requestor is missing
                  promisor's response
                and promisor is missing:
                  promisor's response
           DECLARE-COMPLETE, after which move,
                requestor has no incompletions
                and promisor has no incompletions
5.   If requestor is missing:
           requestor's fulfillment
           requestor's response
           promisor's fulfillment
     and promisor is missing:
           requestor's fulfillment
           promisor's fulfillment
           requestor's response
      then requestor is permitted to:
           CANCEL, after which move,
                requestor is missing:
                  promisor's response
                and promisor is missing:
                  promisor's response
           ACCEPT (a counteroffer), after which move.
                requestor is missing:
                  requestor's fulfillment
                  promisor's fulfillment
                and promisor is missing:
                  requestor's fulfillment
                  promisor's fulfillment
           COUNTEROFFER, after which move,
                requestor is missing:
                  requestor's fulfillment
                  promisor's response
                and promisor is missing:
                  requestor's fulfillment
                  promisor's response
           DECLARE-COMPLETE, after which move,
                requestor has no incompletions
     and
      then promisor is permited to:
           CANCEL, after which move,
                requestor is missing:
                  requestor's fulfillment
                  requestor's response
                and promisor is missing:
                  requestor's fulfillment
                  requestor's response
6.   If requestor is missing
           requestor's fulfillment
           requestor's response
     and promisor is missing:
           requestor's fulfillment
           requestor's response
```

TABLE 8-continued

PERMITTED MOVES IN CONVERSATIONS FOR ACTION OF THE TYPE, "REQUEST"

then requestor is permitted to:
  DECLARE-COMPLETE, after which move,
    requestor has no incompletions
    and promisor has no incompletions
7. If requestor is missing:
    requestor's fulfillment
    requestor's response
  and promisor is missing:
    requestor's response
  then requestor is permitted to:
    DECLARE-COMPLETE, after which move,
      requestor has no incompletions
      and promisor has no incompletions
8. If requestor is missing:
    promisor's response
  and promisor is missing:
    promisor's response
  then promisor is permitted to:
    DECLARE-COMPLETE, after which move,
      requestor has no incompletions
      and promisor has no incompletions
9. If requestor is missing:
    requestor's fulfillment
    promisor's response
  and promisor is missing:
    requestor's fulfillment
    promisor's response
  then promisor is permitted to:
    COMMIT-TO-COMMIT, after which move,
      requestor is missing:
        requestor's fulfillment
        promisor's response
      and promisor is missing:
        requestor's fulfillment
        promisor's response
10. If requestor is missing:
    requestor's fulfillment
    promisor's response
  and promisor is missing:
    requestor's fulfillment
    promisor's response
  then promisor is permitted to:
    INTERIM-REPORT, after which move,
      requestor is missing:
        requestor's fulfillment
        promisor's response
      and promisor is missing:
        requestor's fulfillment
        promisor's response
11. If requestor is missing:
    requestor's fulfillment
    requestor's response
    promisor's fulfillment
  and promisor is missing:
    requestor's fulfillment
    requestor's response
    promisor's fulfillment
  then promisor is permitted to:
    INTERIM-REPORT, after which move,
      requestor is missing:
        requestor's fulfillment
        requestor's response
        promisor's fulfillment
      and promisor is missing:
        requestor's fulfillment
        requestor's response
        promisor's fulfillment
12. If requestor is missing:
    requestor's fulfillment
    promisor's fulfillment
  and promisor is missing:
    requestor's fulfillment
    promisor's fulfillment
  then promisor is permitted to:
    INTERIM-REPORT, after which move,
      requestor is missing:
        requestor's fulfillment
        promisor's fulfillment
      and promisor is missing:
        requestor's fulfillment TABLE 8-continued

PERMITTED MOVES IN CONVERSATIONS FOR ACTION OF THE TYPE, "REQUEST"

promisor's fulfillment
13. If requestor is missing:
requestor's fulfillment
promisor's fulfillment
requestor's response
and promisor is missing:
requestor's fulfillment
requestor's response
the requestor is permitted to:
DECLINE-REPORT, after which move,
requestor is missing:
requestor's fulfillment
promisor's fulfillment
and promisor is missing:
requestor's fulfillment
promisor's fulfillment
14. If requestor is missing:
requestor'd fulfillment
promisor's fulfillment
requestor's response
and promisor is missing:
requestor'd fulfillment
promisor's fulfillment
requestor's response
then requestor is permitted to:
DECLINE COUNTEROFFER, after which move,
requestor is missing:
requestor's fulfillment
promisor's response
and promisor is missing:
requestor's fulfillment
promisor's response
15. If requestor is missing:
(at least) requestor's fulfillment
then requestor is permitted to:
FOLLOW-UP, after which move,
requestor is missing:
(at least) requestor's fulfillment
16. If requestor is missing:
(at least) promisor's response
then requestor is permitted to:
FOLLOW-UP, after which move,
requestor is missing:
(at least) promisor's response
17. If promisor is missing:
(at least) requestor's response
then promisor is permitted to:
FOLLOW-UP, after which move,
promisor is missing:
(at least) requestor's response
18. If requestor is missing:
requestor's fulfillment
promisor's fulfillment
and promisor is missing:
requestor's fulfillment
promisor's fulfillment
then promisor is permitted to:
CANCEL/MAKE NEW PROMISE, after which move,
requestor is missing:
requestor's fulfillment
promisor's fulfillment
and promisor is missing:
requestor's fulfillment
promisor's fulfillment
19. If requestor is missing:
requestor's fulfillment
requestor's response
promisor's fulfillment
and promisor is missing:
requestor's fulfillment
requestor's response
promisor's fulfillment
then promisor is permitted to:
CANCEL/MAKE NEW PROMISE, after which move,
requestor is missing:
requestor's fulfillment
requestor's response
promisor's fulfillment
and promisor is missing:
requestor's fulfillment TABLE 8-continued

PERMITTED MOVES IN CONVERSATIONS FOR ACTION OF THE TYPE, "REQUEST"

requestor's response
promisor's fulfillment

20. If the move currently displayed was made by the other primary participant in the conversation,
and the participant has not made a move in response to the move currently displayed,
and the move currently displayed is not itself an acknowledge move,
then the participant is permitted to:
ACKNOWLEDGE, after which move
each participant retains the same incompletions
he had prior to the move.

21. If the participant is playing any conversational role, including the conversational role of OBSERVER, in a conversation that has been initiated,
then the participant is permitted to:
COMMENT (also called "Free-Form"), after which move,
each participant retains the same incompletions
has had prior to the move.

TABLE 9

PERMITTED MOVES IN CONVERSATIONS FOR ACTION OF THE TYPE, "OFFER"

For each type of conversation in The Coordinator systema we define a set of permitted types of moves on the basis of recurring incompletions and the roles defined for participants in the conversation to play. The methodology of these definitions is described in section e. of the document.
This table lays out the definition of permitted moves for conversations for producing actions to complete specific possibilities, called "Conversations for Action", of the type, "OFFER", with three roles, called REQUESTOR, PROMISOR, and OBSERVER, and two recurring incompletions, called MISSING RESPONSE and MISSING FULFILLMENT.

1. A participant authorized to play the role of promisor in the domains of conversation in which he participates in a community of speakers and listeners with whom he is conversing through use of this system may at any time start a new conversation with the move,
OFFER, after which move,
requestor is missing:
requestor's response
promisor's fulfillment
and promisor is missing:
requestor's response
promisor's fulfillment 2. If requestor is missing:
promisor's fulfillment
requestor's response
and promisor is missing:
promisor's fulfillment
requestor's response
then requestor is permitted to:
ACCEPT, after which move,
requestor is missing:
requestor's fulfillment
promisor's fulfillment
and promisor is missing:
requestor's fulfillment
promisor's fulfillment
COUNTEROFFER, after which move,
requestor is missing:
requestor's fulfillment
promisor's fulfillment
promisor's response
and promisor is missing:
requestor's fulfillment
promisor's fulfillment
promisor's response
DECLINE, after which move,
requestor is missing:
promisor's response
and promisor is missing:
promisor's fulfillment
promisor's response
DECLARE-COMPLETE, after which move,
requestor has no incompletions
and promisor has no incompletions TABLE 9-continued

PERMITTED MOVES IN CONVERSATIONS FOR ACTION OF THE TYPE, "OFFER"

and
then promisor is permitted to:
CANCEL, after which move,
requestor is missing:
requestor's response
and promisor is missing:
requestor's response 3. If requestor is missing:
requestor's fulfillment
promisor's fulfillment
and promisor is missing:
requestor's fulfillment
promisor's fulfillment
then requestor is permitted to:
CANCEL, after which move,
requestor is missing:
promisor's response
and promisor is missing:
promisor's response
DECLARE-COMPLETE, after which move,
requestor has no incompletions
and promisor has no incompletions
and
then promisor is permitted to:
REPORT-COMPLETE, after which move,
requestor is missing:
requestor's fulfillment
requestor's response
promisor's fulfillment
and promisor is missing:
requestor's fulfillment
requestor's response
CANCEL, after which move,
requestor is missing:
requestor's fulfillment
requestor's response
and promisor is missing:
requestor's fulfillment
requestor's response 4. If requestor is missing:
requestor's fulfillment
requestor's response
promisor's fulfillment
and promisor is missing:
requestor's fulfillment
requestor's response
then requestor is permitted to:
CANCEL, after which move,
requestor is missing:
promisor's response
and promisor is missing:
promisor's response
DECLARE-COMPLETE, after which move,
requestor has no incompletions
and promisor has no incompletions TABLE 9-continued

PERMITTED MOVES IN CONVERSATIONS FOR ACTION OF THE TYPE, "OFFER"

5. If requestor is missing:
requestor's fulfillment
promisor's fulfillment
promisor's response
and promisor is missing:
requestor's fulfillment
promisor's fulfillment
promisor's response
then requestor is permitted to:
DECLARE-COMPLETE, after which move,
requestor has no incompletions
and promisor has no incompletions
and
then promisor is permitted to:
PROMISE, after which move,
requestor is missing:
requestor's fulfillment
promisor's fulfillment
and promisor is missing:
requestor's fulfillment
promisor's fulfillment
CANCEL, after which move,
requestor is missing:
requestor's response
and promisor is missing:
requestor's response
6. If requestor is missing:
promisor's response
and promisor is missing:
promisor's fulfillment
promisor's response
then promisor is permitted to:
DECLARE-COMPLETE, after which move,
requestor has no incompletions
and promisor has no incompletions
7. If requestor is missing:
promisor's response
and promisor is missing:
promisor's response
then promisor is permitted to:
DECLARE-COMPLETE, after which move,
requestor has no incompletions
and promisor has no incompletions
8. If requestor is missing:
requestor's response
and promisor is missing:
requestor's response
then requestor is permitted to:
DECLARE-COMPLETE, after which move,
requestor has incompletions
and promisor has no incompletions
9. If requestor is missing:
promisor's fulfillment
requestor's response
and promisor is missing:
promisor's fulfillment
requestor's response
then requestor is permitted to:
COMMIT-TO-COMMIT, after which move,
requestor is missing:
promisor's fulfillment
requestor's response
and promisor is missing:
promisor's fulfillment
requestor's response
10. If requestor is missing:
promisor's fulfillment
requestor's response
and promisor is missing:
promisor's fulfillment
requestor's response
then promisor is permitted to:
INTERIM-REPORT, after which move,
requestor is missing:
promisor's fulfillment
requestor's response
and promisor is missing:
promisor's fulfillment
requestor's response
11. If requestor is missing:

TABLE 9-continued

PERMITTED MOVES IN CONVERSATIONS FOR ACTION OF THE TYPE, "OFFER"

requestor's fulfillment
promisor's response
promisor's fulfillment
and promisor is missing:
requestor's fulfillment
promisor's response
promisor's fulfillment
then promisor is permitted to:
INTERIM-REPORT, after which move,
requestor is missing:
requestor's fulfillment
promisor's response
promisor's fulfillment
and promisor is missing:
requestor's fulfillment
promisor's response
promisor's fulfillment
12. If requestor is missing:
requestor's fulfillment
promisor's fulfillment
and promisor is missing:
requestor's fulfillment
promisor's fulfillment
then promisor is permitted to:
INTERIM-REPORT, after which move,
requestor is missing:
requestor's fulfillment
promisor's fulfillment
and promisor is missing:
requestor's fulfillment
promisor's fulfillment
13. If requestor is missing:
requestor's fulfillment
promisor's fulfillment
requestor's response
and promisor is missing:
requestor's fulfillment
requestor's response
then requestor is permitted to:
DECLINE-REPORT, after which move,
requestor is missing:
requestor's fulfillment
promisor's fulfillment
and promisor is missing:
requestor's fulfillment
promisor's fulfillment
14. If requestor is missing:
requestor's fulfillment
promisor's fulfillment
promisor's response
and promisor is missing:
requestor's fulfillment
promisor's fulfillment
promisor's response
then promisor is permitted to:
DECLINE COUNTEROFFER, after which move,
requestor is missing:
promisor's fulfillment
requestor's response
and promisor is missing:
promisor's fulfillment
requestor's response
15. If requestor is missing:
requestor's fulfillment
promisor's fulfillment
and promisor is missing:
requestor's fulfillment
promisor's fulfillment
then promisor is permitted to:
CANCEL/MAKE NEW OFFER, after which move,
requestor is missing:
requestor's response
promisor's fulfillment
and promisor is missing:
requestor's response
promisor's fulfillment
16. If requestor is missing:
requestor's response
promisor's fulfillment
and promisor is missing:

TABLE 9-continued

PERMITTED MOVES IN CONVERSATIONS FOR ACTION OF THE TYPE, "OFFER"

requestor's response
promisor's fulfillment
then promisor is permitted to:
CANCEL/MAKE NEW OFFER, after which move,
requestor is missing:
requestor's response
promisor's fulfillment
and promisor is missing:
requestor's response
promisor's fulfillment 17. If requestor is missing:
(at least) requestor's fulfillment
then requestor is permitted to:
FOLLOW-UP, after which move,
requestor is missing:
(at least) requestor's fulfillment 18. If requestor is missing:
(at least) promisor's response
then requestor is permitted to:
FOLLOW-UP, after which move,
requestor is missing:
(at least) promisor's response 19. If promisor is missing:
(at least) requestor's response
then promisor is permitted to:
FOLLOW-UP, after which move,
promisor is missing:
(at least) requestor's response 20. If the move currently displayed was made by the other primary participant in this conversation,
and the participant has not made a move in response to the move currently displayed,
and the move currently displayed is not itself an acknowledge move,
then the participant is permitted to:
ACKNOWLEDGE, after which move,
each participant retains the same incompletions he had prior to the move.

21. If the participant is playing any conversational role, including the conversational role of OBSERVER, in a conversation that has been initiated,
then the participant is permitted to:
COMMENT (also called "Free-Form"),
after which move,
each participant retains the same incompletions he had prior to the move.

TABLE 10

Permitted Moves in Conversations for Action of the Type, "Promise-to-Myself"

For each type of conversation in The Coordinator system we define a set of permitted types of moves on the basis of recurring incompletions and the roles defined for participants in the conversation to play. The methodology of these definitions is described in section e. of the document.

This table lays out the definition of permitted moves for conversations for producing actions to complete specific possibilities, called "Conversations for Action", of the type, "PROMISE-TO-MYSELF", with one role, called PROMISOR and two recurring incompletions, called MISSING RESPONSE and MISSING FULFILLMENT.

the initial promise, request or offer move;
cancel the promise;
cancel the promise and make a new promise;
interim-report;
comment; and
declare the conversation complete.

TABLE 11

| SPEAKING IN A CONVERSATION FOR ACTION | |
|---|---|
| Acknowledge | Promise |
| Free-Form | Counter-offer |
| Commit-to-commit | Decline |
| Interim-report | Report-completion |

TABLE 12

(1) Opening move of request by Alex to Robin leaves conversation in state "request":
Alex's database shows:

| RR | PR | RF | PF |
|---|---|---|---|
| — | 091585 | 100185 | — |

Robin's database shows:

| pr | rr | pf | rf |
|---|---|---|---|
| 091585 | — | — | 100185 |

(2) Counteroffer move by Robin leaves conversation in state "counteroffer":
Alex's database shows:

| RR | PR | RF | PF |
|---|---|---|---|
| 092585 | — | 100185 | 101085 |

Robin's database shows:

| pr | rr | pf | rf |
|---|---|---|---|
| — | 092585 | 101085 | 100185 |

(3) Accept move by Alex leaves conversation in state "promise":
Alex's database shows:

| RR | PR | RF | PF |
|---|---|---|---|
| — | — | 101085 | 101085 |

Robin's database shows:

| pr | rr | pf | rf |
|---|---|---|---|
| — | — | 101085 | 101085 |

(4) Report-complete move by Robin leaves conversation in state "report":
Alex's database shows:

| RR | PR | RF | PF |
|---|---|---|---|
| 101185 | — | 101085 | 101085 |

Robin's database shows:

| pr | rr | pf | rf |
|---|---|---|---|
| — | 101185 | — | 101085 |

(5) Declare-complete move by Alex leaves conversation in state "final":
Alex's database shows:

| RR | PR | RF | PF |
|---|---|---|---|
| — | — | — | — |

Robin's database shows:

| pr | rr | pf | rf |
|---|---|---|---|
| — | — | — | — |

TABLE 13

APPOINTMENTS and COMMITMENTS for: Tue 12-Nov-85

| | | Start | End | Action | Specifics |
|---|---|---|---|---|---|
| 6 | | 9:00 | 12:00 | desk | Review Patent Claims |
| 7 | | 12:30 | 13:45 | lunch | John and Ralph |
| 8 | | 14:00 | 17:15 | meeting | Strat Planning |
| 9 | | 19:45 | 22:00 | dinner | Alice (make reservation!!) |
| 10 | | Alert | | request | sales pls. call Deputy Comm. |

TABLE 13-continued

| | | | | |
|---|---|---|---|---|
| 11 | Alert | request | sales | pls. call Norma |
| noon | Alert | request | <none> | Request delay newsletter |
| 1 | Alert | offer | eds | report on trip to EDS |
| 2 | Alert | observing | | PAS/Coordinator Interfac |
| 3 | My response due | request | | report to Fernando |
| 4 | My response due | offer | atcpat | My participation |
| 5 | Promise due to me | offer | atcpat | My participation |
| 6 | Promise due to me | offer | sales | Tandy Lead |
| 7 | Response due to me | offer | atcpat | claim1 |
| 8 | Response due to me | offer | atcpat | priorart redraft |
| 9 | | | | |
| 10 | | | | |
| 11 | | | | |
| mid | | | | |
| 1 | | | | |

2 TODAY 3 CONVERS 4 LONGRUN 5 net-hlp 6 writing 7 utility 8 days 9 weeks

TABLE 14

SUMMARY OF CONVERSATIONS Read? <return> Next? <space>

| Domain | Requestor | Promisor | Conv | Status | Resp-by | Action/Possibility |
|---|---|---|---|---|---|---|
| <none> | jj | jmcafee | Req | final | | Address for Zamovski |
| atcdevel | JMcAfee | MSteuer | Off | accept | | Novell Installation |
| atcdevel | MSteuer | JMcAfee | Req | promise | | Syntex LAN |
| <none> | ckadlec | jmcafee | Req | promise | | trouble shoot |
| atcdevel | phartwic | jludlow | Req | observin | | Develop 3B/Coord Interface |
| <none> | fweldon | jmcafee | Req | request | 8-Nov-85 | Using Carrington Co. as hu |
| oc | cbell | jmcafee | Off | final | | formatter frame for oc |
| support | jmcafee | alicia | CFP | open | | filing license forms |
| <none> | rflores | jmcafee | Req | promise | | LAN Worksheet. |
| support | jmcafee | alicia | Off | offer | No-date | eds lic. agremnts |
| <none> | cbell | jfoster | Req | observin | | supply formatting info |
| atcdevel | jmcafee | rmm | Off | offer | 11-Nov-85 | hp font cartridges |
| <none> | MSteuer | jmcafee | Req | request | 12-Nov-85 | Syntex LAN Invoice |
| software | jthurmei | jmcafee | Req | request | 13-Nov-85 | software for the molecular |
| sales | grosenbe | jmcafee | Req | promise | | call citibank |
| oc | abrandew | jmcafee | Req | promise | | coordinator support |
| atcdevel | cbell | rmm | Req | observin | | Violation of Our Rules |
| hardware | jgorsich | bmockler | Req | observin | | more info on your hardware |
| test | temp | jmcafee | Off | offer | | testing -- please disregar |
| <none> | fuptoniv | jmcafee | Req | request | 13-Nov-85 | PAS/Coordinator Interface |
| <none> | jmcafee | fuptoniv | Off | offer | 13-Nov-85 | Control T bug |

2 TODAY 3 CONVERS 4 LONGRUN 5 net-hlp 6 writing 7 utility 8 days 9 weeks

TABLE 15

LIST CONVERSATIONS AND COMMUNICATIONS

| | |
|---|---|
| CONVERSATIONS FOR ACTION | AND -- |
| My promises/offers | In domain : |
| My requests | |
| Promises/offers to me | Missing my response |
| Requests to me | Missing another's response |
| CONVERSATIONS FOR POSSIBILITIES | With person : |
| TIME COMMITMENTS | |
| CONVERSATIONS WITH ALERTS | Marked for purging |
| OR LIST -- | |
| All conversations | |
| Open conversations | By date (resp/prom) due |
| Conversations I am observing | By date spoken |
| Closed conversations | . . . On : 13-Nov-85 |
| All communications | . . . From : 11-Nov-85 |
| "Alien" communications | . .to : 18-Nov-85 |
| | <Done> |

TABLE 16

SUMMARY OF CONVERSATIONS With: cbell Read? <return> Next? <space>

| | | | | | | |
|---|---|---|---|---|---|---|
| <none> | PatntGrp | cbell | Off | observin | | attached list |
| <none> | cbell | jthurmei | Req | observin | | send latest directory |
| <none> | cbell | les | Req | observin | | les @e2000 |
| hub | jmcafee | cbell | Off | accept | | postman times out |
| <none> | StaffLst | cbell | Off | observin | | My Location |
| <none> | cbell | pcampbel | Req | final | | HELP |
| <none> | cbell | jmcafee | Req | request | 14-Oct-85 | what kind of mess?? |
| <none> | jmcafee | cbell | Off | offer | No-date | Alice's homework |
| <none> | cbell | tedwards | Req | observin | | alex brown |
| <none> | cbell | tedwards | Req | observin | | lan |
| atcdevel | jludlow | cbell | Off | observin | | fyi my mailbox |
| dealer | cbell | jmcafee | Req | promise | | your rec to me please |
| business | cbell | jmcafee | Off | final | | What next here? |
| atcdevel | jludlow | cbell | Off | observin | | stack overflows -- a clue |
| hardware | cbell | jmcafee | Req | promise | | find out about the portabl |
| <none> | cbell | StaffLst | Req | observin | | meet weds am in berkeley |
| <none> | cbell | DUTCH | Req | observin | | I'm up |
| <none> | rpred | cbell | Off | observin | | outline of work remaining |
| eds | cbell | jmcafee | Off | com-to-c | | Report -- hardware breakdw |
| accounts | psteuer | cbell | Off | final | | zamoiski scenario |
| oc | cbell | jmcafee | Off | final | | formatter frame for oc |
| <none> | cbell | jfoster | Req | observin | | supply formatting info |

2 TODAY 3 CONVERS 4 LONGRUN 5 net-hpl 6 writing 7 utility 8 read 9 answer

TABLE 17

SUMMARY OF CONVERSATIONS Dowain: atcdevel Read? <return> Next? <space>

| Dowain | Requestor | Promisor | Conv | Status | Resp-by | Action/Possibility |
|---|---|---|---|---|---|---|
| atcdevel | jmcafee | jludlow | Req | promise | | What new with ATF.EXE |
| atcdevel | jludlow | cbell | Off | Observin | | anomaly report |
| atcdevel | jwcafee | tbuchler | Off | accept | | Alpha test new coord revs. |
| atcdevel | cbell | jludlow | Req | observin | | stack overflow |
| atcdevel | msteuer | JMcAfee | Req | final | No-date | Novell Net Set-Up |
| atcdevel | jwcafee | wsteuer | Off | offer | No-date | Random Postman Failures |
| atcdevel | cbell | jwcafee | Req | request | 24-Sep-85 | Mismatch #5 |
| atcdevel | jwcafee | rflores | Off | final | | File; Coord improvements |
| atcdevel | jwcafee | JLudlow | Off | accept | | Atc 1.5b for beta |
| atcdevel | jwcafee | wsteuer | Off | final | | "<none>" breakdown |
| atcdevel | cbell | JLudlow | Off | observin | | Distribution Lists at HUB |
| atcdevel | tbuchler | cbell | CFP | observin | | Hidden request explicit |
| atcdevel | cbell | jwcafee | Req | request | No-date | keystroke emulator |
| atcdevel | jludlow | jwcafee | Off | accept | 18-Oct-85 | 1.5B |
| atcdevel | tbuchler | jwcafee | Req | final | No-date | Send me Beta test coord's |
| atcdevel | jwcafee | mgraves | CFP | final | | "Select" tools for conv re |
| atcdevel | jludlow | cbell | Off | observin | | anomalies |
| atcdevel | jwcafee | jludlow | Req | final | | Hack for " <500,000 bytes |
| atcdevel | jj | jwcafee | Req | final | | Message about user number |
| atcdevel | jludlow | cbell | Off | observin | | fyi my mailbox |
| atcdevel | jludlow | cbell | Off | observin | | stack overflows - a clue |

2 TODAY 3 CONVERS 4 LONGRUN 5 net-hip 6 writing 7 utility 8 read 9 answer

TABLE 18

| |
|---|
| READ<br>To first<br>Trace bck<br>Trace fwd<br>To latest<br><br>Next<br>Previous<br><br>LIST<br>HANDLE-BY<br>Answer<br>Attachmnt<br>Set alert<br>File |

TABLE 19

| |
|---|
| DECLARE A TIME COMMITMENT<br>Commit-date: 13-Nov-85<br>Start : End:<br><br>Action: : meeting<br>Specifics :<br>Alert-date :<br>Further remarks?<br>Part-of-a-conversation?<br><Done> |

TABLE 20

Example of Explanatory Help Text—When Opening a Conversation for Possibilities

HELP: OPEN A CONVERSATION FOR POSSIBILITIES

As you work you make requests, proposals, answer questions, find phone numbers, locate people, and many other things. You are "doing", period, not interested in talking about where you are headed. You are headed wherever you are already headed, and going as fast as you can to get there.

Sometime before you went into action you had a conversation that framed your actions, whether or not you noticed it. This conversation "before" your Conversations for Action is opened in the moment that you declare, with or without explicit awareness, that some possibility can be fulfilled if you head in that direction. We call this prior conversation a "Conversation for Possibilities" (CFP).

CFPs are the most pervasive kind of human conversation. And, all kinds of human acting becomes simpler when the domain of possibilities in which you are acting is clear.

Your possibilities are shaped by the background of conversations you have with yourself and with others in which you declare the kind of person you are (and the kind of people those you work with are), the roles you will play, the family and relationships you will have, the career you will follow, the projects you will undertake, and what will be work and what will be play for you.

The FIRST ESSENTIAL of a CFP is the declaration of a break. Say to yourself, "I declare a break for myself in this matter, and I declare that I need to enter a CFP about it".

The SECOND ESSENTIAL of a CFP (usually spoken repeatedly during the conversation) is the declaration of the possibility itself. What you can listen to in this declaration is, "I declare that it is possible that (something)". Then, the crucial task is to clarify the specific conditions of satisfaction that will be this "something".

The movement in the conversation from first appearance to a clear possibility is accomplished through the other essential elements: explicit assessment of the conditions of satisfaction of the possibility, re-declaration of the speaker, specification of the actions possible in the declared domain of possibility, and declaration of new possibilities opened by the conversation.

The THIRD ESSENTIAL of a CFP is the specification of the kinds of Conversations for Action that would make real the possibilities you have declared open.

The FOURTH ESSENTIAL of a CFP is the declaration of new CFP's that you can now have.

We recommend that you ask that your listener respond to you by some date, and a tool is provided for that.

You may also stipulate an alert-date, when The Coordinator will bring this conversation to your attention, and a tool is provided for doing that.

While you are composing a CFP, function key F1 will bring questions to coach you in the conversation.

TABLE 21

Example of Explanatory Help Text—When Opening a Conversation for Action of the Type, "Request"

HELP: MAKE A REQUEST

"Request" begins the most basic Conversation for Action. Before making a request you declared some possibility, or declared something missing. (This declaration of a possibility may have been unspoken, or implicit.) The Coordinator will ask you to name the domain of possibilities in which you begin the conversation.

Then, when you request, you commit yourself to your listener fulfilling some condition of satisfaction (to help realize the possibility you declared) in the future. Your request will be fulfilled when (1) you declare that possibility realized, (2) you declare a new possibility through one or more counteroffers, or (3) you cancel your request.

A complete request includes a date by which the listener will respond, and a date by which the request will be completed. You may explicitly request that your listener respond by some date with a promise, counteroffer, report, or decline. Also, you may explicitly record the date for fulfillment of your conditions of satisfaction.

You may also stipulate an alert-date, when The Coordinator will bring this conversation to your attention, to remind yourself that the commitment is coming due.

The Coordinator will allow you to make a request to yourself; the request will be recorded as a promise (presuming you will not make requests that you will not take seriously: speculative conversations should be conducted as conversations for possibilities).

After a promise to yourself is made you have three options in such a conversation: cancel and make a new promise, cancel (without new promise), and report completion.

TABLE 22

Example of Explanatory Help Text—When Opening a Conversation for Action of the Type, "Offer"

HELP: MAKE AN OFFER

"Offer" begins a Conversation for Action. Before making your offer you declared some possibility, or declared something missing. (This declaration of a possibility may have been unspoken, or implicit.) The Coordinator will ask you to name the domain of possibilities in which you make your offer.

When you offer, you commit yourself to fulfilling some condition of satisfaction in the future, IF your listener accepts your stipulated (declared) conditions of satisfaction.

Your offer will be fulfilled when (1) your listener declares the possibility you offered realized, (2) you replace your offer and declare a new possibility through one or more counteroffers, or (3) you cancel your offer.

A complete offer includes a date by which you request your listener respond, and a date by which you promise (conditionally) to fulfill the offer. You may explicitly request that your listener respond by some date with an acceptance, counteroffer, decline, or declaration of completion. In your offer, almost always you should explicitly name the date by which you will fulfill your stipulated conditions of satisfaction.

You may also stipulate an alert-date, when The Coordinator will bring this conversation to your attention.

We strongly recommend you specify at least one of the three dates offered.

TABLE 23

Example of Explanatory Help Text—When, in a Conversation for Action, Making a Move of the Type, "Decline"

HELP: DECLINE

You may decline: commit NOT to commit to fulfill this request, offer, or counteroffer.

When you decline, the conversation may be complete for you in the moment of declining. However, in some conversations the other person will have declared some possibility that is incomplete for him, and so you may receive one more communication about this matter, as the other person declares himself complete.

You may declare a date by which you want a response and/or an alert-date, and so assure yourself that your decline is received and read.

TABLE 24

Example of Explanatory Help Text—When, in a Conversation for Action, Making a Move of the Type, "Promise"

HELP: ANSWER A REQUEST (OR COUNTER-OFFER) WITH A PROMISE

You may promise to fulfill the conditions of satisfaction of the request or counter-offer you have received.

You will complete your promise when (1) you report completion, and (2) the other person declares he is satisfied.

If the request or counter-offer has come to you without a complete-by date stipulated, we strongly recommend to make the complete-by date explicit in your promise.

You may also stipulate an alert-date, when The Coordinator will bring this conversation to your attention.

TABLE 25

Example of Explanatory Help Text—When, in a Conversation for Action, Making a Move of the Type, "Counter"

HELP: ANSWER WITH A COUNTEROFFER

You may counteroffer with a different date of completion and/or modified conditions of satisfaction. For example, counteroffer "I can do it, but by Friday, not Wednesday, and it will be in draft then, not final typed.", or, "I want it, but by Friday, not Wednesday, and it's OK if it is in draft and not final typed."

When you counteroffer, then in the moment that your counter is accepted you and the person to whom you are speaking will have mutually declared the conditions of satisfaction of your counter, and one of you has promised the other to fulfill those conditions.

Do NOT counteroffer a change in the substance of the commitment with The Coordinator. For example, do not counter "No, I won't do it, but I will help you to do it." In such cases, DECLINE and make a new REQUEST or OFFER.

You may declare a new completion date, a date by which you ask a response to your counteroffer, and/or an alert-date. At least one date is required.

TABLE 26

Example of Explanatory Help Text—When, in a Conversation For Action, Making a Move of the Type, "Report-Complete"

HELP: REPORT THAT YOU HAVE FULFILLED THE CONDITIONS OF SATISFACTION

You may report that the conditions of satisfaction are fulfilled—that an action has been completed. Such a report has two dimensions: the declaration that you are complete with your promise to fulfill the conditions of satisfaction; and, you may also assert features of the completion ("I left the report on your desk.").

It is not necessary that you have previously made a promise, if the other person's conditions of satisfaction are indeed fulfilled. For example, on listening to a request, you may discover that work you have just completed fulfills the request. In that case, simply report that it is done.

If you have not previously promised (including having made an offer or counter-offer, which are conditional promises), your report will be interpreted as including a tacit commitment of promise from you, and the other person will have an opportunity to declare himself satisfied with your work.

When you report you may declare a date by which you want a response to your report, and/or you may declare a date for The Coordinator to alert you. You must specify at least one of the two.

If you are reporting about a promise you made to yourself, then you will complete the conversation with this report: your are simultaneously declaring yourself complete with the conversation.

TABLE 27

Example of Explanatory Help Text—When, in a Conversation for Action, Making a Move of the Type, "Declare-Complete" (When no Prior Cancels in Conversation)

HELP: DECLARE THE CONVERSATION COMPLETE

With the request or offer that opened this conversation, a new possibility was opened. You may now declare that possibility complete, and in doing so you will close the conversation.

Once you have declared this conversation complete, it will no longer show up when you list your conversations. To review this conversation after you have declared it complete, go to the CONVERSE domain, go to the menu available under "Conversation records" and list your "closed" conversations.

TABLE 28

Example of Explanatory Help Text—When, in a Conversation For Action, Making a Move of the Type, "Cancel"

HELP: CANCEL A REQUEST OR OFFER

You may cancel the request or offer with which you opened this conversation. If you made a request, the other person may already have promised to fulfill the request, or may already have done work in the conversation based on what you have said so far. If you made an offer, the other person may have made other commitments based upon your offer. Usually, then, we recommend at least an apology.

You may declare dates for a response to your cancellation and/or an alert-date, to assure the other person has listened to your cancellation. The other must still declare himself complete to close the conversation, so you will receive one more communication from him before the conversation is closed.

If you are cancelling your own promise to yourself, (opened in a request to yourself), then you will complete and close this conversation with your cancellation: you are simultaneously declaring yourself complete in the conversation.

TABLE 29

SUMMARY OF COMMUNICATIONS New Mail Read? <return> Next? <space>

| Domain | From | To | Conv | Commit | Spoken | Ans'd action/Possibility |
|---|---|---|---|---|---|---|
| <none> | rflores | jmcafee | Off | Free-for | 8-Nov-85 No | Grid Computer Report |
| <none> | alicia | jmcafee | Req | Free-for | 8-Nov-85 No | Nov Monies. |
| support | alicia | jmcafee | Off | Offer | 8-Nov-85 No | eds lic. agremnts |
| <none> | bmacleod | jmcafee | Req | Declare- | 8-Nov-85 No | inform me of defecti |
| <none> | bmacleod | jmcafee | Req | Declare- | 8-Nov-85 No | please pay for bills |
| <none> | rmm | WWITTENB | Req | Promise | 8-Nov-85 No | Pending problems - n |
| <none> | jfoster | CBELL | Req | Request | 8-Nov-85 No | supply formatting in |
| atcdevel | rmm | jmcafee | Off | Offer | 8-Nov-85 No | hp font cartridges |
| <none> | MSteuer | jmcafee | Req | Request | 8-Nov-85-No | Syntex LAN Invoice |
| test | bandrews | jmcafee | Off | Free-for | 8-Nov-85 No | testing again . . . 10: |
| <none> | JLudlow | jmcafee | Off | Free-for | 8-Nov-85 No | Automatic mass sendi |
| atcdevel | JLudlow | cbell | Off | Interim- | 8-Nov-85 No | LAN for Development |
| software | jthurmei | jmcafee | Req | Request | 8-Nov-85 No | software for the mol |
| accounts | WWITTENB | cbell | Off | Free-for | 8-Nov-85 Yes | EDS Agenda |
| beta | WWITTENB | jmcafee | Off | Declare- | 8-Nov-85 No | Beta LAN version ava |
| sales | grosenbe | jmcafee | Req | Request | 8-Nov-85 No | call citibank |
| oc | abrandew | jmcafee | Req | Request | 8-Nov-85 No | coordinator support |
| <none> | phartwic | jmcafee | Req | Free-for | 8-Nov-85 No | Send Templates for N |
| Ian | jj | jmcafee | Req | Acknowle | 8-Nov-85 No | GPC Formatter/System |
| <none> | jj | jmcafee | Req | Declare- | 8-Nov-85 No | Address for Zanovski |
| <none> | khecht | cooruse | Req | Follow-u | 8-Nov-85 No | moveblocks |

TABLE 30

| | |
|---|---|
| STARTING WITH THE COORDINATOR | |
| TODAY'S ACTIONS | WED 13-NOV-85 |
| Read new mail | |
| Appointments and commitments | |
| Future appointments | |
| Commitments due today | |
| Notes | |
| CONVERSATIONS | WRITING |
| LONG-RUN | LINK |
| CALENDERS | |
| (Press F1 for Coaching at any time.) | |

What is claimed is:

1. A computer system which implements a method for assisting users of the computer system to manage at least one of their business, social and personal communications, wherein said computer system includes for each of said users a corresponding input and output interface, processor, memory, and storage device, said method comprising the steps of:

a) creating at least one conversation type record structure for at least one conversation, said at least one conversation having a plurality of states, said conversation type record structure for defining a type of conversation, an identification of each of said users who are to participate in said conversation, a role to be assigned to each of said participating users, the state of the conversation, and a specification of conversational moves permitted for said role at each state of the conversation;

b) creating at least one conversation instance record for a first one of said participating users and for at least one other of said participating users based upon data entered by the first user using said corresponding user input and output interface and the at least one conversation type record structure, wherein each of said at least one other participating users is assigned a predetermined one of said roles defined in said at least one conversation type record structure, storing said entered data in said corresponding conversation instance record for said first user and making said corresponding conversation instance record available to each of said at least one other participating users;

c) updating the corresponding conversation instance record for said participating users based upon data entered by each of said participating users using said corresponding input and output interface, wherein the data which is permitted to be entered by each of said participating users is determined by the user's assigned role and the state of the conversation when said data is being entered.

2. The method defined by claim 1 wherein said at least one conversation type record structure creating step comprises the steps of:

a) specifying the type of conversation as being one of a request type conversation for action, an offer type conversation for action, and a conversation for possibilities;

b) specifying the roles of the participating users as being at least one of a requestor, a promisor and an observer;

c) specifying for each of said specified roles at least one type of permitted conversational move for each state of the conversation;

d) specifying at least one incompletion type record, whereby said conversational moves advance the conversation towards one of a successful and unsuccessful conclusion, through said plurality of conversational states, by defining and undefining incompletion records associated with the conversation.

3. The method defined by claim 2 wherein said at least one conversation type record structure creating step comprises the further step of specifying predetermined times for completion of the incompletions produced by each of said conversational moves.

4. The method defined by claim 3 wherein said at least one conversation instance record creating step comprises the step of:

a) prompting said first user to enter data using said corresponding user to input and output interface, said entered data for defining the conversation type, specifying an address corresponding to at least one of said participating users and specifying times for completion of the incompletions associated with said permitted conversational moves;

b) creating a predetermined conversation instance record corresponding to said first user and storing the entered data in said corresponding conversation instance record.

5. The method defined by claim 2 wherein types of incompletion include a RESPONSE IS MISSING and a FULFILLMENT IS MISSING and wherein said method further comprises the steps of:

a) selecting at least one sort criteria from a list of sort criteria including:

i) a user's RESPONSE IS MISSING;

ii) a user's FULFILLMENT IS MISSING;

iii) incompleted conversations; and iv) completed conversations;

b) sorting said conversation instance records according to said sort criteria; and c) presenting the sorted conversation instance records to at least one of said participating users.

6. The method defined by claim 1 wherein said at least one conversation instance record creating step comprises the steps of:

a) prompting said first user to enter data using said corresponding user input and output interface, said entered data for defining the conversation type and specifying an address corresponding to at least one of said participating users;

b) creating a predetermined conversation instance record corresponding to said first user and storing the entered data in said corresponding conversation instance record.

7. The method defined by claim 6 further comprising the steps of a) delivering at least a predetermined subset of the stored data to each of said specified addresses;

b) receiving the predetermined subset of the stored data at each of said specified addresses;

c) creating a predetermined conversation instance record corresponding to the user at each of said specified addresses and storing the received data in corresponding conversation instance record;

d) notifying the user at each of said specified addresses that said data has been received.

8. The method defined by claim 7 wherein said updating step comprises the steps of:

a) creating a conversation reply record for each of said notified users based upon the contents of said at least one conversation type record structure and the contents of said corresponding conversation instance record for each of said notified users;

b) using the conversation reply record to prompt the corresponding user to enter data using said corresponding user input and output interface for updating the contents of said corresponding conversation instance record;

c) storing the entered data in said conversation instance record for the corresponding user.

9. The method defined by claim 8 further comprising the steps of:

a) delivering at least a predetermined subset of the stored data to each of said addresses specified in the conversation instance record;

b) receiving the predetermined subset of the stored data at each of said specified addresses;

c) updating the contents of the conversation instance record corresponding to the user at each of said specified addresses with received data;

e) notifying the user at each of said specified addresses that said data has been received;

f) deleting said conversation instance record corresponding to said at least one of said participating users when a predetermined set of criteria has been met;

g) repeating steps a)-f) until all of said predetermined conversation instance records corresponding to each of said at least one of said participating users have been deleted.

* * * * *

UNITED STATES PATENT AND TRADEMARK OFFICE

CERTIFICATE OF CORRECTION

PATENT NO. : 5,216,603

DATED : June 1, 1993

INVENTOR(S) : Flores et al.

It is certified that error appears in the above-identified patent and that said Letters Patent is hereby corrected as shown below:

In column 7 at line 12, the sentence begining with " "Communications" and "moves in conversations" " is changed to begin a new paragraph.

Signed and Sealed this

Twenty-third Day of May, 1995

Attest:

Bruce Lehman

BRUCE LEHMAN

Attesting Officer

*Commissioner of Patents and Trademarks*